United States Patent
Talebi Fard et al.

(10) Patent No.: US 11,991,761 B2
(45) Date of Patent: May 21, 2024

(54) REQUEST TO ESTABLISH PROTOCOL DATA UNIT SESSION WITH TIME SENSITIVE NETWORK PARAMETERS

(71) Applicant: Ofinno, LLC, Reston, VA (US)

(72) Inventors: Peyman Talebi Fard, Vienna, VA (US); Esmael Hejazi Dinan, McLean, VA (US); Kyungmin Park, Vienna, VA (US); Weihua Qiao, Herndon, VA (US); Jayshree Bharatia, Plano, TX (US); Jinsook Ryu, Oakton, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/195,140

(22) Filed: May 9, 2023

(65) Prior Publication Data

US 2023/0276512 A1 Aug. 31, 2023

Related U.S. Application Data

(63) Continuation of application No. 17/509,761, filed on Oct. 25, 2021, now Pat. No. 11,690,110, which is a
(Continued)

(51) Int. Cl.
*H04L 47/2416* (2022.01)
*H04L 47/724* (2022.01)
(Continued)

(52) U.S. Cl.
CPC ............. *H04W 76/11* (2018.02); *H04L 67/14* (2013.01); *H04W 48/16* (2013.01); *H04W 60/00* (2013.01)

(58) Field of Classification Search
CPC ..... H04W 76/11; H04W 48/16; H04W 60/00; H04L 7/14
See application file for complete search history.

(56) References Cited

U.S. PATENT DOCUMENTS 7,626,121 B1 * 12/2009 Cleghorn ................. H02G 3/14
174/67
10,848,576 B2 * 11/2020 Stammers ............... H04L 67/51
(Continued)

FOREIGN PATENT DOCUMENTS

CN 110431749 A 11/2019
EP 3984306 A1 4/2022
(Continued)

OTHER PUBLICATIONS

3GPP TR 22.804 V16.1.0 (Sep. 2018); Technical Report; 3rd Generation Partnership Project; Technical Specification Group Services and System Aspects; Study on Communication for Automation in Vertical Domains (Release 16).
(Continued)

*Primary Examiner* — Diane L Lo
*Assistant Examiner* — Abusayeed M Haque
(74) *Attorney, Agent, or Firm* — Peter Flanagan; Kavon Nasabzadeh; Philip R. Smith

(57) ABSTRACT

A method may include receiving, by a wireless device from a time sensitive network, TSN, translator device, one or more TSN parameters. The method may also include sending, by the wireless device to an access and mobility management function (AMF), a non access stratum, NAS, message indicating a request to establish a protocol data unit (PDU) session comprising the one or more TSN parameters. The method may further include receiving, by the wireless device from the AMF, a message indicating acceptance of the PDU session.

20 Claims, 37 Drawing Sheets

Related U.S. Application Data continuation of application No. 17/212,638, filed on Mar. 25, 2021, now Pat. No. 11,166,325, which is a continuation of application No. PCT/US2020/013655, filed on Jan. 15, 2020.

(60) Provisional application No. 62/792,652, filed on Jan. 15, 2019.

(51) Int. Cl.
  *H04L 67/14*   (2022.01)
  *H04W 48/16*   (2009.01)
  *H04W 76/11*   (2018.01)
  *H04W 60/00*   (2009.01)

(56) References Cited

U.S. PATENT DOCUMENTS

| | | | |
|---|---|---|---|
| 11,690,110 B2 * | 6/2023 | Talebi Fard | H04W 48/16 709/227 |
| 2020/0059829 A1 | 2/2020 | Joseph et al. | |
| 2020/0267673 A1 | 8/2020 | Joseph et al. | |
| 2020/0304408 A1 | 9/2020 | Suthar et al. | |
| 2020/0351973 A1 | 11/2020 | Mannweiler et al. | |
| 2020/0404697 A1 | 12/2020 | Yang et al. | |
| 2021/0007160 A1 | 1/2021 | Sivasiva Ganesan et al. | |
| 2021/0084713 A1 * | 3/2021 | Miklós | H04W 92/045 |
| 2021/0099341 A1 | 4/2021 | Moon et al. | |
| 2021/0112001 A1 | 4/2021 | Li et al. | |
| 2021/0112449 A1 | 4/2021 | Joseph et al. | |
| 2021/0135770 A1 | 5/2021 | Schober et al. | |
| 2021/0219238 A1 | 7/2021 | Sharma et al. | |
| 2021/0227452 A1 | 7/2021 | Munz et al. | |
| 2021/0234966 A1 | 7/2021 | Saker et al. | |
| 2023/0379707 A1 * | 11/2023 | Tiwari | H04W 8/02 |

FOREIGN PATENT DOCUMENTS

| | | | | |
|---|---|---|---|---|
| WO | WO-2019157855 A1 * | 8/2019 | | H04L 47/14 |
| WO | 2019/166081 A1 | 9/2019 | | |
| WO | 2020/081060 A1 | 4/2020 | | |
| WO | 2020/081062 A1 | 4/2020 | | |
| WO | WO-2020081062 A1 * | 4/2020 | | |
| WO | 2020/104017 A1 | 5/2020 | | |
| WO | WO-2020104021 A1 * | 5/2020 | | H04L 47/283 |
| WO | WO-2020124514 A1 * | 6/2020 | | H04W 24/04 |

OTHER PUBLICATIONS

3GPP TR 22.821 V16.1.0 (Jun. 2018); Technical Report; 3rd Generation Partnership Project; Technical Specification Group Services and System Aspects; Feasibility Study on LAN Support in 5G (Release 16).
3GPP TS 23.501 V15.2.0 (Jun. 2018); Technical Specification; 3rd Generation Partnership Project; Technical Specification Group Services and System Aspects; System Architecture for the 5G System; Stage 2; (Release 15).
3GPP TS 23.502 V15.4.0 (Dec. 2018); Technical Specification; 3rd Generation Partnership Project; Technical Specification Group Services and System Aspects; Procedures for the 5G System; Stage 2; (Release 15).
3GPP TS 23.503 V15.3.0 (Sep. 2018); Technical Specification; 3rd Generation Partnership Project; Technical Specification Group Services and System Aspects; Policy and Charging Control Framework for the 5G System; Stage 2; (Release 15).
3GPP TR 23.734 V0.2.0 (Sep. 2018); Technical Report; 3rd Generation Partnership Project; Technical Specification Group Services and System Aspects; Study on 5GS Enhanced support of Vertical and LAN Services; (Release 16).
3GPP TR 23.734 V0.3.0 (Oct. 2018); Technical Report; 3rd Generation Partnership Project; Technical Specification Group Services and System Aspects; Study on 5GS Enhanced support of Vertical and LAN Services; (Release 16).
3GPP TR 23.734 V16.0.0 (Dec. 2018); Technical Report; 3rd Generation Partnership Project; Technical Specification Group Services and System Aspects; Study on enhancement of 5GS for Vertical and LAN Services; (Release 16).
S2-1811021; SA WG2 Meeting #129; 1 Oct. 15-19, 2018, Dongguan, China; (revision of S2-1811435); Source: Huawei, HiSilicon; Title: QoS Negotiation between 3GPP and TSN networks KI#3.1; Document for: Approval; Agenda Item: 6.15.2; Work Item / Release: FS_Vertical_LAN / Rel-16.
S2-1811769; SA WG2 Meeting #129Bis; Nov. 26-30, 2018, West Palm Beach, US; Source: Samsung; Title: Evaluation of Solutions for KI#3.1 and KI#3.2; Document for: Approval; Agenda Item: 6.15; Work Item / Release: FS_Vertical_LAN / Rel-16.
S2-1811770; SA WG2 Meeting #129Bis; Nov. 26-30, 2018, West Palm Beach, US; Source: Samsung; Title: Conclusion for KI#3.1 and KI#3.2; Document for: Approval; Agenda Item: 6.15; Work Item / Release: FS_Vertical_LAN / Rel-16.
S2-1811826; SA WG2 Meeting #129bis; Nov. 26-30, 2018, West Palm Beach, USA; Source: Nokia, Nokia Shanghai Bell, Qualcomm Incorporated, Ericsson, ZTE; Title: Overall evaluation and conclusion of key issue 3.1; Document for. Discussion/Approval; Agenda Item: 6.15.2; Work Item / Release: FS_Vertical_LAN/Rel-16.
S2-1811827; Sa WG2 Meeting #129bis; Nov. 26-30, 2018 West Palm Beach FL; Source: Nokia, Nokia Shanghai Bell; Title: KI#3.1—TSN—Updates to Solution #8 architecture; Document for: Discussion/Approval; Agenda Item: 6.15.2; Work Item / Release: FS_Vertical_LAN/Rel-16.
S2-1811828; Sa WG2 Meeting #129bis; Nov. 26-30, 2018 West Palm Beach FL; Source: Nokia, Nokia Shanghai Bell; Title: KI#3.1—TSN—Definition of potential Impacts on Existing Nodes and Functionality of 5GS bridge model; Document for: Discussion/Approval; Agenda Item: 6.15.2; Work Item / Release: FS_Vertical_LAN/Rel-16.
S2-1811831; ISA WG2 Meeting #129bis; Nov. 26-30, 2018West Palm Beach FL; Source: Nokia, Nokia Shanghai Bell; Title: TSN—QoS Framework Solution Update; Document for: Discussion/Approval; Agenda Item: 6.15.2; Work Item / Release: FS_Vertical_LAN.
S2-1812193; SA WG2 Meeting #129bis; Nov. 26-30, 2018, West Palm Beach, USA; Source: Nokia, Nokia Shanghai Bell; Title: Updates to Overall evaluation and conclusion of key issues 3.1; Document for: Discussion/Approval; Agenda Item: 6.15.2; Work Item / Release: FS_Vertical_LAN/Rel-16.
S2-1812232; 3GPP TSG-SA WG2 Meeting #129Bis; 2 West Palm Beach, USA, Nov. 26-Nov. 30, 2018; Source: Huawei, HiSilicon; Title: Updates on Solution #18; Document for: Approval; Agenda Item: 6.15.2; Work Item / Release: FS_Vertical_LAN / Rel-16.
S2-1812295; SA WG2 Meeting #129bis; Nov. 26-30, 2018, West Palm Beach, USA; Source: ZTE; Title: Discussion and proposal on solution to key issue#3.1; Document for: Approval; Agenda Item: 6.15.2; Work Item / Release: FS_Vertical_LAN / Rel-16.
S2-188101; SA WG2 Meeting #128-Bis; Aug. 20-24, 2018, Sophia Antipolis; Source: Nokia, Nokia Shanghai Bell; Title: TSN—QoS Framework; Document for: Discussion/Approval; Agenda Item: 6.15; Work Item / Release: FS_Vertical_LAN.
S2-188233; SA WG2 Meeting #128Bis; Aug. 20-24, 2018, Sophia Antipolis, France; Source: Huawei, HiSilicon; Title: QoS Negotiation between 3GPP and TSN networks KI#3.1; Document for: Approval; Agenda Item: 6.15; Work Item / Release: FS_Vertical_LAN / Rel-16.
S2-188459; SA WG2 Meeting #128-Bis; Aug. 20-24, 2018, Sophia Antipolis; Source: Nokia, Nokia Shanghai Bell; Title: Integration of the 5G System in a TSN network; Document for: Discussion/Approval; Agenda Item: 6.15; Work Item / Release: FS_Vertical_LAN.
S2-1900288; 3GPP TSG-SA2 Meeting #130; Jan. 21-25, 2019, Kochi, India; CR-Form-v11.2; Change Request; 23.501; CR 0809; rev-; Current version: 15.4.0; Title: Support of user plane based QoS negotiation between 3GPP and TSN networks.
S2-1900405; SA WG2 Meeting #130; Jan. 21-25, 2019, Kochi, India; Source: Samsung; Title: Enhancements to 5GS QoS frame-

(56) References Cited

OTHER PUBLICATIONS work for support of deterministic services; Document for: Discussion and Agreement; Agenda Item: 6.15.2; Work Item / Release: Vertical_LAN / Rel-16.
S2-1900407; 3GPP TSG-SA WG2 Meeting #1130; Kochi, India, Jan. 21-25, 2019 ; CR-Form-v11.2; Change Request; 23.501; CR 0830; rev-; Current version: 15.4.0; Title: Deterministic QoS Class.
S2-1900517; SA WG2 Meeting #130; Jan. 21-25, 2019, Kochi, India; Source: ZTE; Title: Discussion on the Enhancements to 5GS QoS framework for support of deterministic services; Document for: Approval; Agenda Item: 6.15.2; Work Item / Release: Vert_LAN / Rel-16.
S2-190xxxx; SA WG2 Meeting #130; Jan. 21-25, 2019, Kochi, India; (revision of S2-1900557); CR-Form-v11.4; Change Request; 23.501; CR 870; rev-; Current version: 15.4.0; Title: TSC definitions.
S2-1900558; Sa WG2 Meeting #130; Jan. 21-25, 2019, Kochi, India; CR-Form-v11.4; Change Request; 23.501; CR 871; rev-; Current version: 15.4.0; Title: TSC Architecture.
S2-1900559; Sa WG2 Meeting #130; Jan. 21-25, 2019, Kochi, India; Source: Nokia, Nokia Shanghai Bell; Title: TSN—QoS; Document for: Discussion/Approval; Agenda Item: 6.15.2; Work Item / Release: FS_Vertical_LAN.
S2-1900590; 3GPP TSG-SA WG2 Meeting #130; Kochi, India, Jan. 21-Jan. 25, 2019; Source: Huawei, HiSilicon; Title: Discussion on system enhancement for TSN logical bridge management; Document for: Discussion/Decision; Agenda Item: 6.15.2; Work Item / Release: Vertical_LAN / Rel-16.
S2-1900591; 3GPP TSG-SA WG2 Meeting #130; Jan. 21-25, 2019, Kochi, India; CR-Form-v11.2; Change Request; 23.501; CR 0885; rev-; Current version: 15.4.0; Title: System enhancement for TSN logical bridge management.
S2-1900592; 3GPP TSG-SA WG2 Meeting #130; Jan. 21-25, 2019, Kochi, India; CR-Form-v11.2; Change Request; 23.502; CR 0963; rev-; Current version: 15.4.1; Title: System enhancement for TSN logical bridge management.
S2-1900609; 3GPP TSG-SA WG2 Meeting #130; Jan. 21-25, 2019, Kochi, India; CR-Form-v11.1; Change Request; 23.734; CR 0003; rev-; Current version: 16.0.0; Title: TSN QoS and traffic scheduling in 5GS.
Thaler, P. et al., "Media Access Control Bridges and Virtual Bridged Local Area Networks" IEEE 802.1Q, Mar. 10, 2013.
Finn, N. "The Multiple Stream Registration Protocol (MSRP) for AVB stream reservation," IEEE 802.1, Sep. 2007.
Walter, T. "Centralized Network Configuration," National Instruments, Sep. 9, 2014.
Brown, G. et al., "Ultra-Reliable Low-Latency 5G for Industrial Automation," A Heavy Reading white paper produced for Qualcomm Inc., Qualcomm, Jul. 6, 2017.
Gunther, C., "Stream Reservation Protocol (SRP)," Joint IEEE-SA and ITU Workshop on Ethernet; Geneva, Switzerland, Jul. 13, 2013.
"Time-Sensitive Networking: A Technical Introduction," White Paper; Cisco Public; 2017.
"IEEE Standard for Layer 2 Transport Protocol for Time-Sensitive Applications in Bridged Local Area Networks," IEEE Standards Association; New York, NY; May 6, 2011.
"IEEE Standard for Local and Metropolitan Area Networks- Bridges and Bridged Networks," IEEE Standards Association; IEEE Std 802.1Q™-2018; New York, NY; May 7, 2018.
"Draft Standard for Local and Metropolitan Area Networks—Time-Sensitive Networking for Fronthaul," Mar. 14, 2018.
International Search Report and Written Opinion of the International Searching authority dated Jun. 29, 2020, in International Application No. PCT/US2020/013655.
Chinese Office Action, dated Jun. 24, 2022, in CN Patent Application No. 2020800094515.
Extended European Search Report, dated Nov. 28, 2022, in EP Patent Application No. 22177548.9.
3GPP TS 23.502 V15.4.1 (Jan. 2019); Technical Specification; 3rd Generation Partnership Project; Technical Specification Group Services and System Aspects; Procedures for the 5G System; Stage 2; (Release 15).
S2-187387; SA WG2 Meeting #128; Jul. 2-6, 2018, Vilnius, LT; (revision ot S2~i86802); Source: Nokia, Nokia Shanghai Bell; Title: Solution for 5G URLLC in 5G System; Document for: Approval; Agenda Item: 6.20; Work Item/Release: FS_SG_URLLC/Rel-16.

\* cited by examiner

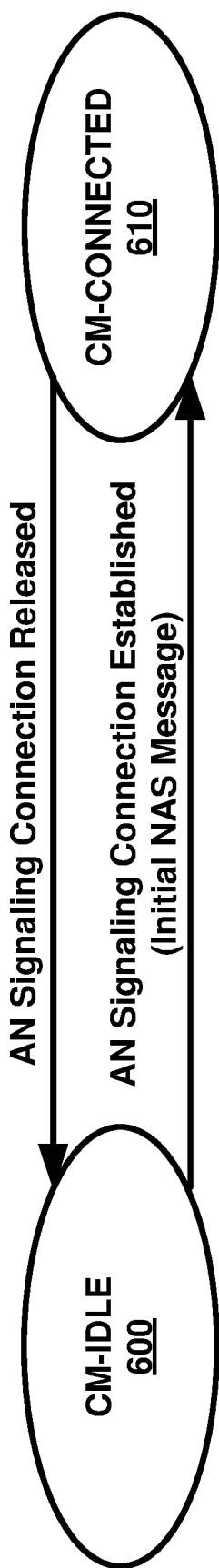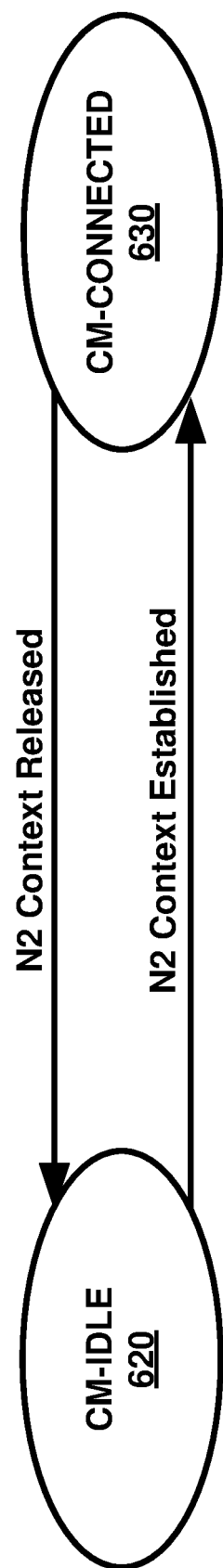

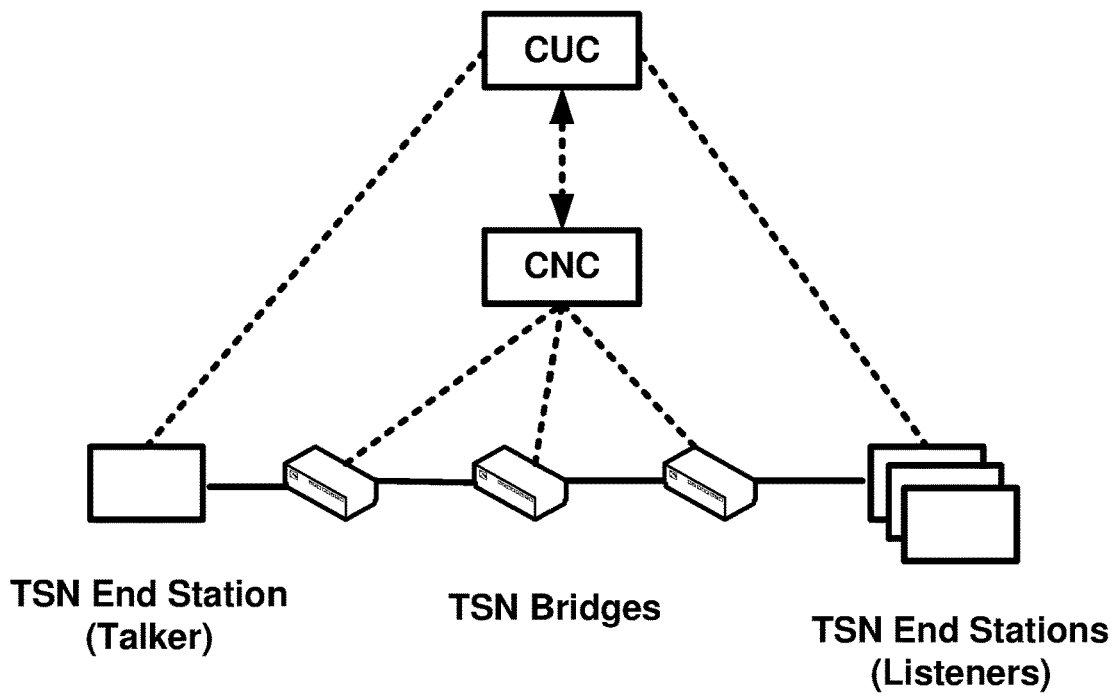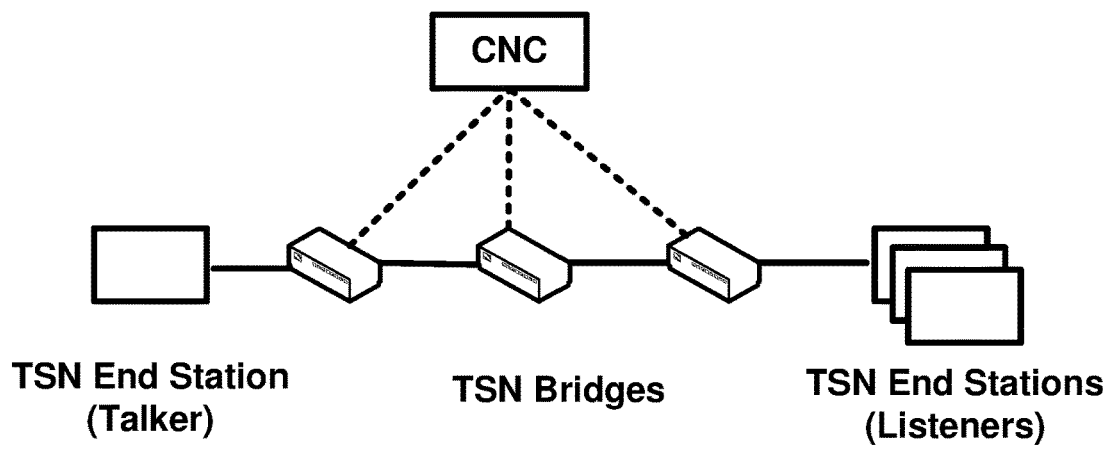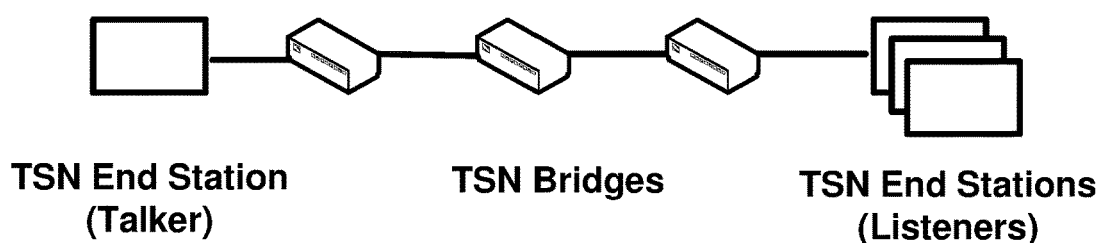
FIG. 15

REQUEST TO ESTABLISH PROTOCOL DATA UNIT SESSION WITH TIME SENSITIVE NETWORK PARAMETERS

CROSS-REFERENCE TO RELATED APPLICATIONS

This application is a continuation of U.S. patent application Ser. No. 17/509,761, filed Oct. 25, 2021, which is a continuation of U.S. patent application Ser. No. 17/212,638, filed Mar. 25, 2021, which is a continuation of International Application No. PCT/US2020/013655, filed Jan. 15, 2020, which claims the benefit of U.S. Provisional Application No. 62/792,652, filed Jan. 15, 2019, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 6A and FIG. 6B depict two connection management state models in UE 100 and AMF 155 as per an aspect of embodiments of the present disclosure.

FIG. 15 is an example diagram as per an aspect of an embodiment of the present disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
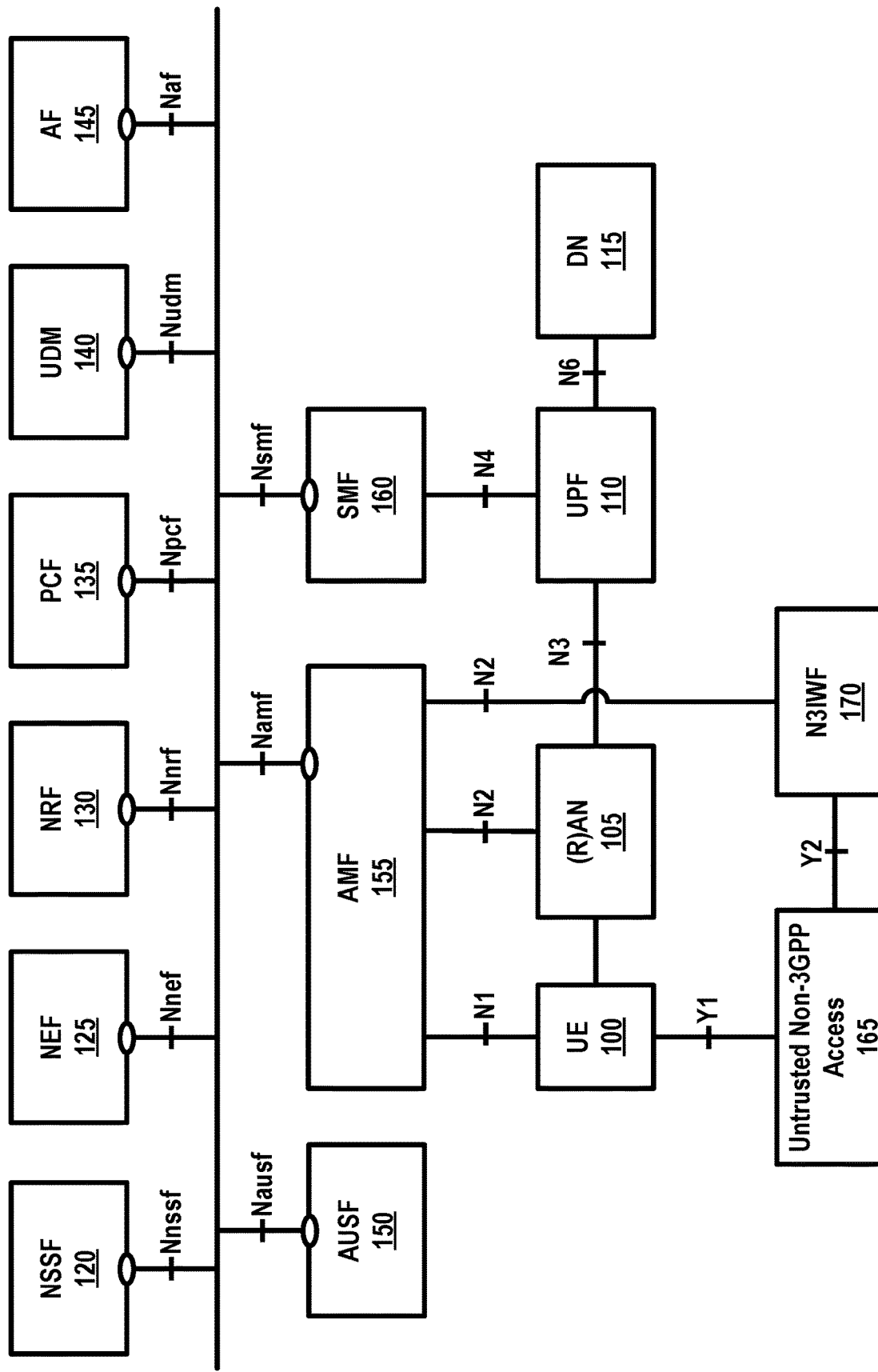
FIG. 1 is a diagram of an example 5G system architecture as per an aspect of an embodiment of the present disclosure.
Figure 2:
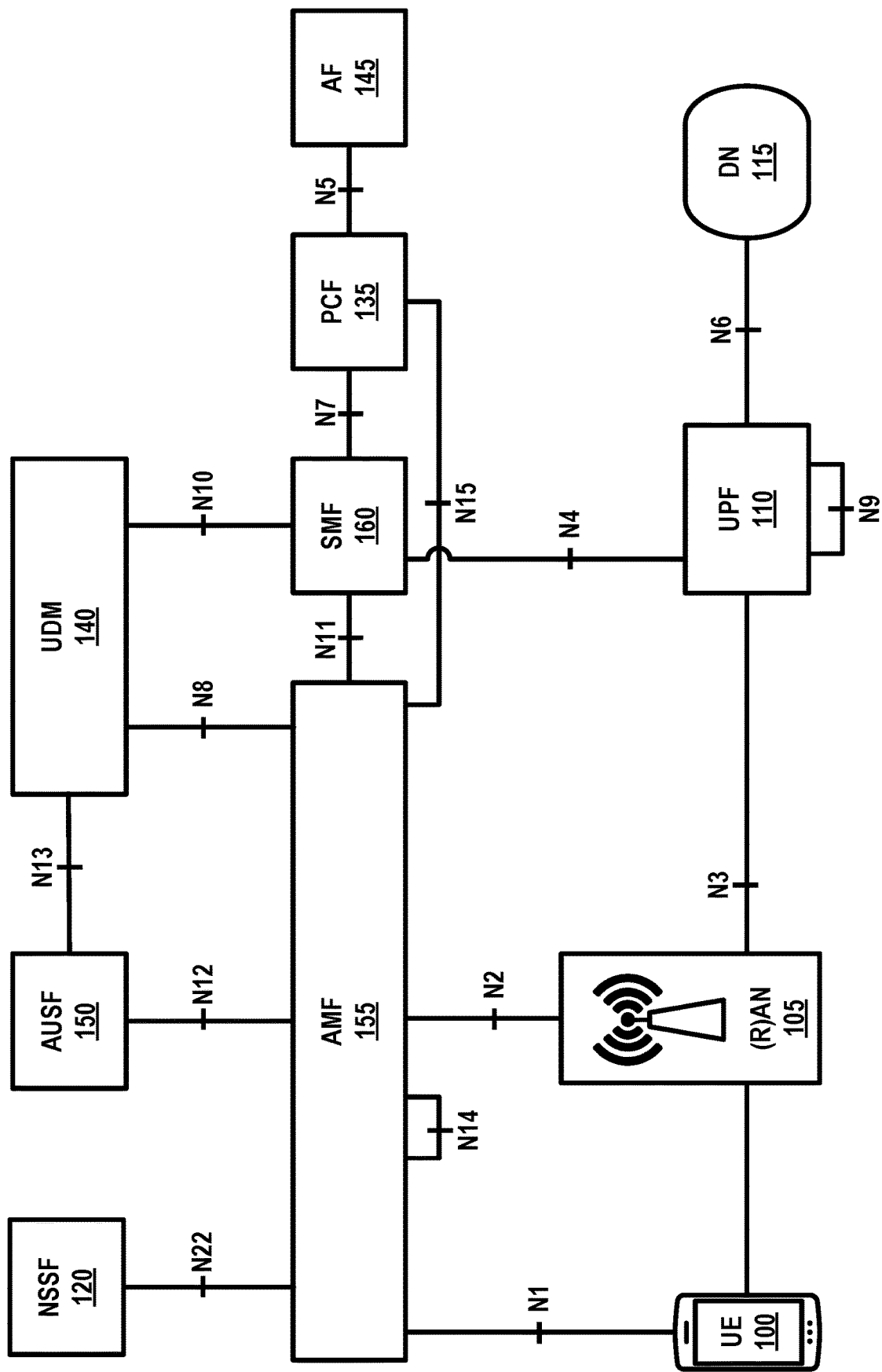
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID
GPSI Generic Public Subscription Identifier
GTP GPRS Tunneling Protocol GUTI Globally Unique Temporary Identifier
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SMF Session Management Function
SMSF SMS Function
S-NSSAI Single Network Slice Selection Assistance information
SUCI Served User Correlation ID
SUPI Subscriber Permanent Identifier
TEID Tunnel Endpoint Identifier
TSN Time Sensitive Networking
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
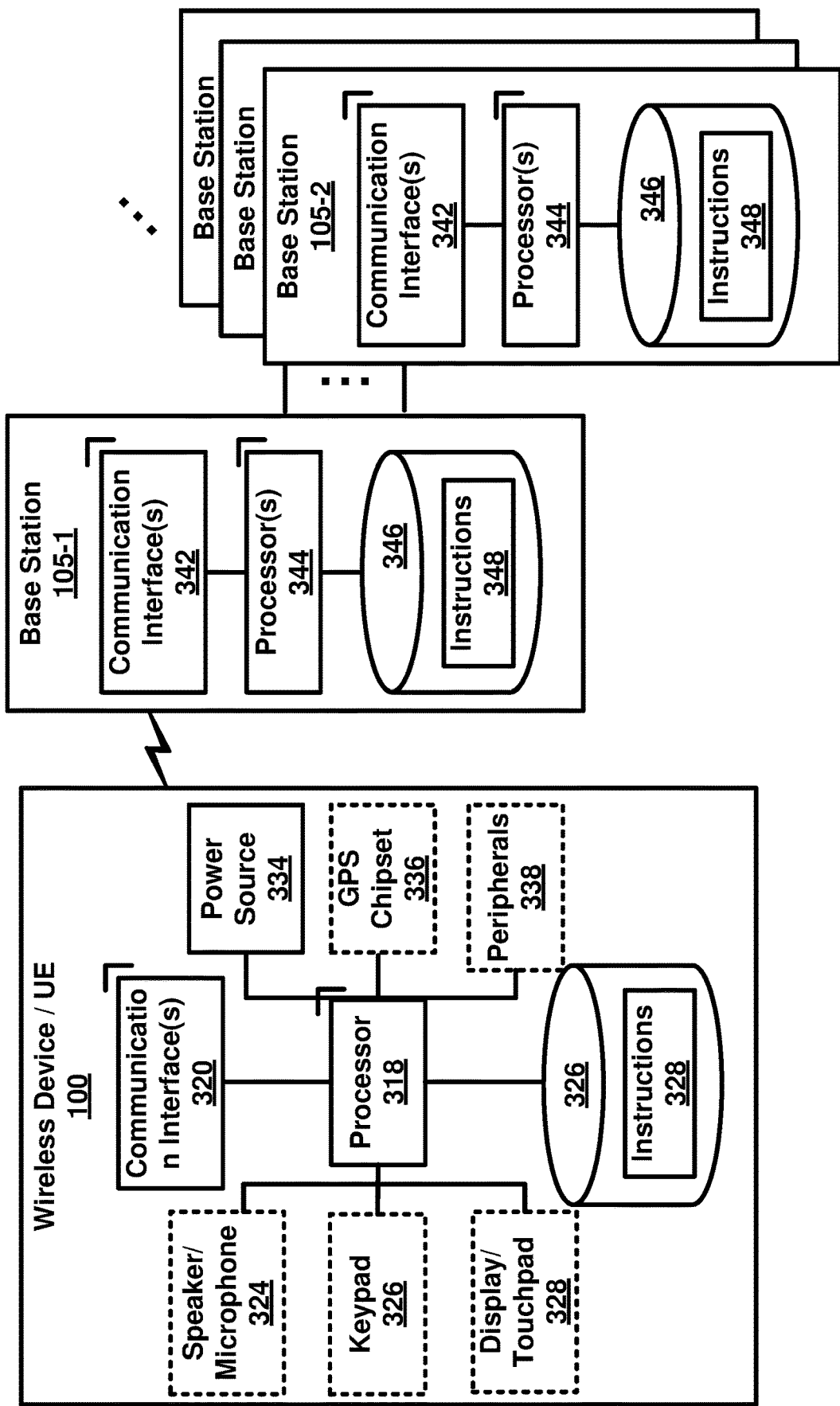
FIG. 3 is a system diagram of an example wireless device and a network node in a 5G system as per an aspect of an embodiment of the present disclosure.
Figure 4:
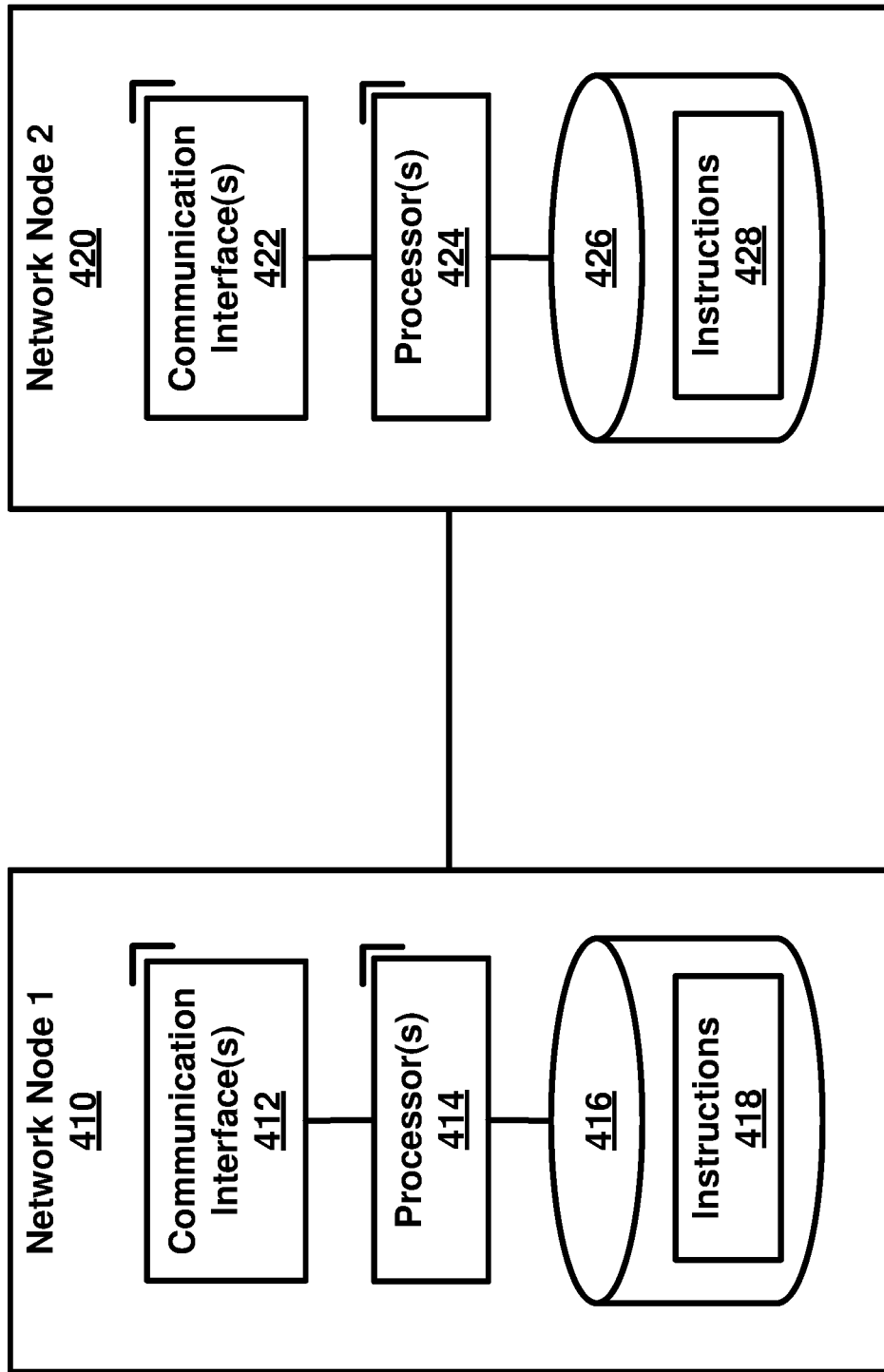
FIG. 4 is a system diagram of an example network node as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
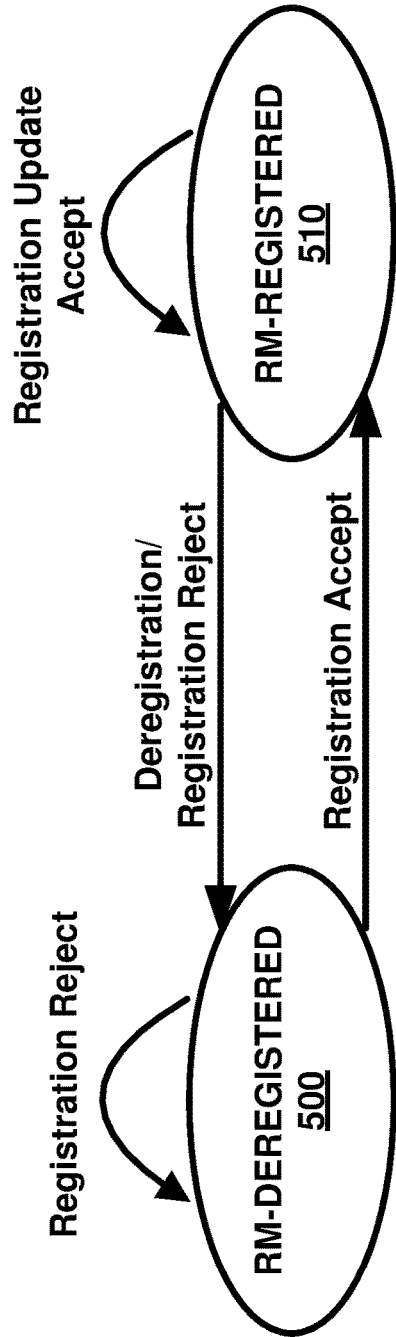
FIG. 5A and FIG. 5B depict two registration management state models in UE 100 and AMF 155 as per an aspect of embodiments of the present disclosure.
Figure 5B:
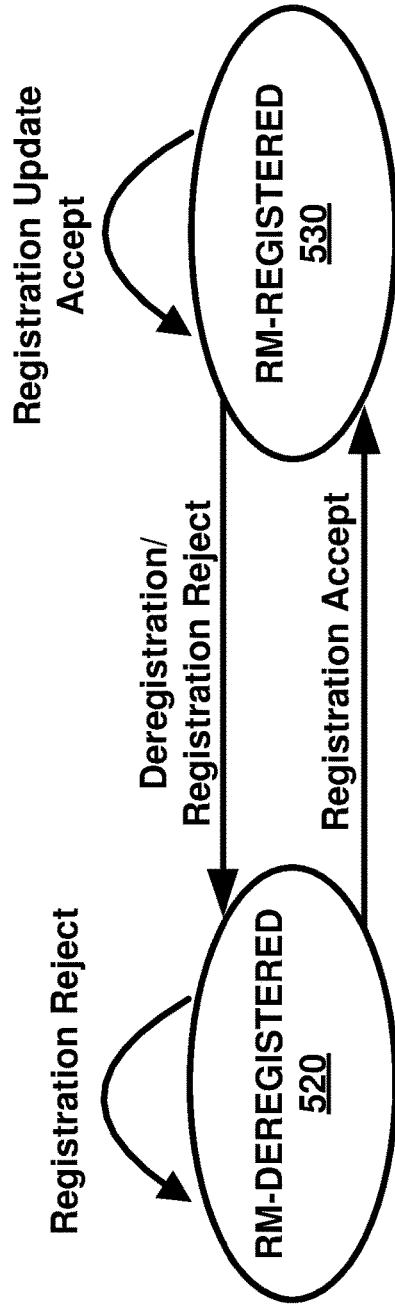

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
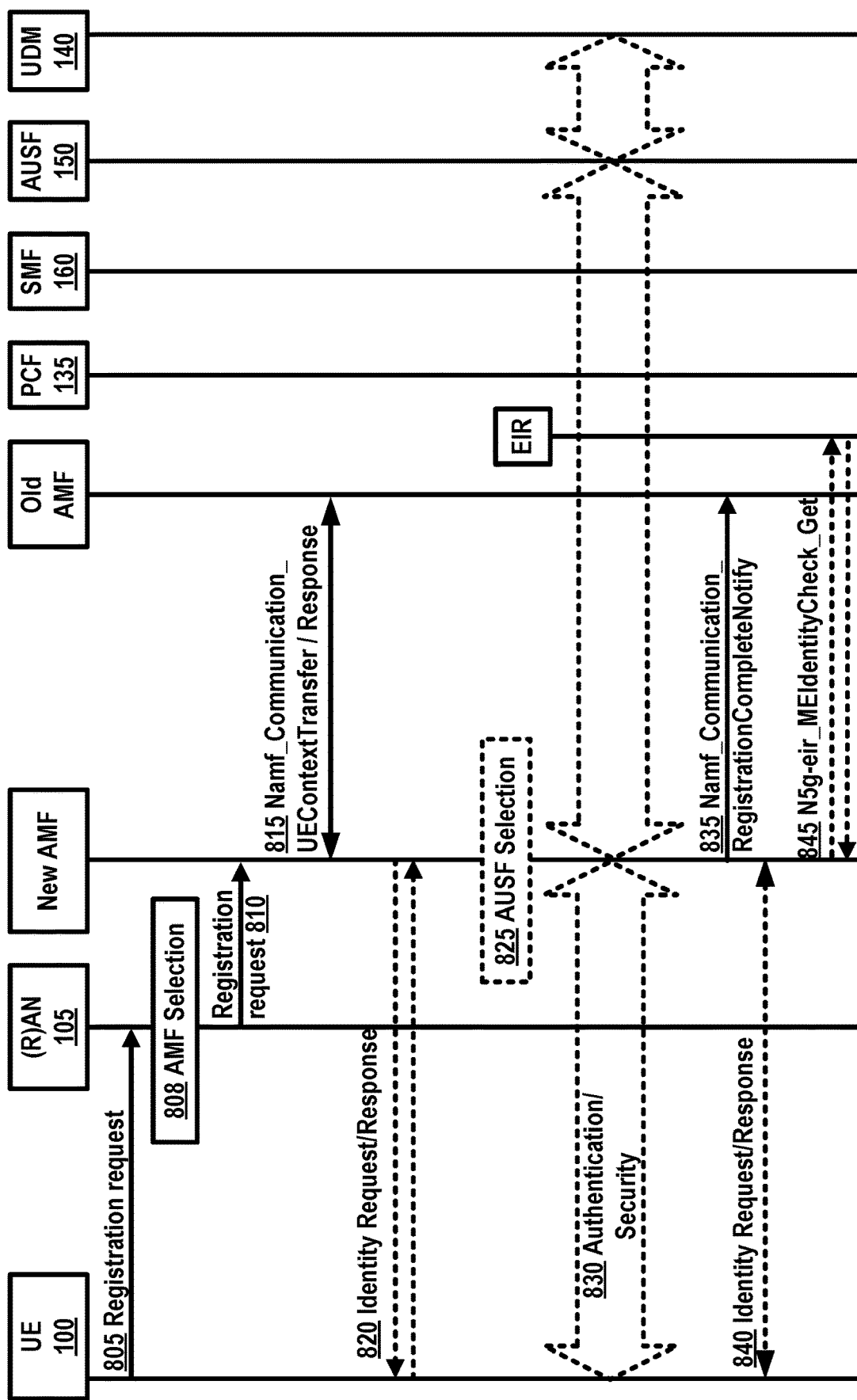
FIG. 8 is an example call flow as per an aspect of an embodiment of the present disclosure.
Figure 9:
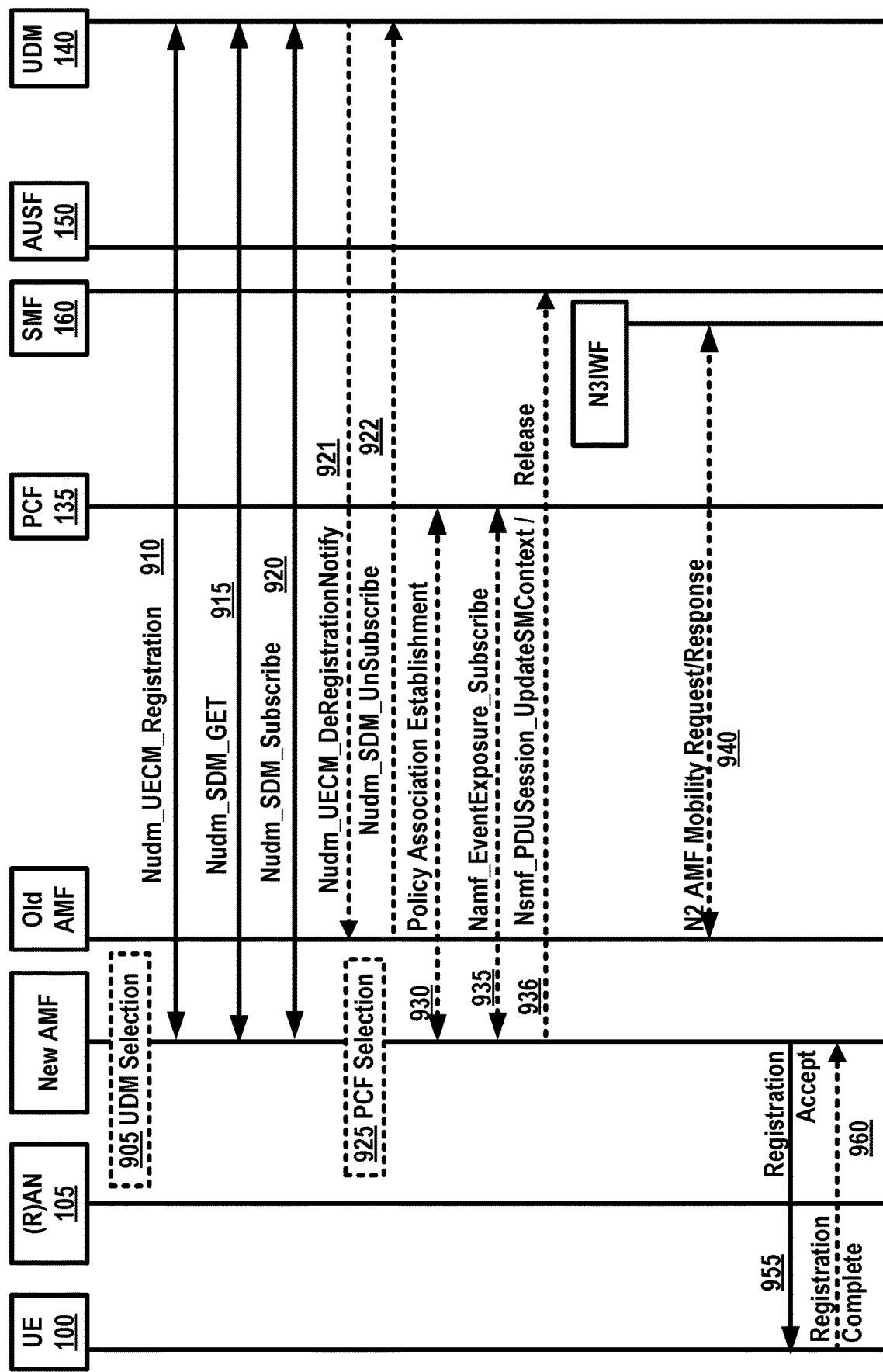
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
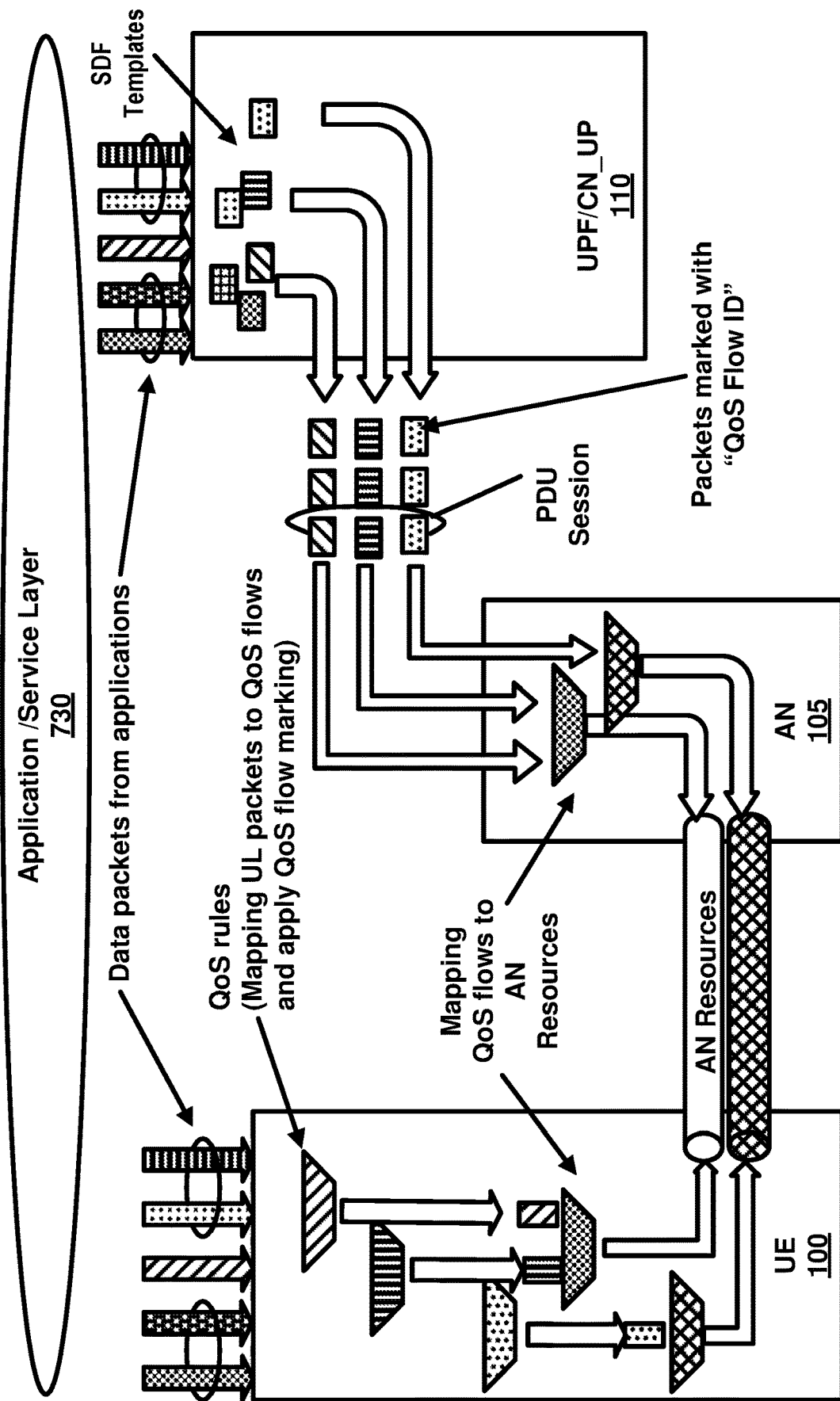
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network; and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NS-SAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 may be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by one or more PLMN(s) based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of one or more S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by one or more NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may selects a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type.

The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query(access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of one or more S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
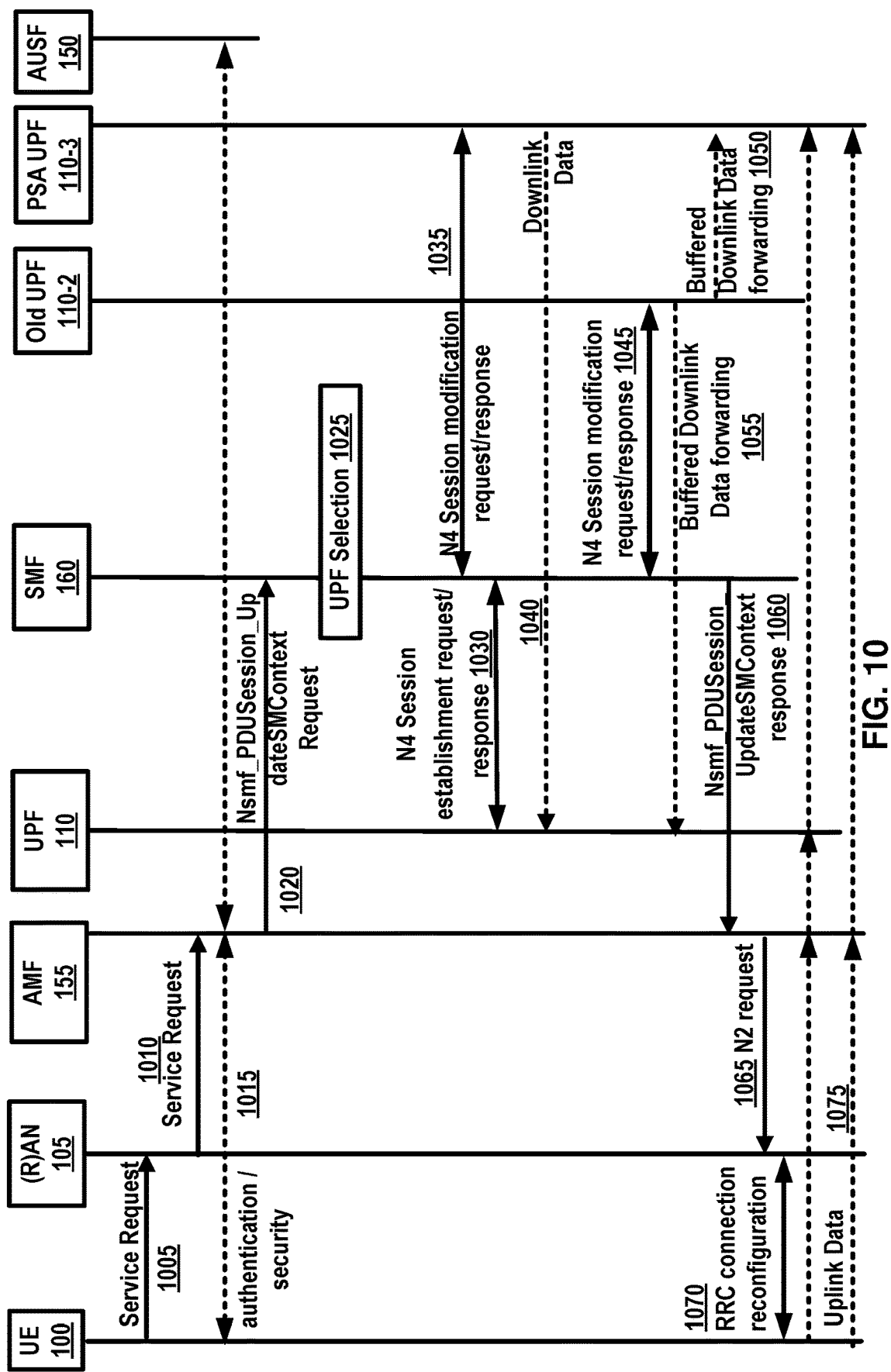
FIG. 10 is an example call flow as per an aspect of an embodiment of the present disclosure.
Figure 11:
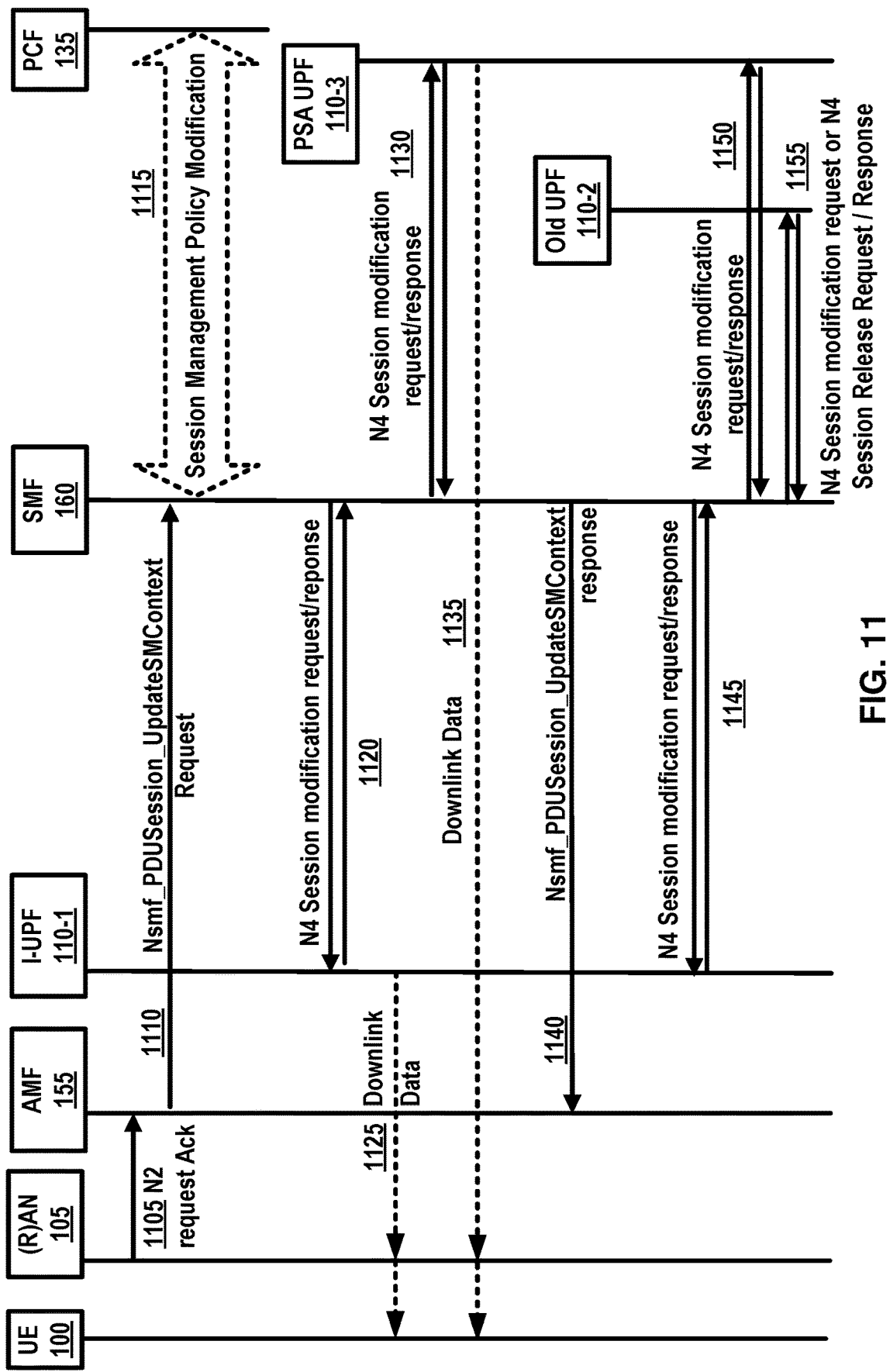
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_P-DUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in one or more of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
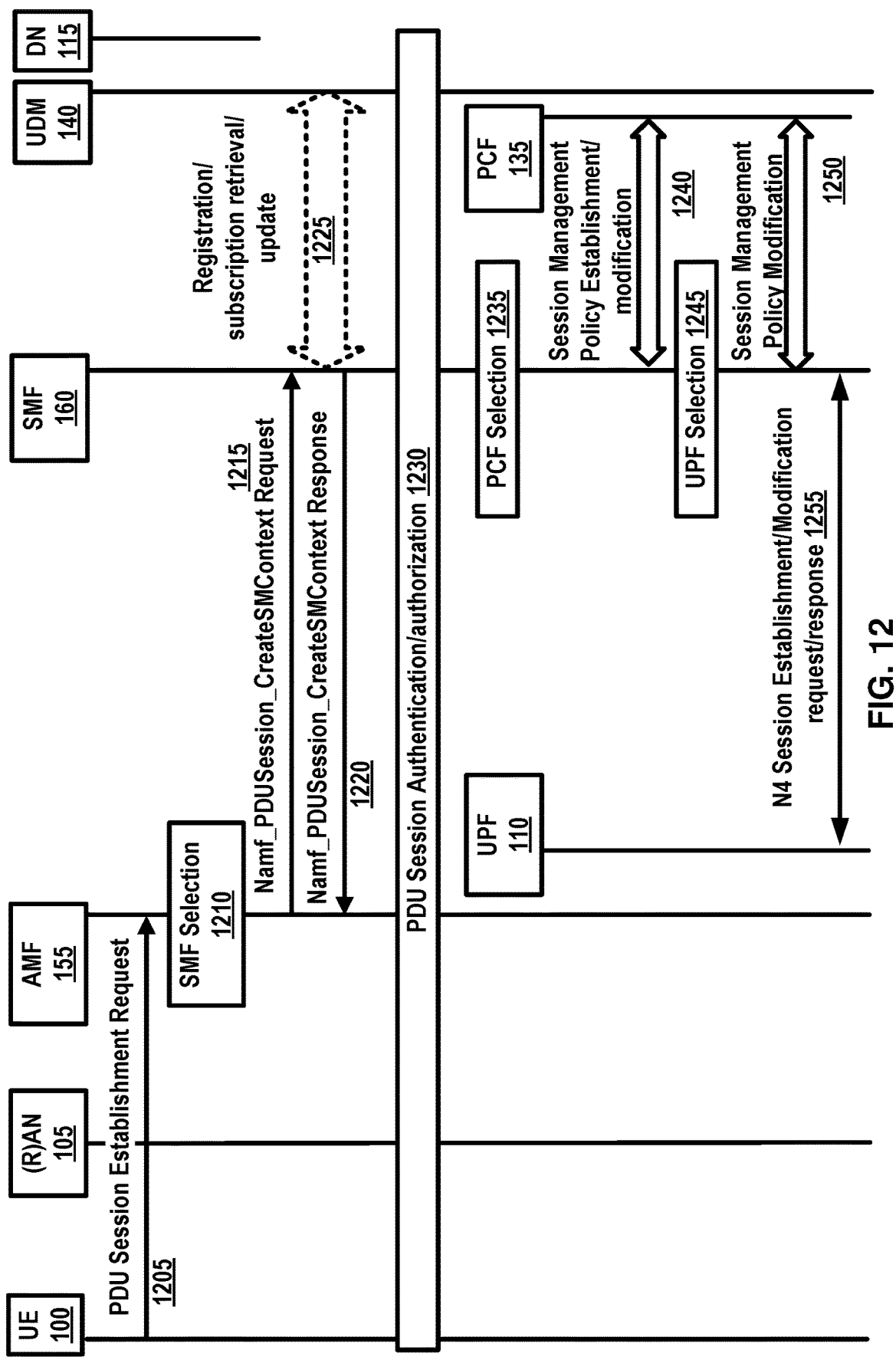
FIG. 12 is an example call flow as per an aspect of an embodiment of the present disclosure.
Figure 13:
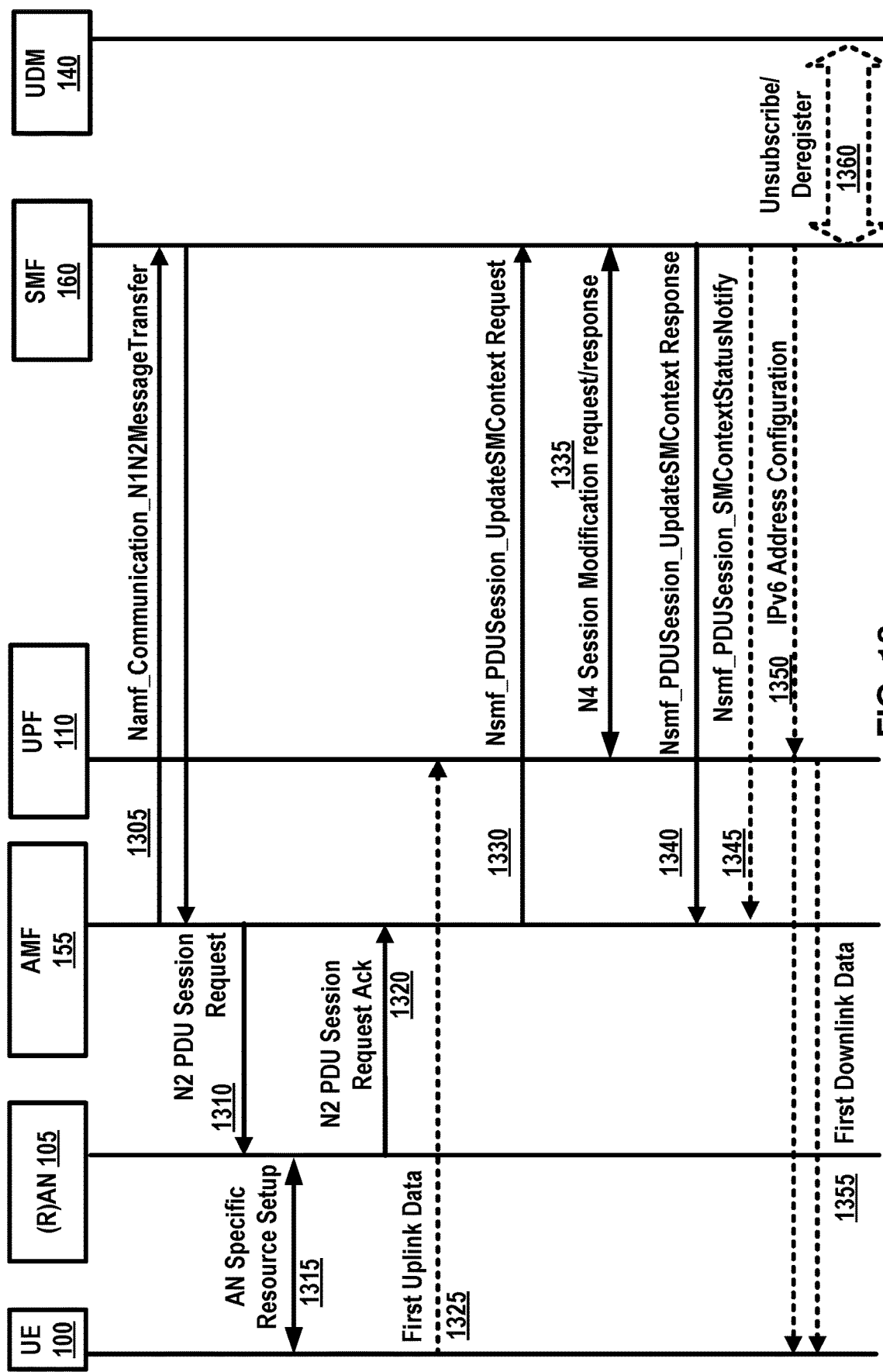
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPT. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with one or more UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for one or more involved RAN 105 nodes, and the QFIs assigned to one or more tunnel endpoints. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

The 5GS may be operated as stand-alone time sensitive networking (TSN) network or part of a non-stand-alone TSN network, e.g. an industrial communication network, and/or the like. 5GS may support three modes of operation as depicted in example FIG. 15. In a fully distributed model shown at the bottom of FIG. 15, the TSN end stations, e.g., talkers and listeners, may communicate TSN stream requirements directly to the TSN network. Each TSN bridge on the path from talker to listeners may propagate the TSN user and network configuration information along with the active topology for the TSN stream to the neighboring bridge(s). The network resources may be managed locally in each TSN bridge. In a centralized network and distributed user model shown in the middle of FIG. 15, the TSN end stations, e.g., Talkers and Listeners, may communicate the TSN stream requirements directly to the TSN network. The TSN stream requirements are forwarded to a centralized network configuration (CNC). The TSN bridges may provide their network capabilities information and active topology information to the CNC. The CNC may have a complete view of the TSN network and is enabled to compute respective end-to-end communication paths from a talker to the listeners that fulfil the TSN stream requirements as provided by the end stations. The computation result may be provided by the CNC as TSN configuration information to each TSN bridge in the path between involved TSN end stations (Talkers to the Listeners) as network configuration information. In a fully centralized model shown at the top of FIG. 15, the TSN end stations, e.g., Talkers and Listeners, may communicate the TSN stream requirements to a centralized user configuration (CUC). The CUC may adapt the TSN end station stream requirements before forwarding them to the CNC. The CNC performs the same actions as described in the centralized network/distributed user model, except that CNC may send specific TSN configuration information to the CUC. The CUC may determine/derive the TSN configuration information for the TSN end stations and notify them accordingly.

In an example, a TSN system may employ 5GS as a TSN link, as a TSN bridge, and/or the like. The TSN system may be integrated with a 5GS.

Figure 17:
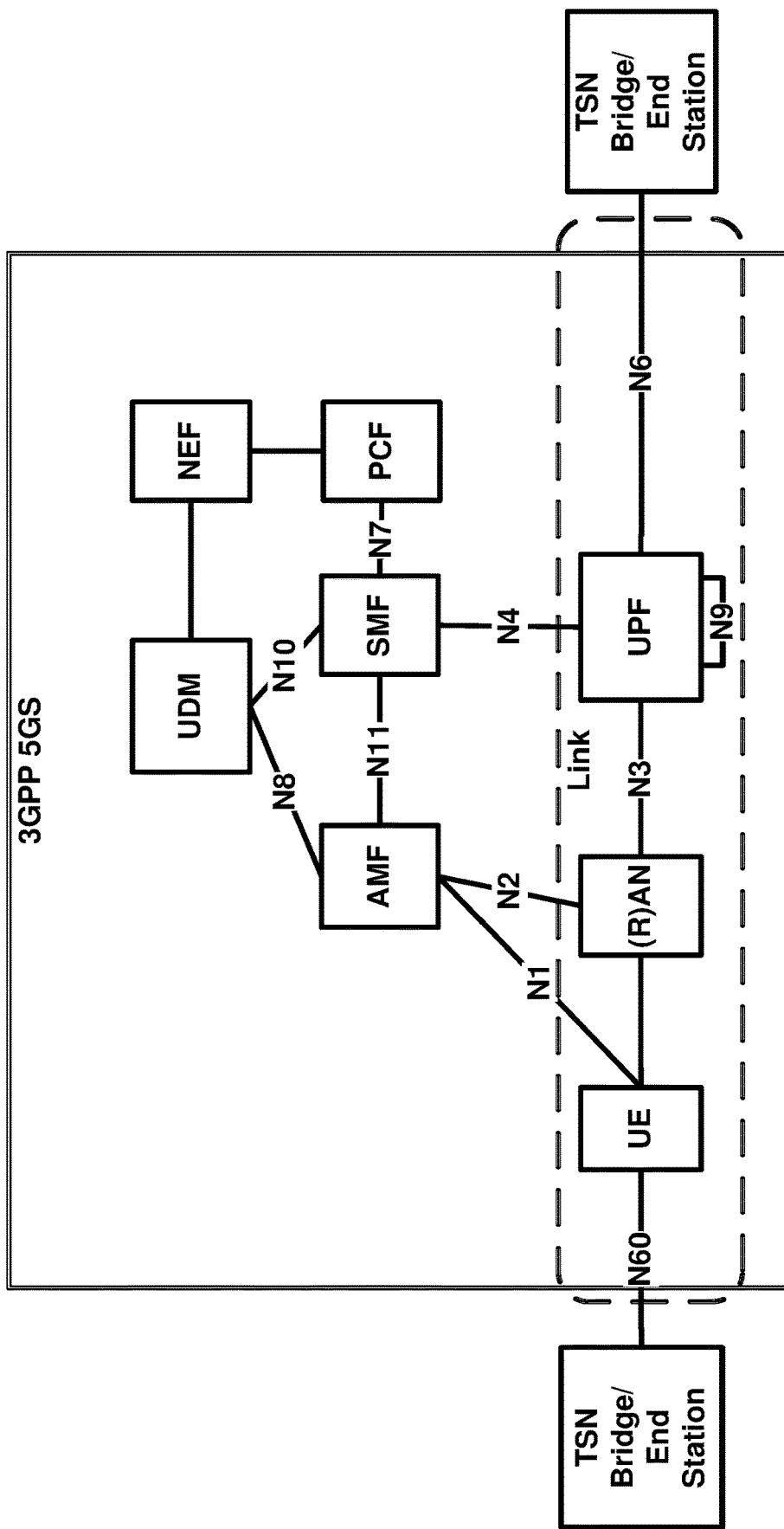
FIG. 17 is an example diagram as per an aspect of an embodiment of the present disclosure.

As depicted in example FIG. 17, the 5GS may be employed to the external network as a TSN link, e.g., as an Ethernet connection/link between a UE and a UPF. The link may be defined by the connected entities, i.e. either two TSN bridges or a TSN end station and a TSN bridge, two TSN end stations, and/or the like. The link capabilities may be described by the ingress/egress ports of the TSN bridges connected to the end of a link or by the TSN streaming requirements of a TSN end station directly connected to the link. The exposed capabilities may comprise delay information, link speed, available bandwidth information, and/or the like.

Figure 18:
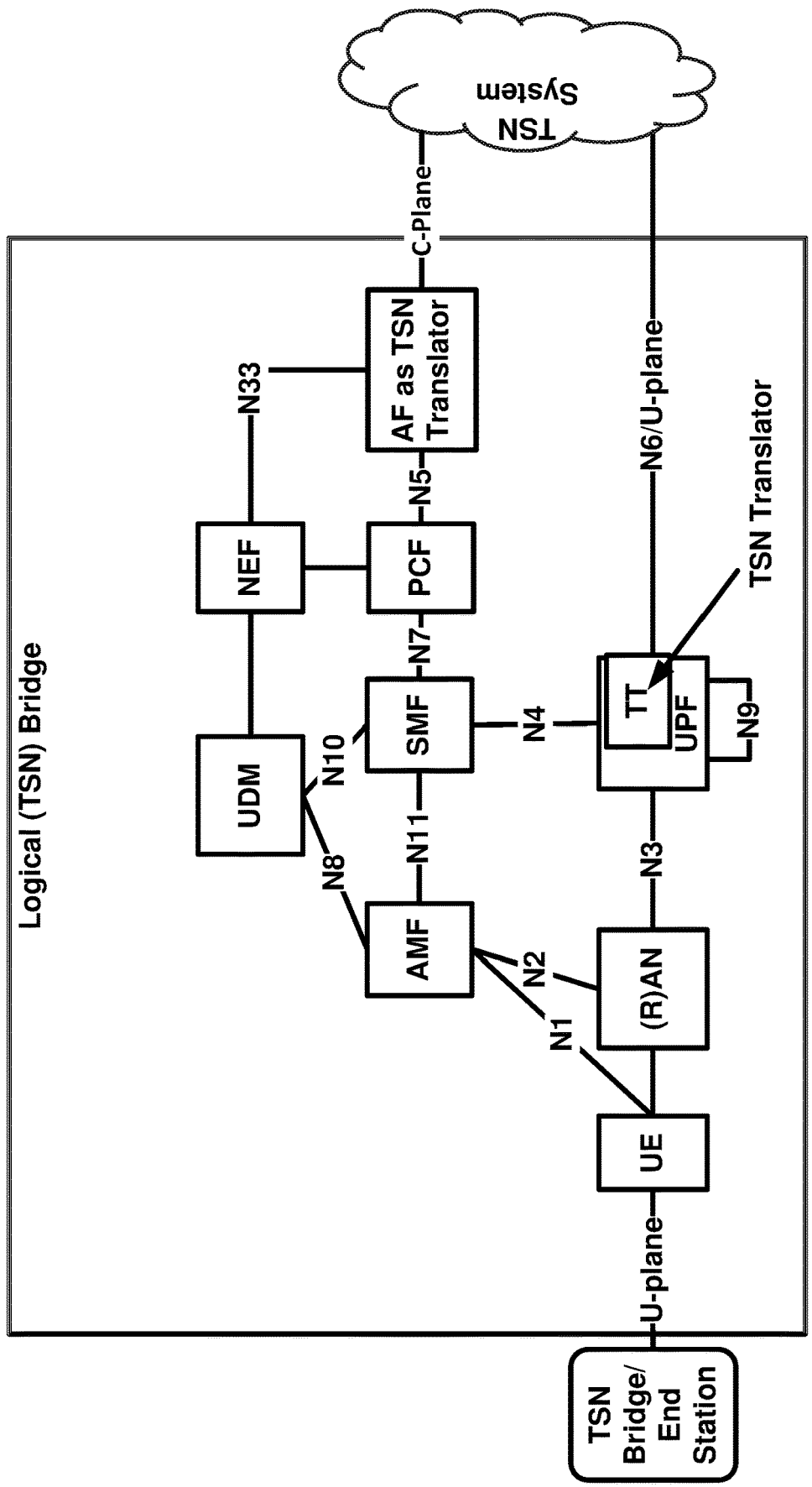
FIG. 18 is an example diagram as per an aspect of an embodiment of the present disclosure.
Figure 19:
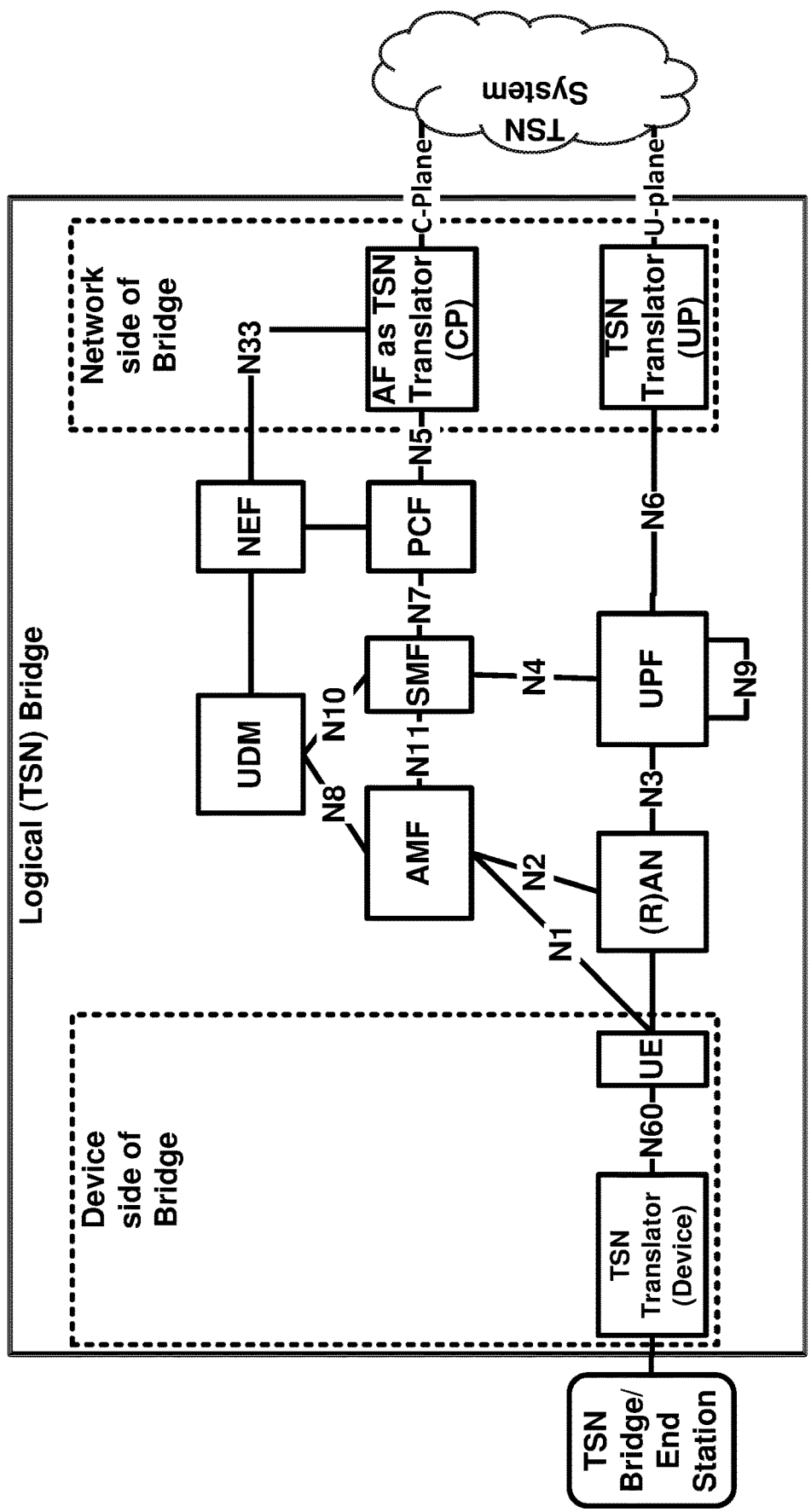
FIG. 19 is an example diagram as per an aspect of an embodiment of the present disclosure.

In an example as depicted in FIG. 18 and FIG. 19, 5GS may be employed as a TSN bridge. The 5GS may receive TSN related reservation requests using a 5G QoS framework. The 5GS may employ 5G internal signaling to satisfy TSN reservation requests. When the 5GS is deployed as a TSN bridge (e.g., logical TSN bridge), the TSN bridge may comprise an adaptation function to translate the 5GS protocols and information objects to TSN protocols and information objects and vice versa. The 5GS bridge may provide TSN ingress and egress ports via a TSN Translator (Device) on the UE side and via the "TSN Translator" (CP and UP) on the CN side towards the DN. The 5GS bridge may support different TSN configuration models. In an example, one or more TSN compliant interfaces may be employed by the TSN bridge with the respective protocols towards TSN end stations, TSN bridges, CNC, CUC, and/or the like on the control plane and/or user plane. The TSN bridge self-management and the functions required to interact with CNC may be located at the network translator.

Figure 20:
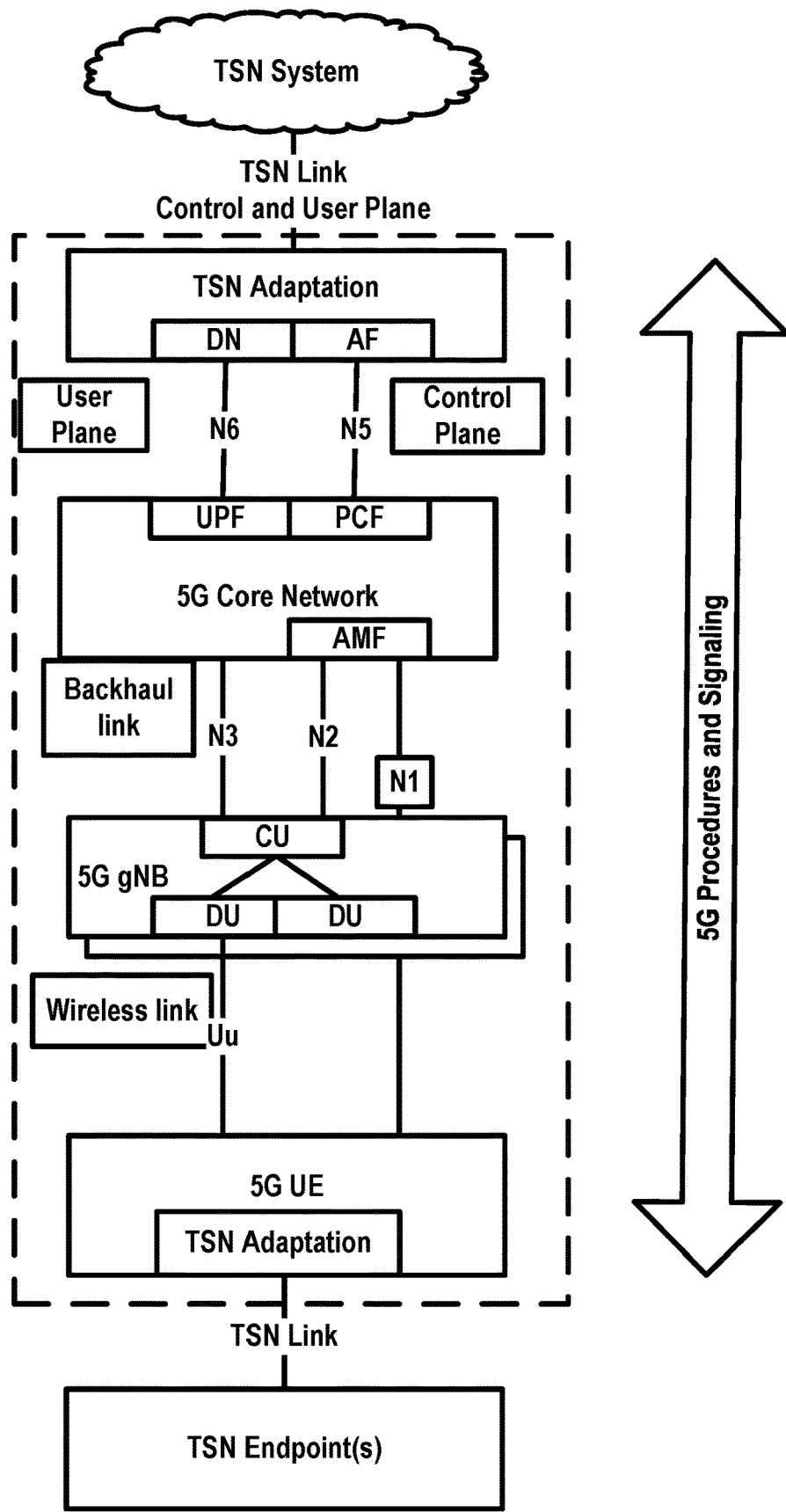
FIG. 20 is an example diagram as per an aspect of an embodiment of the present disclosure.

In an example, as depicted in FIG. 20, a 5GS may be integrated with a TSN system. When the 5GS is integrated with the TSN system, individual nodes of the 5GS (e.g. UPF, gNB, and/or the like) may interact with TSN procedures initiated by TSN end-points and TSN controllers. This allows the 5GS and associated infrastructure to present itself as multiple TSN-compatible end-points.

Figure 14:
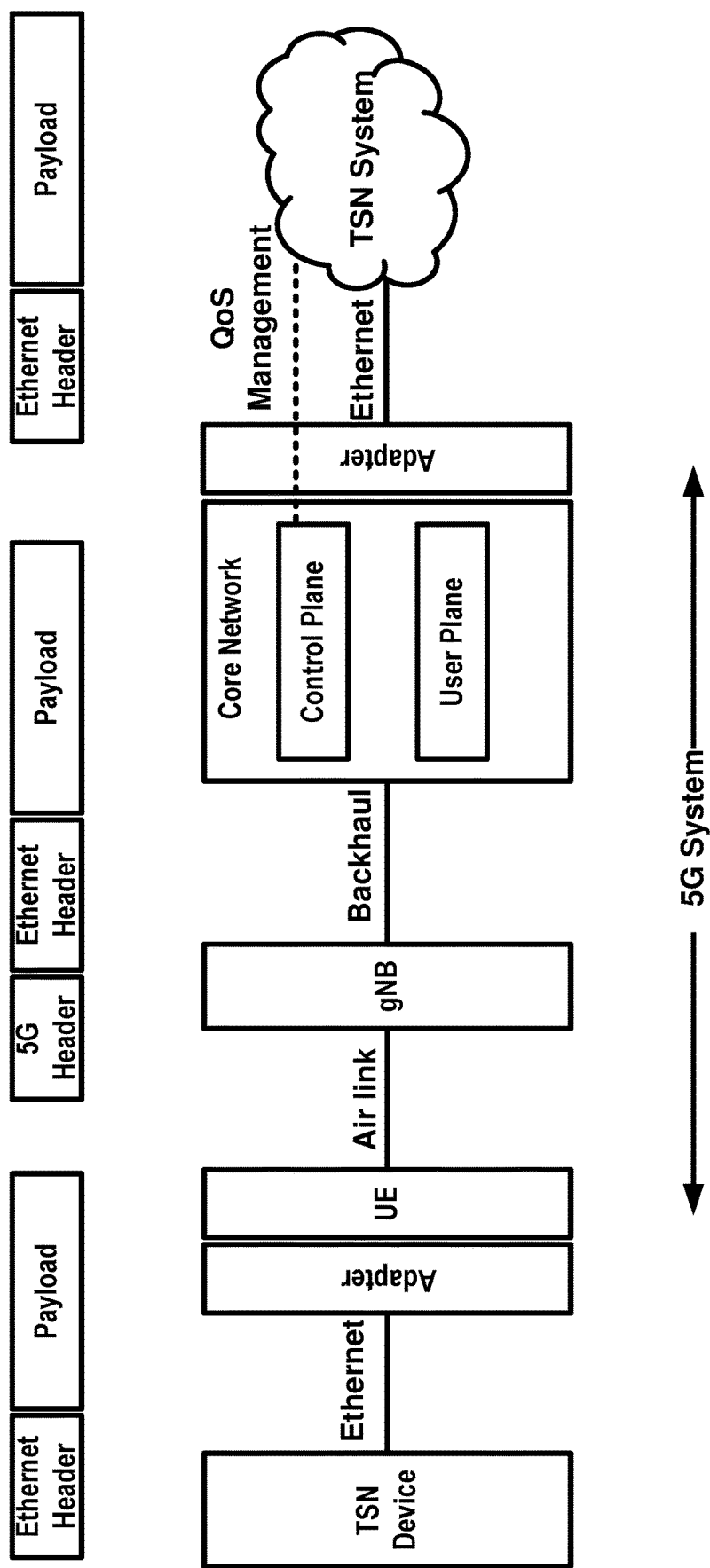
FIG. 14 is an example diagram as per an aspect of an embodiment of the present disclosure.
Figure 16:
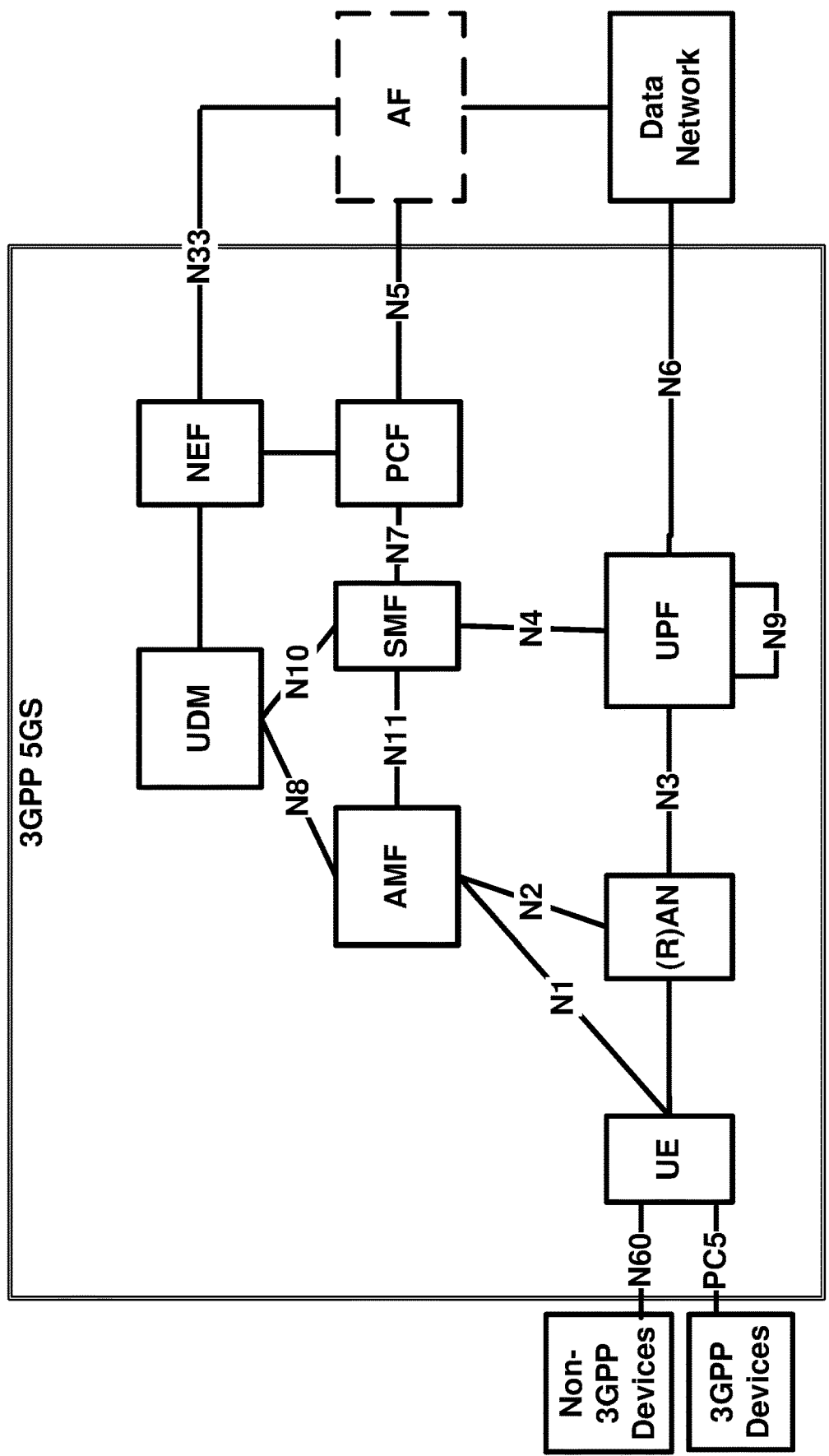
FIG. 16 is an example diagram as per an aspect of an embodiment of the present disclosure.

As depicted in an example FIG. 14, 5GS may be integrated with a TSN system. The TSN system may generate control and data traffic and send to the 5GS. Control and data traffic may comprise TSN QoS information, stream information, port information, and/or the like. Ethernet frames and/or headers may be mapped to or encapsulated within 5G frames/packets and sent via an air interface to the 5GS. A 5G radio with an integrated Ethernet adapter may be connected to a wireless device (UE).

In an example embodiment, a 3GPP network may support derivation of TSN bridge delay managed object attributes (e.g., independentDelayMin/Max, dependentDelayMin/Max, and/or the like) for a 3GPP bridge based on 3GPP attributes, e.g., QoS flow packet delay budget (PDB) values, guaranteed flow bit rate (GFBR), the maximum data burst volume (MDBV) indicated in the QoS profile, and/or the like. Mapping of 3GPP attributes to TSN capabilities may be in the SMF and/or PCF and the exposure of capabilities towards TSN bridge may be via NEF, SMF, PCF, and/or the like.

In an example, a TSN bridge delay managed object may comprise frame length-related attributes per tuple (ingress port, egress port, traffic class). Frame length-related attributes may comprise: independentDelay Min/Max (e.g., incurred bridge delay independent of the frame size (typically in ns)), dependentDelay Min/Max (e.g., incurred bridge delay per base volume (typically in ps per byte)), and/or the like.

Figure 21:
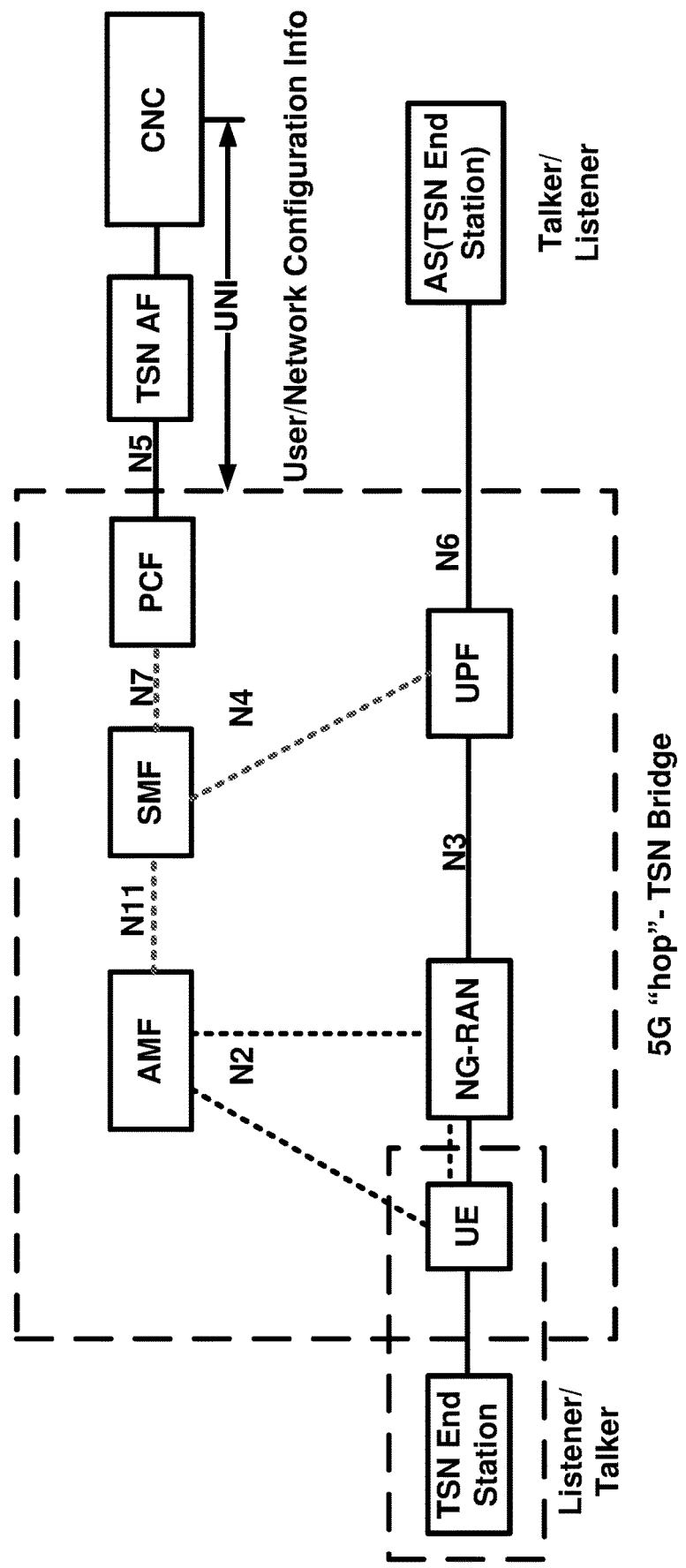
FIG. 21 is an example diagram as per an aspect of an embodiment of the present disclosure.

In an example as depicted in FIG. 21, when centralized model or the fully centralized model and the centralized network/distributed user model is employed in TSN network, the 5GS may be enhanced to act as a TSN bridge in the network. An AF may act as a controller function to collect 5GS virtual bridge related information and register it to CNC via TSN defined application interfaces, since the CNC maintains capabilities of each TSN bridge in the TSN network and the topology of the network. In an example, based on the information that the CNC maintains, the CNC may calculate the forwarding and scheduling rules on each bridge for a TSN stream that required by CUC which collects the TSN stream requirements from end stations for fully centralized model. In an example, a control plane based QoS negotiation may be employed. As depicted in FIG. 21, the CNC may negotiate with a PCF through the TSN AF to generate a TSN-aware QoS profile for a stream. The TSN AF may convert TSN traffic characteristics to TSN QoS requirements, TSN QoS Profile, and/or the like.

In an example, for the control plane based solution, the AF may act as a controller function to collect 5GS virtual bridge related information (e.g. AF receives the information from SMF and may register it to CNC via TSN defined application interfaces). The information may comprise: bridge identity, port identities, bridge delay, sending delay, bridge related topology information, and/or the like. In an example, bridge identity may identify a TSN bridge in the TSN network. In an example, ports identities may identify ports in a TSN bridge. Bridge delay may comprise a delay value of frames as they pass through the bridge, that may comprise maximum and minimum of independent and dependent delay. Sending delay may be the delay for a frame transmitted from a TSN bridge port to a neighboring port on a different bridge. Bridge related topology may comprise the bridge and port identities and port capabilities of a TSN bridge and neighboring bridges. In an example, identities of the virtual bridge and related ports of the UPF may be preconfigured on the UPF and may be reported to the AF via the SMF when the UPF sets up. The UE or PDU session may be virtualized to be a virtual port on the virtual bridge with a (unique) identity that may be allocated by the SMF or the UPF. The TSN AF may interact with the 5G CN and may perform the mapping between TSN network parameters and a new deterministic QoS profile for the 5GS, negotiate the traffic treatment and related QoS policies, and/or the like. In an example, the TSN AF may directly talk to the other 5GC NFs or via the NEF.

In an example, 5GS virtual bridge information may comprise bridge ID, port IDs, bridge internal information (e.g., bridge delay) and bridge port related information (e.g., propagation delay), and/or the like. Information for 5GS virtual bridge may be reported to AF by 5GS control plane, like the bridge ID, port IDs, bridge internal information (e.g., bridge delay) and bridge port related information (e.g., propagation delay), and/or the like.

Figure 28:
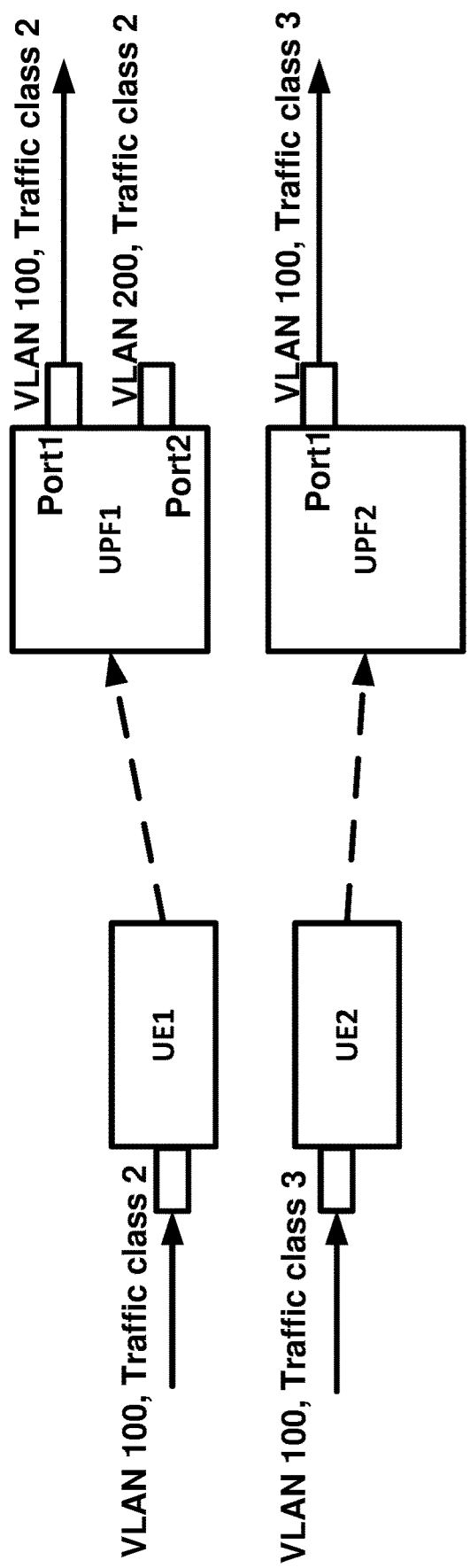
FIG. 28 is an example diagram as per an aspect of an embodiment of the present disclosure.

In an example as depicted in FIG. 28, the 5GS virtual bridge may be per UPF, per TSN network (indicated by DNN), and the 5GS virtual bridge user plane may comprise UPF ports and the UE ports connected to such UPF ports via PDU session. Identities of the virtual bridge and related UPF ports may be preconfigured on UPF and may be reported to AF through SMF when UPF sets up or the PDU Session is established. The UE port identity may be unique in a 5GS virtual bridge and the UE port identity may be allocated by UPF. The UPF port and UE port related information may be reported to AF by SMF directly or via NEF. The UPF port related information may be reported to the SMF by UPF using the node level signaling or PDU session level signaling. The UE port related information may be reported by UE to the SMF over NAS or over UP of its corresponding PDU session. In an example, a UE may operate in switch mode, Ethernet switch mode, and/or the like. In an example, the UE port of 5GS virtual bridge may be the physical port of UE, virtual port/interface of the UE, and/or the like.

In an example, traffic scheduling in TSN bridge may be per traffic class, which is service level of packets transmission. A TSN bridge port may support different traffic classes. In an example, if the TSN bridge is aware of VLAN, a TSN bridge port may support different VLANs. When SMF selects the UPF for the PDU Session, it may consider the UE subscribed traffic classes and VLANs.

As depicted in example FIG. 28, UPF1 and UPF2 support different VLANs and traffic classes based on deployment. When UE1 and UE2 establish PDU session, the UPF1 and UPF2 are selected respectively to meet their subscribed VLANs and traffic classes. As the bridge delay defined in 802.1QCC is per traffic class per port pair, the UPF may determine the right port pairs to serve the PDU session, and the SMF may report bridge delay on such port pairs. For UE1 in the figure for example, the UPF1 may determine the Port1, which supports traffic class 2, VLAN 100 requested by UE1, to serve the PDU Session. Then SMF may report the bridge delay of traffic class 2 for port pair (UE1 port and UPF1 Port1).

Figure 29:
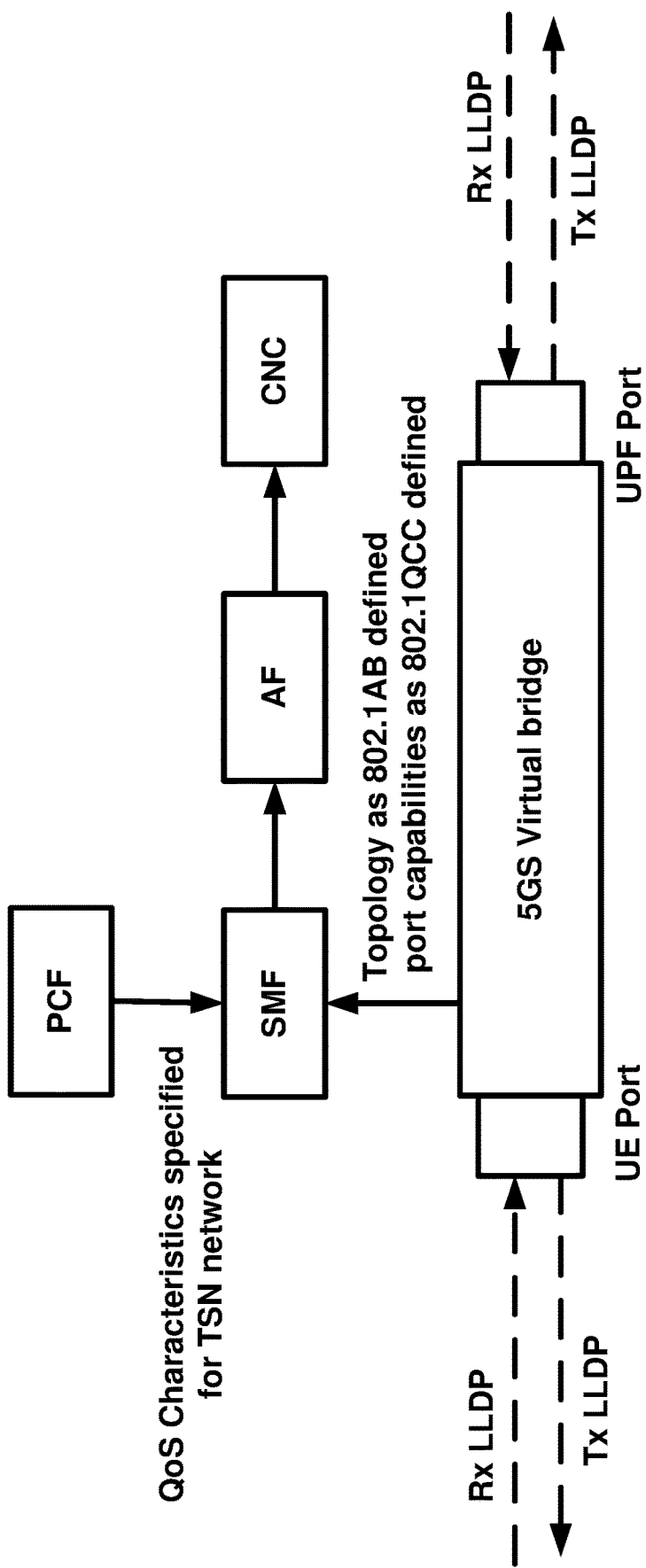
FIG. 29 is an example diagram as per an aspect of an embodiment of the present disclosure.
Figure 30:
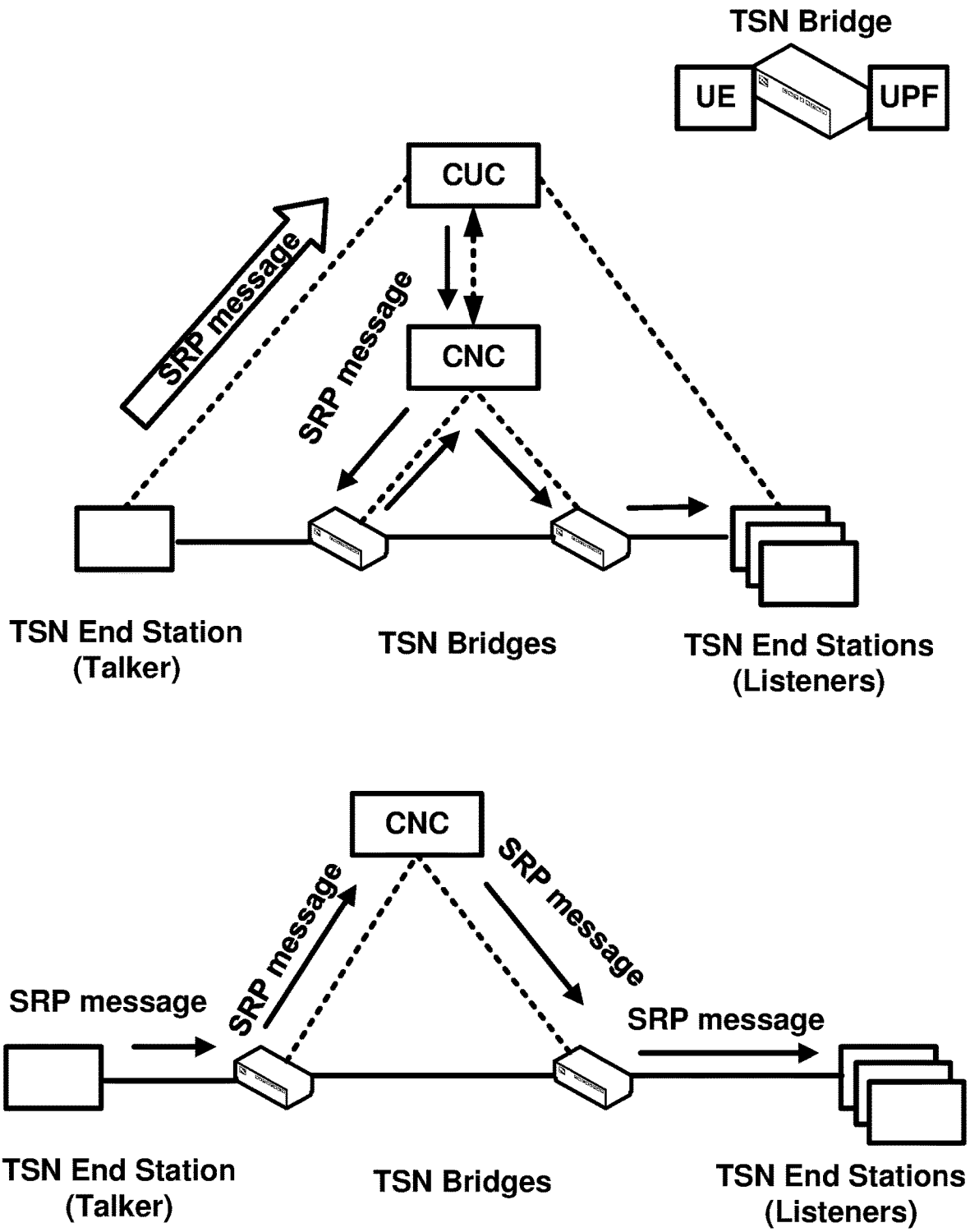
FIG. 30 is an example diagram as per an aspect of an embodiment of the present disclosure.
Figure 31:
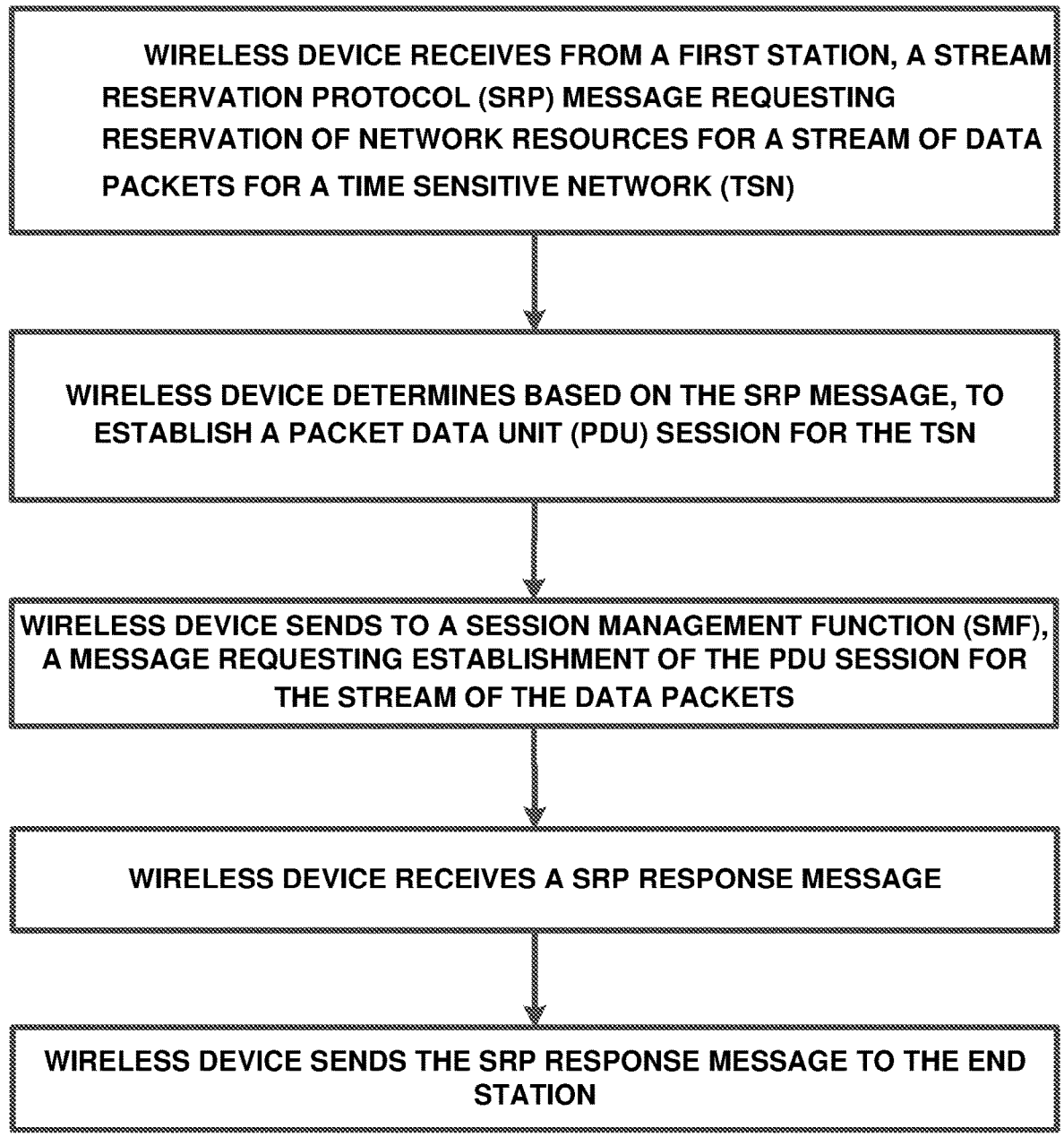
FIG. 31 is an example call flow as per an aspect of an embodiment of the present disclosure.
Figure 32:
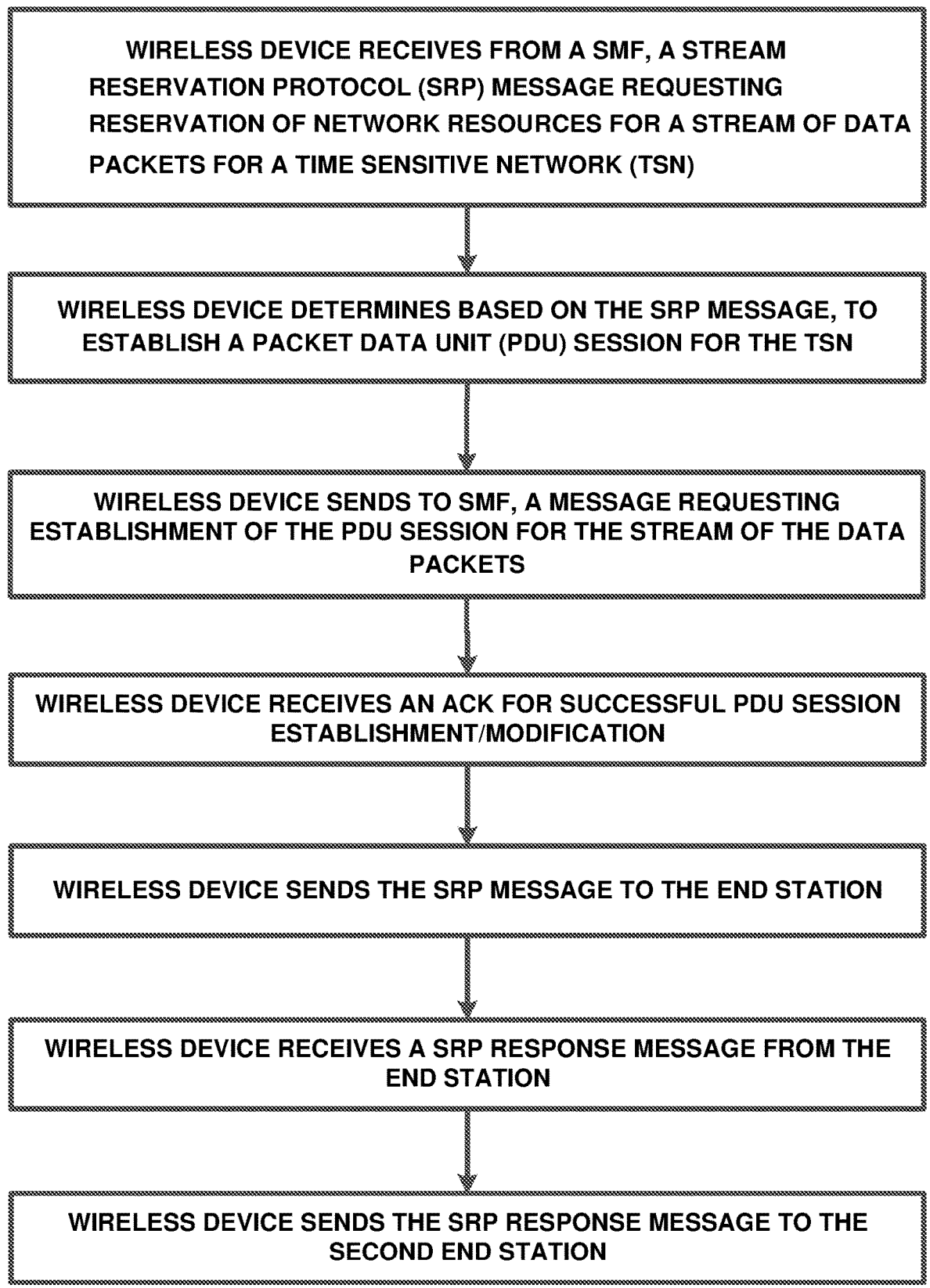
FIG. 32 is an example call flow as per an aspect of an embodiment of the present disclosure.
Figure 33:
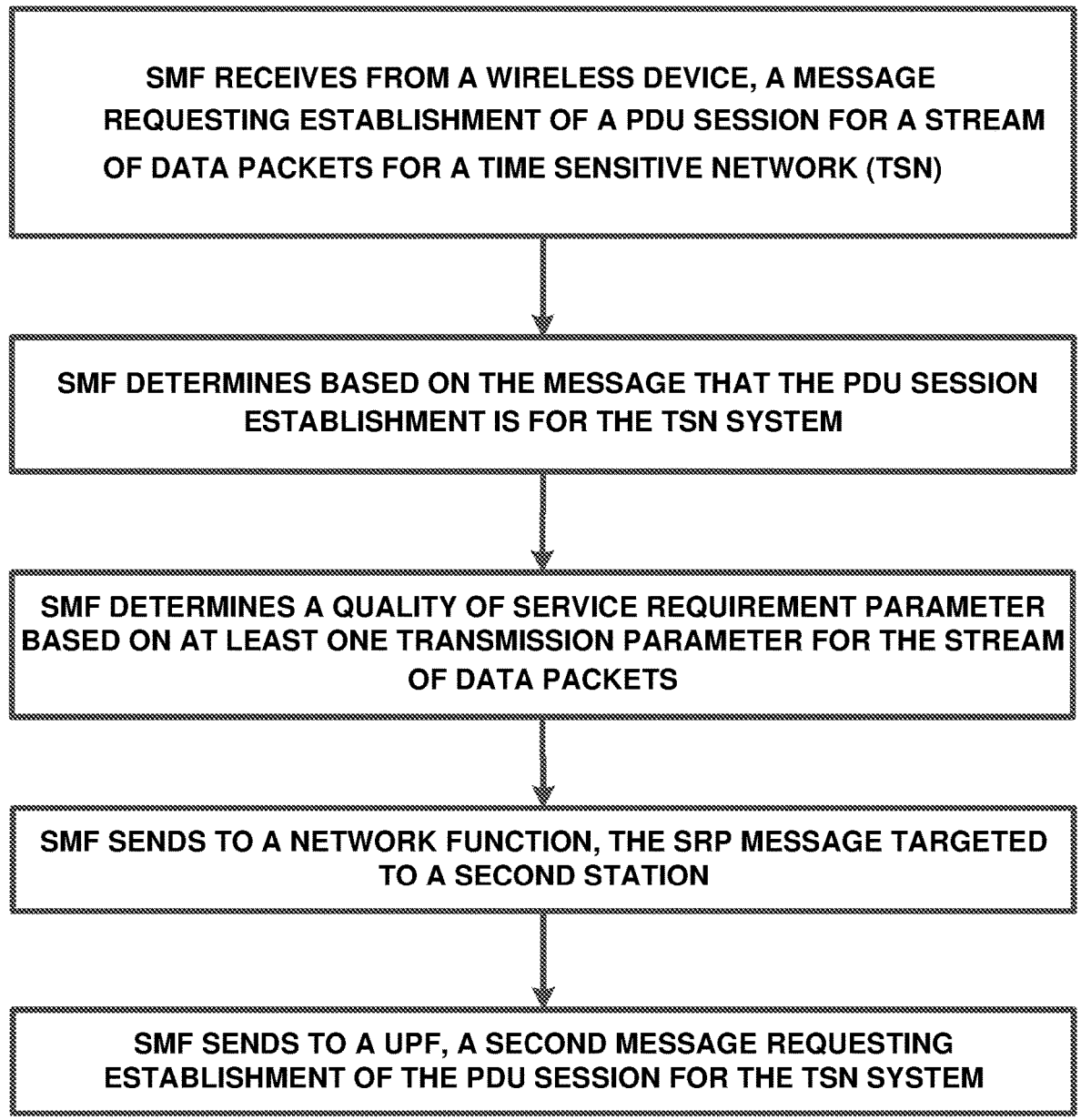
FIG. 33 is an example call flow as per an aspect of an embodiment of the present disclosure.

In an example as depicted in FIG. 29, for 5GS virtual bridge topology discovery, the UPF and UE may report topology information as 802.1AB defined to SMF when received link layer discovery protocol (LLDP) packets from one or more devices (e.g., UE, end station, TSN device, Ethernet device, and/or the like). The topology information may be reported when it is discovered at the first time or when it is changed/modified. The UPF and UE may send LLDP packets in order to enable the one or more devices discovering/reporting the 5GS virtual bridge. One or more port of 5GS virtual bridge may support sending LLDP or receiving LLDP. For propagation delay and port capabilities as 802.1Qcc defined, the UPF and UE may report them to SMF similar as topology information reporting. The 5GS may support TSN network specific QoS characteristics and the mapping between such QoS characteristics and the traffic classes. Packet delay budget (PDB) in the QoS characteristics may be employed to realize the maximum latency transmission for deterministic delivery. The SMF may get the QoS characteristics for UE's subscribed traffic classes and SMF may employ the PDB in them as the bridge delay for the corresponding traffic class on the port pair. The AF may collect/gather/obtain/receive and may maintain 5GS virtual bridge related information. The AF may act as the control plane of the 5GS virtual bridge, and may register or update those information to CNC as 802.1Qcc and 802.1AB defined. For QoS profile generation, the AF may maintain the relationship between UE ID, 5GS virtual bridge ID and UE port ID. The AF may determine/find the corresponding UE ID when receiving TSN stream rule (Bridge ID, Ingress port ID, Egress port ID, Stream description, stream id, and/or the like) from CNC. The AF may determine the traffic class in the TSN stream rule and map the traffic class to corresponding 5QI.

In an example embodiment, a TSN bridge may report capabilities. In an example, identities of 5GS virtual bridge and UPF ports may be pre-configured on UPF based on deployment. The UPF may report its port capabilities and propagation delay as 802.1Qcc defined, the topology information as 802.1AB defined, and the corresponding DNN to SMF using node level singling, and the SMF may forward the received information to the AF directly or via NEF in order to generate or update the 5GS virtual bridge and bridge port. The UE may send PDU session establishment request to the AMF. The AMF may select a SMF for the PDU Session. The SMF may receive the UE subscribed traffic classes and VLANs from the UDM, and may receive the QoS characteristics (e.g., 5QI, PDB) corresponding to the subscribed traffic classes from PCF. The SMF may select a UPF to support the subscribed traffic classes and subscribed VLANs. The SMF may send N4 session establishment request to UPF with DNN, traffic class IDs and VLAN values to request for allocating UE port ID and determining serving UPF ports. The UPF may determine the 5GS virtual bridge for the PDU session, and may allocate an identity for UE port. Based on the traffic classes and VLANs that UPF port supports in the DN, the UPF may determine the UPF ports to serve the PDU session. The UPF may send the allocated UE port identity with corresponding 5GS virtual bridge identity, the serving UPF port IDs with corresponding traffic class IDs, and/or the like to the SMF. The SMF may send the PDU session related 5GS virtual bridge ID and may allocate UE port ID to UE. The information may be employed for UE to perform topology discovery and information reporting. The SMF may take the PDB in QoS characteristics as the bridge delay for corresponding traffic class and port pair, and may send the 5GS virtual bridge related information (bridge delay, UE port ID, UPF port ID, traffic class, 5GS virtual bridge ID, UE ID) to the AF or via NEF in order to add the UE port or update the bridge properties.

In an example, when the PDU session is established, the UE may report its port capabilities and propagation delay as 802.1Qcc defined and report the topology information as 802.1AB defined to SMF over NAS or user plane. The AF may receive/collect/gather and may maintain the 5GS virtual bridge properties including bridge ID, port ID of UPF ports, port ID of UE ports, port related capabilities and bridge delay of port pairs, and/or the like. The AF may send the 5GS virtual bridge properties to CNC to create a TSN bridge or update the bridge when the bridge properties are changed.

In an example embodiment, the UE may operate as an Ethernet switch. The SMF may configure the UE to operate as an Ethernet switch with configuration parameters provided during the establishment of a PDU Session, or configuration of the TSN bridge. The PDU session may provide access to the end station via the TSN bridge to communication with one or more end stations. The UE operating as an Ethernet switch may be part of one or more TSN systems. One or more backend devices may be connected to the UE operating as an Ethernet switch. In an example, the SMF may provide configuration parameters to the UE in switch mode. The configuration parameters may comprise an indicator whether the UE in Ethernet switch mode may turn on or off the Spanning Tree Algorithm, a periodic timer of sending BDPU messages, a bridge identifier of the UE in Ethernet switch mode, an indicator whether the UE in Ethernet switch mode may notify the change of port's status, an indicator whether the UE in Ethernet switch mode may report the list of MAC address(es) of the TSN end stations, backend devices, and/or the like connected in the backend networks.

In an example, if the SMF indicates to the UE to report the list of MAC address(es) of the backend devices or the TSN end stations, the UE in switch mode may obtain the list of MAC address(es) of the backend devices connected or changed in the backend networks. In an example, when one PDU session provides communication for more than one TSN systems, the UE may obtain/determine the mapping relationship of MAC address(es) and the TSN systems. The UE may inform the SMF of the list of MAC address(es) and the mapping relationship during the PDU session establishment/modification procedure when the UE receives the indicator or detects the changes on the backend devices. The SMF may provide to the UPF Ethernet packet filter set and forwarding rule(s) based on the MAC address(es) and the mapping relationship. The UPF may detect and forward Ethernet frames based on the Ethernet packet filter set and forwarding rule(s) received from the SMF.

In an example, the UE in Ethernet switch mode may report its port states that may result from the execution of the spanning tree algorithm, and/or the like so that the SMF may control the UPF's port states based on the report to prevent the waste of network resources.

In an example, the UPF may support S-tag (IEEE 802.1ad), C-tag (IEEE 802.1q). In an example, a PDU session may provide access to one or more TSN systems, TSN end station, and/or the like. S-tag and/or C-tag for the stream of data packets may be employed. TSN system configurations may be pre-configured on the UE or provided to the UE by the network e.g., SMF, and/or the like. In an example, a TSN system identifier may be employed to identify the TSN system, one or more TSN end stations, and/or the like. In an example, the operator may assign the list of TSN systems or TSN end station identifiers for the UEs. The identifiers may be configured in the UDR, UDM, and/or the like. The SMF may be configured by the operator to have the mapping tables for TSN identifiers, VLAN ID, C-tag, S-tag, and/or the like. The SMF may map the list of the TSN end station identifiers connected to the UE, which is notified through the procedures of PDU Session establishment, into the S-tag and C-tag, and packet filter for the uplink traffic. The UPF may insert S-tag and C-tag onto the traffic, which is sent to N6, and/or the like based on the packet filter for the uplink traffic.

In an example embodiment, a UE may receive a SRP message from an end station. The UE may map the SRP message to 3GPP QoS parameters. The UE may initiate the PDU session establishment procedure to request a PDU session for the TSN system, TSN end station that supports the QoS parameters derived from the SRP.

In an example, a 3GPP system, 5GS, and/or the like may be employed to act as a TSN bridge. A TSN system may transmit and receive data packets, a stream of data packets, and/or the like with network resource requirements determined by an SRP message, SRP advertisement, talker advertisement, and/or the like. Existing technologies require a PDU session to be established before the SRP propagation between the TSN end stations. The existing technologies do not provide mechanisms to transmit an SRP message before PDU session establishment, which may result in excessive signaling and inefficient usage of network resources. Embodiments of the present disclosure provide mechanisms to enhance the performance of TSN systems, TSN bridge configuration, and/or the like.

In an example embodiment, a first station (e.g., a TSN end station) may send a SRP message, talker advertisement, a resource reservation request, and/or the like to a wireless device or a UE. The TSN end station may send the SRP message via a TSN translator device, a TSN adapter device, and/or the like to the UE. The TSN translator device or the TSN adapter device, may translate TSN protocols and information objects to the 5GS protocols and information objects (and vice versa). The TSN translator device or the TSN adapter device may employ a 3GPP radio with integrated Ethernet adapter. In an example, the UE may employ an integrated Ethernet adapter, TSN translator, and/or the like. In an example, the first station, the TSN end station, and/or the like may be a 3GPP device/UE, non-3GPP device/UE, gateway, residential gateway, ethernet switch, virtual switch, a virtual UE supporting 3GPP and/or non-3GPP interface, and/or the like. When the TSN end station is a 3GPP device, the interaction between the TSN end station and the UE may be via a PC5 interface, PC3 interface, a device to device (D2D) interface, and/or the like.

In an example, the SRP message (e.g., sent from the TSN end station to the UE) may comprise a stream ID, data frame parameters, traffic specification (TSpec), priority and/or rank, accumulated latency, and/or the like.

In an example, the stream ID may be an identifier to identify a stream. The stream ID may be one or more (e.g., eight) octets uniquely identifying the stream. In an example, the stream ID may be subdivided into a 48-bit MAC address associated with the Talker and a 16-bit unique ID used to differentiate different streams sourced by the same Talker. In an example, the stream ID may employ other encodings of the one or more (e.g., eight) octets.

In an example, the data frame parameters may be addressing information for the stream that will be used to configure the bridge's filtering tables for reservation entries. This parameter may further comprise a destination MAC address, a VLAN identifier, and/or the like. In an example, the destination MAC address may be the destination MAC address of streaming data packets. In an example, the destination MAC address may be a multicast or locally administered address. In an example, the VLAN Identifier may identify the VLAN that is employed for the streaming data packets.

The traffic specification (TSpec) for a stream may be employed to configure the stream traffic shaping mechanism in the bridge on the ports associated with the stream. The TSpec may further comprise a maximum frame size parameter (e.g., MaxFrameSize), a maximum interval frames parameter (e.g., MaxIntervalFrames), and/or the like. In an example, the maximum frame size parameter may comprise a value or parameter indicating the maximum frame size that a talker (TSN end station) may produce as part of the stream. The maximum interval frames parameter may be the number of frames that the talker may produce per class measurement interval.

In an example, the priority and rank (e.g. PriorityAndRank) may comprise information about the priority class and the emergency status of a stream. The priority and rank may comprise a data frame priority, a rank value, and/or the like. The data frame priority may be employed to generate the Priority Code Point (PCP) tag for the data stream. The rank may be one or more bit(s) to identify emergency vs. non-emergency streams (e.g., emergency streams use the value 0, non-emergency may use 1).

In an example, the accumulated latency may indicate a worst-case latency that a stream may encounter from a talker to listener. This value may change after it has been registered by a participant. If a participant is sent an attribute that has had the accumulated latency change from its previously registered value, it may modify/change the attribute propagation from Talker Advertise to Talker Fail with a failure information code (e.g., indicating that reported latency has changed). The talker may initialize this value with an estimate of maximum expected delay between the egress of a packet from the talker's network interface and when it reaches its network peer on its path towards the listener. Each bridge on the path may add the maximum expected delay between packet ingress on its own port and arrival at the next peer on the path.

In an example, when the UE receives the talker advertisement, the SRP message, and/or the like from the TSN end station, the TSN translator, TSN adapter device, and/or the like, the UE may determine to establish a PDU session for stream to be transmitted by the TSN end station. In an example, based on an information element identifying a request type, the UE may determine that a SRP request (e.g., SRP message) is required. The UE may determine to establish a PDU session (e.g., with an indication that the PDU session is for SRP/TSN, and/or the like), and may perform a PDU session establishment procedure. The UE may determine to modify a PDU session for the SRP/TSN and may perform a PDU session modification procedure.

In an example, if the UE may determine that the PDU session establishment procedure is required, the UE may send a NAS Message to an AMF. The NAS message may comprise the SRP message, a PDU session type indicating that the request is for SRP (e.g., type=SRP/TSN), S-NSSAI(s), DNN, PDU Session ID, request type, old PDU session ID, N1 SM container (PDU Session Establishment Request), and/or the like. In an example, the NAS message may comprise an identifier of a TSN system, identifier of one or more bridges (TSN bridges, and/or the like), a port identifier of the UE for the TSN bridge, and/or the like. In an example, the DNN may identify a TSN system, a set/group of TSN bridges, and/or the like.

In an example embodiment, the SRP message may comprise an identifier of the stream of data packets (the stream ID), at least one transmission parameter for the stream of data packets, and/or the like. The at least one transmission parameter for the stream of data packets may comprise data frame parameters, user to network requirement parameters, a priority and rank indication parameter, a latency value, traffic specification parameter, and/or the like. In an example, the data frame parameters may comprise a source MAC address for the stream of data packets, a destination MAC address for the stream of data packets, an identifier of a VLAN, and/or the like. In an example, the user to network requirement parameters may comprise a parameter indicating latency requirements for the stream of data packets, a parameter indicating a redundancy requirement for the stream of data packets, and/or the like. In an example, the latency value may comprise an accumulated latency value, and/or the like. In an example, the traffic specification parameter may comprise a parameter indicating a size of data frame, a parameter indicating number of data frames, and/or the like.

In order to establish a new PDU Session, the UE may generate a new PDU Session ID. The UE may initiate the UE requested PDU session establishment procedure by the transmission of a NAS message containing a PDU session establishment request within the N1 SM container. In an example, the N1-SM container may comprise the SRP message. In an example, the NAS message may comprise a container for a SRP message object. The PDU session establishment request may comprise the SRP message, a PDU session ID, requested PDU session type (e.g., type=SRP), a requested SSC mode, 5GSM capability PCO, SM PDU DN request container, number of packet filters, always-on PDU session request indication, and/or the like. The request type may indicate initial request if the PDU session establishment is a request to establish a new PDU session and may indicate existing PDU session if the request refers to an existing PDU session switching between 3GPP access and non-3GPP access or to a PDU session handover from an existing PDN connection in EPC.

The 5GSM core network capability may be provided by the UE and handled by SMF. The 5GSM capability may comprise a UE integrity protection maximum data rate.

The number of packet filters may indicate the number of supported packet filters for signaled QoS rules for the PDU session that is being established. The number of packet filters indicated by the UE may be valid for the lifetime of the PDU Session.

The NAS message sent by the UE may be encapsulated by the AN in a N2 message towards the AMF. The NAS message may comprise user location information, access type information, and/or the like.

In an example, the UE may include in the NAS message the S-NSSAI from the Allowed NSSAI of the current access type. The S-NAASI may be the allowed NSSAI for a TSN system, one or more TSN bridges, and/or the like. If the Mapping of Allowed NSSAI was provided to the UE, the UE may provide the S-NSSAI from the Allowed NSSAI, the corresponding S-NSSAI from the mapping of allowed NSSAI, and/or the like.

In an example, the UE may establish the PDU session for a AS, AF, a CUC, a CNC, and/or the like. If the UE is establishing a PDU session for the AS, AF, the CUC, the CNC, and/or the like, and the UE is configured to discover the CUC or the CNC address during connectivity establishment, the UE may include an indicator that it requests an identifier of the CUC, the CNC, and/or the like within the SM container.

In an example embodiment, the AMF may determine that the message corresponds to a SRP request, SRP message, and/or the like. The AMF may select an SMF. The AMF may select the SMF based on SMF-ID received from UDM. The AMF may select the SMF based on the PDU session type, e.g., SRP. The AMF may determine that the message corresponds to a request for a new PDU session based on that request type indicates initial request and that the PDU Session ID is not used for any existing PDU Session(s) of the UE. If the NAS message does not contain an S-NSSAI, the AMF may determine a default S-NSSAI for the requested PDU session either according to the UE subscription, if it contains only one default S-NSSAI, or based on operator policy. In an example, the AMF may determine the (default) S-NSSAI based on the identifier of the TSN system, TSN bridge (e.g., bridge ID), and/or the like. In an example, when interaction with a CUC or a CNC is required, the AMF may determine the CUC and/or the CNC based on the S-NAASI, UE subscription, TSN system identifier, and/or the like. In an example, the AMF may select a locally configured CNC or CUC for the TSN bridge. When the NAS Message contains an S-NSSAI but it does not contain a DNN, the AMF may determine the DNN for the requested PDU Session by selecting the default DNN for this S-NSSAI if the default DNN is present in the UE's Subscription Information; otherwise the AMF may select a locally configured DNN for this S-NSSAI. If the AMF cannot select an SMF (e.g. the UE provided DNN is not supported by the network, or the UE provided DNN is not in the Subscribed DNN List for the S-NSSAI and wildcard DNN is not included in the Subscribed DNN list), the AMF may reject the NAS Message containing PDU session establishment request from the UE with an appropriate cause.

In an example embodiment, the AMF may send to the SMF a session creation request. In an example, the session creation request may comprise Nsmf_PDUSession_CreateSMContext Request, Nsmf_PDUSession_UpdateSMContext Request, and/or the like. The Nsmf_PDUSession_CreateSMContext Request may comprise the SRP message, PDU session type (e.g., type=SRP), the identifier of the TSN system, the identifier of the TSN bridge, the bridge ID, the port ID, a SUPI, DNN, S-NSSAI(s), PDU Session ID, AMF ID, Request Type, PCF ID, Priority Access, N1 SM container (PDU Session Establishment Request), User location information, Access Type, PEI, GPSI, UE presence in LADN service area, Subscription For PDU Session Status Notification, DNN Selection Mode, Trace Requirements, and/or the like. In an example, the Nsmf_PDUSession_UpdateSMContext Request may comprise the SRP message, PDU session type (e.g., type=SRP), the identifier of the TSN system, the identifier of the TSN bridge, the bridge ID, the port ID, the SUPI, DNN, S-NSSAI(s), PDU Session ID, AMF ID, Request Type, N1 SM container (PDU session establishment request), user location information, access type, RAT type, PEI, and/or the like.

In an example, the AMF ID may be the UE's GUAMI which identifies the AMF serving the UE. The AMF may forward the PDU Session ID together with the N1 SM container containing the PDU session establishment request received from the UE. The GPSI may be included if available at AMF. The AMF may determine access type and RAT type based on a global RAN Node ID associated with the N2 interface.

In an example, the AMF may provide the PEI when the UE is in limited service state and has registered for emergency services (i.e. emergency registered) without providing a SUPT.

In an example, the SMF may receive an establishment cause from the AMF. The establishment cause may indicate that the PDU session may be for SRP, SRP message, SRP procedure, a TSN system resource reservation, and/or the like. When the SMF receives the establishment cause from the AMF as part of AN parameters during a registration procedure or Service Request procedure is associated with priority services (e.g. TSN, SRP, MPS, MCS), the AMF may include a message priority header to indicate priority information. The SMF may employ the Message Priority header to determine if the UE request is subject to exemption from NAS level congestion control. Other NFs relay the priority information by including the Message Priority header in service-based interfaces. The AMF may include an identifier of a PCF (e.g., PCF ID) in the Nsmf_PDUSession_CreateSMContext Request. The PCF ID may identify the H-PCF in the non-roaming case and the V-PCF in the local breakout roaming case.

In an example, the SMF may receive from the AMF the SRP message. The SMF may receive the SRP message via an N11 interface, and/or the like. The AMF may employ a service based interaction messaging (e.g., Nsmf_PDUSession_CreateSMContext, and/or the like) with the SMF via the N11 interface. In an example, the SMF may extract SRP message from the Nsmf_PDUSession_CreateSMContext message. The SMF may extract/derive/decapsulate the information of the stream from the SRP message and provides it as a QoS flow request to the PCF. In an example, the SMF may map the SRP message to the QoS flow request. The SMF may select a PCF or may employ a PCF that is locally configured to obtain PCC rules for the PDU session. The SMF may perform a session management (SM) policy association establishment procedure. The policy association procedure may be employed to establish an SM policy association with the PCF and get (default) PCC rules for the PDU session. The policy association procedure may employ GPSI. In an example, if the SM policy association is for an existing PDU session, the SMF may provide information on the policy control request trigger condition(s) that have been met by an SMF initiated SM policy association modification procedure. In an example, the PCF may send policy information to the SMF.

In an example, the SMF may select a user plane function (UPF). The SMF may select the UP based on a SRP capability, one or more elements of the SRP message, TSN capability support, and/or the like. The SMF may query a network repository function (NRF) to select the UPF. The SMF may employ a Nnrf_NFDiscovery service, Nnrf_NFDiscovery_Request service operation, and/or the like of the NRF. The SMF may send a discovery request message (e.g., Nnrf_NFDiscovery_Request message, Nnrf_discovery_request message, and/or the like) comprising an NF type (e.g., UPF), SRP capability, one or more elements of the SRP message, TSN capability support, and/or the like to the NRF indicating a request to select/discover a UPF for the TSN (system). The NRF may send a query response (e.g., Nnrf_NFdiscovery_response, and/or the like) message comprising an identifier of the UPF, an address of the UPF, and/or the like.

In an example, the SMF may send to the UPF a session establishment request (e.g., N4 session establishment request, and/or the like). The N4 session establishment request may comprise packet detection rules for the QoS flow, a bridge id (e.g., an identifier of the TSN bridge, and/or the like), a port id (e.g., associated with the TSN system, the stream of data packets, the SRP, and/or the like), an identifier of the N4 session (N4 session ID), a PDU session type (e.g., TSN, SRP, ethernet, IPv4, IPv6, unstructured, and/or the like), an identifier of the session (e.g., PDU session), and/or the like. In an example, the TSN bridge may comprise a pair/tuple of one or more UEs and one or more UPFs.

The SMF may send an N4 session establishment/modification request to the UPF and may provide packet detection, enforcement and reporting rules to be installed on the UPF for the PDU session. If CN tunnel info is allocated by the SMF, the CN tunnel info may be provided to the UPF. If selective user plane deactivation is required for the PDU Session, the SMF may determine the inactivity timer and may provide it to the UPF. In an example, the value for the inactivity timer may be determined based on the SRP message and TSN system requirements. The UPF may acknowledge by sending an N4 session establishment/modification response to the SMF. If CN tunnel info is allocated by the UPF, the CN tunnel info may be provided to the SMF.

In an example, the SMF may send/forward the SRP message to the UPF. In response to receiving the SRP message, the SMF may send the SRP message to a second TSN bridge. The SMF may send the SRP message to the second TSN bridge via an egress port for the TSN system. The second TSN bridge may receive the SRP via a port at a UE, a port at a UPF, and/or the like. In an example, the UPF may send the SRP message to a second station (e.g., a TSN end station, a TSN device, a non-3GPP device, a 3GPP device, and/or the like). In an example, in response to receiving the SRP message, the second station may send a SRP response message (e.g., SRP message response, listener ready message/advertisement, and/or the like). The SRP response message may be a listener ready message, and/or the like indicating that the second station of the TSN system is ready to receive/send/transmit TSN data packets, stream of the data packets, and/or the like. In an example, the second station may send the SRP response message via the second TSN bridge (e.g., via one or more TSN bridges).

In an example, the second station may send the SRP message response (SRP response message) to the UPF. The UPF may send/forward the SRP response message to the SMF via the N4 session identified by the N4 session ID. The UPF may send the SRP response message via a session established between the SMF and the UPF for the PDU session of the TSN system. The session between the SMF and the UPF may be an N4 session. The UPF may send the SRP response message via the N4 session, N4 message, N4 reporting procedure, and/or the like, comprising the N4 session ID, the port ID, TSN bridge ID, SRP response message, an identifier of the second station, an identifier of the first station and/or the like.

In an example, the second station may be an AF, an AS, and/or the like. In an example, the AF, the AS, and/or the like may send a SRP response message in response to receiving the SRP message. The AS/AF may receive the SRP message via an NEF, PCF, SMF, UPF, and/or the like. The second station may receive the SRP message via control plane or user plane, via the PDU session, signaling, and/or the like. In an example, the SRP response message may be sent by the second station upon successful establishment of the PDU session for the TSN system or the SRP. In an example, the SMF may send the SRP message to a second TSN bridge or to one or more TSN bridges if the SRP request is successful (e.g., the PDU session establishment for the TSN is successful). In an example embodiment, the second station (e.g., one or more listener(s), and/or the like) may request the network to reserve the resources for sending and/or receiving the stream of data packets for the TSN system. In an example, the SRP message may trigger a service request procedure or a network initiated PDU session establishment, a network initiated PDU session modification for the one or more listener(s). In an example, if the second station (listeners) request to reserve network resources (e.g., based on the SRP message, and/or the like) fails, the second station(s) may send a listener failed message to the talker (e.g., the first station). In an example, the SRP may propagate/transmit via one or more TSN bridges. An error, failure to reserve resources based on the SRP message, insufficient resources to support reservation for SRP, and/or the like, may cause a talker ready fail, talker failed, and/or the like message. In an example, if the path from the listener to the talker does not have sufficient resources to support the SRP request for the stream of data packets, a talker failed message may be sent/propagated to the end stations.

In an example, the SMF may send the SRP message to an application function (AF), AS, and/or the like. The SMF may send the SRP message via N4 interface to the UPF. The UPF may send the SRP message to the AF/AS. The SMF may send the SRP message to the AF, AS, and/or the like via a NEF. The SMF may employ an Nnef service operation procedure (e.g., a message delivery request comprising an AF ID, AS ID, and/or the like) to send the SRP message to the NEF. The SMF may select the NEF based on local information or via NRF, UDM, UDR, and/or the like.

In an example, the SMF may send the SRP message to a PCF via an N7 interface. The SMF may employ a service based interaction of the PCF e.g., Npcf service operations, and/or the like. The SMF may send a message to the PCF comprising the SRP message, a SUPI, bridge id, and/or the like. The SMF may send the SRP message to the PCF. The PCF may determine an AF, AS or a centralized controller (e.g., a CNC, CUC, and/or the like) and the send the SRP message to the AF, AS, the centralized controller, and/or the like.

In an example, the SMF may send to the AMF an Namf_Communication_N1N2MessageTransfer message comprising the PDU Session ID, N2 SM information (PDU Session ID, QFI(s), QoS Profile(s), CN Tunnel Info, S-NSSAI from the allowed NSSAI, Session-AMBR, PDU Session Type, User Plane Security Enforcement information, UE Integrity Protection Maximum Data Rate), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es), [Always-on PDU Session])), and/or the like. The N2 SM information may comprise information that the AMF may forward to the (R)AN node. The N2 SM information may comprise the CN Tunnel Info that corresponds to the Core Network address of the N3 tunnel corresponding to the PDU Session, one or multiple QoS profiles and the corresponding QFIs that may be provided to the (R)AN, the PDU Session ID that may be used by AN signaling with the UE to indicate to the UE the association between (R)AN resources and a PDU Session for the UE, a PDU Session associated to an S-NSSAI and a DNN, user plane security enforcement information. The N1 SM container may comprise the PDU session establishment accept that the AMF may provide to the UE. If the UE requested P-CSCF discovery then the message may comprise the P-CSCF IP address(es) as determined by the SMF. The PDU session establishment accept may comprise S-NSSAI from the allowed NSSAI.

In an example, the PDU Session Establishment Accept within the N1 SM and in the N2 SM information may comprise one or more QoS rules, QoS flow level QoS parameters for the QoS flow(s) associated with those QoS rule(s) and QoS Profiles. The Namf_Communication_N1N2MessageTransfer may comprise the PDU Session ID allowing the AMF to know which access towards the UE to use.

In an example, the AMF may send to a base station (e.g., RAN, NGRAN, and/or the like), a N2 PDU session request. The N2 PDU session request may comprise N2 SM information, NAS message (PDU Session ID, N1 SM container (PDU Session Establishment Accept)), and/or the like. The AMF may send the NAS message comprising the PDU Session ID and PDU Session Establishment Accept targeted to the UE and the N2 SM information received from the SMF within the N2 PDU Session Request to the (R)AN. In an example, the base station (e.g., (R)AN) may send/issue AN specific signaling to the UE. The (R)AN may issue AN specific signaling exchange with the UE that may be related with the information received from SMF. As an example, in case of a NG-RAN, an RRC Connection Reconfiguration may take place with the UE establishing the necessary NG-RAN resources related to the QoS Rules for the PDU Session request. The (R)AN may allocate (R)AN N3 tunnel Info for the PDU session. In an example, in case of dual connectivity, a master RAN node may assign some (zero or more) QFIs to be setup to a master RAN node and others to a secondary RAN node. The AN tunnel info may comprise a tunnel endpoint for one or more involved (R)AN node(s), and the QFIs assigned to one or more tunnel endpoint(s). A QFI may be assigned to the master RAN node or the secondary RAN node. In an example, the (R)AN may forward the NAS message (PDU Session ID, N1 SM container (PDU Session Establishment Accept)) to the UE. The (R)AN may provide the NAS message to the UE if the necessary (R)AN resources are established and the allocation of (R)AN tunnel info are successful. In an example, the (R)AN may send to the AMF an N2 PDU session response message (e.g., comprising PDU Session ID, Cause, N2 SM information (PDU Session ID, AN Tunnel Info, List of accepted/rejected QFI(s), User Plane Enforcement Policy Notification, and/or the like), and/or the like). The AN tunnel info may correspond to the access network address of the N3 tunnel corresponding to the PDU Session. In an example, if the base station (e.g., NG-RAN, (R)AN, and/or the like) rejects QFI(s) the SMF may update the QoS rules and QoS Flow level QoS parameters if needed for the QoS Flow associated with the QoS rule(s) in the UE accordingly. The NG-RAN may reject the establishment of UP resources for the PDU session when it cannot fulfill user plane security enforcement information with a value of required. In this case the SMF may release the PDU session. The NG-RAN may notify the SMF when it cannot fulfill a user plane security enforcement with a value of Preferred.

In an example, the AMF may send to the SMF a Nsmf_PDUSession_UpdateSMContext Request (e.g., comprising N2 SM information, Request Type, and/or the like). The AMF may forward the N2 SM information received from (R)AN to the SMF. If the list of rejected QFI(s) is included in N2 SM information, the SMF may release the rejected QFI(s) associated QoS profiles. If the user plane enforcement policy notification in the N2 SM information indicates that no user plane resources could be established, and the user plane enforcement policy indicated a requirement (e.g., employing a field "required", and/or the like), the SMF may release the PDU session. The SMF may initiate an N4 session modification procedure with the UPF. The SMF may provide AN tunnel info, corresponding forwarding rules, and/or the like to the UPF. The UPF may provide an N4 session modification response to the SMF. In an example, the SMF may send to the AMF an Nsmf_PDUSession_UpdateSMContext Response (e.g., comprising a cause value, and/or the like). In an example, the SMF may send to the AMF a release message e.g., a Nsmf_PDUSession_SMContextStatusNotify (Release), and/or the like. If during the procedure, the PDU Session establishment is not successful, the SMF may inform the AMF by invoking Nsmf_PDUSession_SMContextStatusNotify (Release). The SMF may releases any N4 session(s) created, any PDU Session address if allocated (e.g. IP address) and releases the association with the PCF.

In an example, the SMF may forward/send the SRP response message to the UE. The SMF may send the SRP message via a non-access stratum message (e.g., SM-NAS, NAS-SM, and/or the like). The SMF may employ the N11 interface between the SMF and the AMF to transmit the SRP response message. The SMF may employ the Namf_Communication_N1N2MessageTransfer message, and/or the like to send the SRP response message. The Namf_Communication_N1N2MessageTransfer message may comprise the SRP response message, the identifier of the first station, and/or the like.

Figure 22:
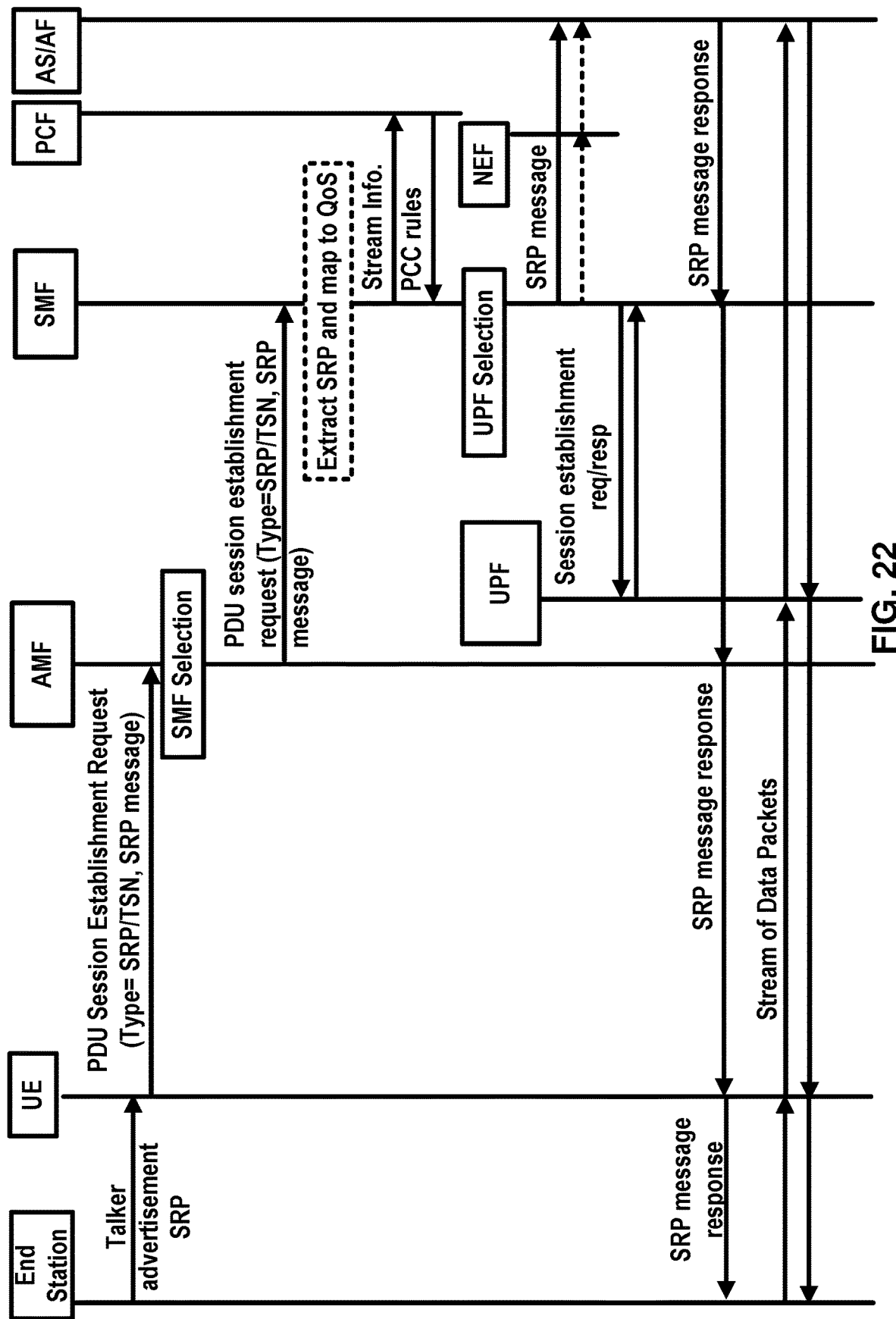
FIG. 22 is an example call flow as per an aspect of an embodiment of the present disclosure.
Figure 23:
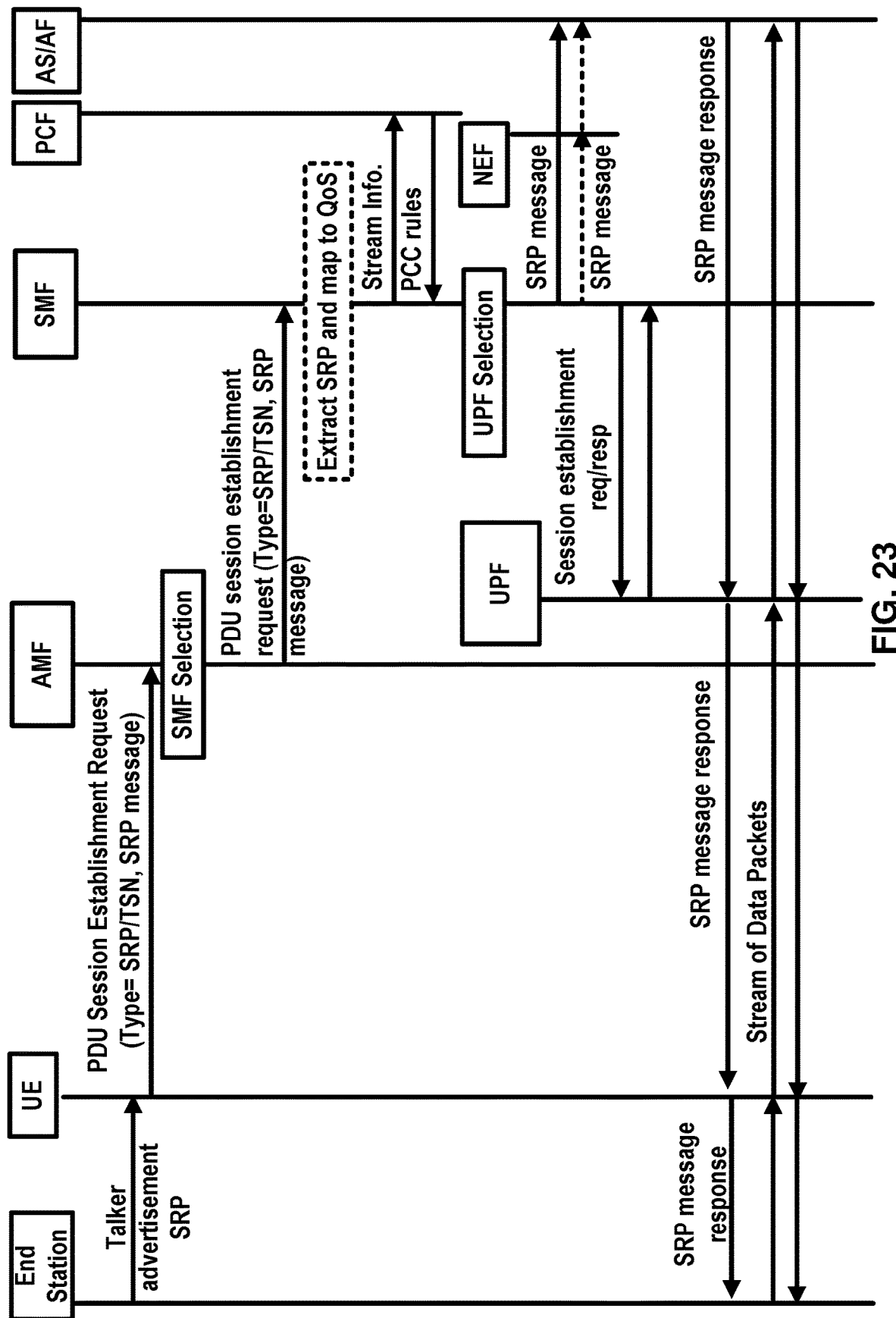
FIG. 23 is an example call flow as per an aspect of an embodiment of the present disclosure.
Figure 24:
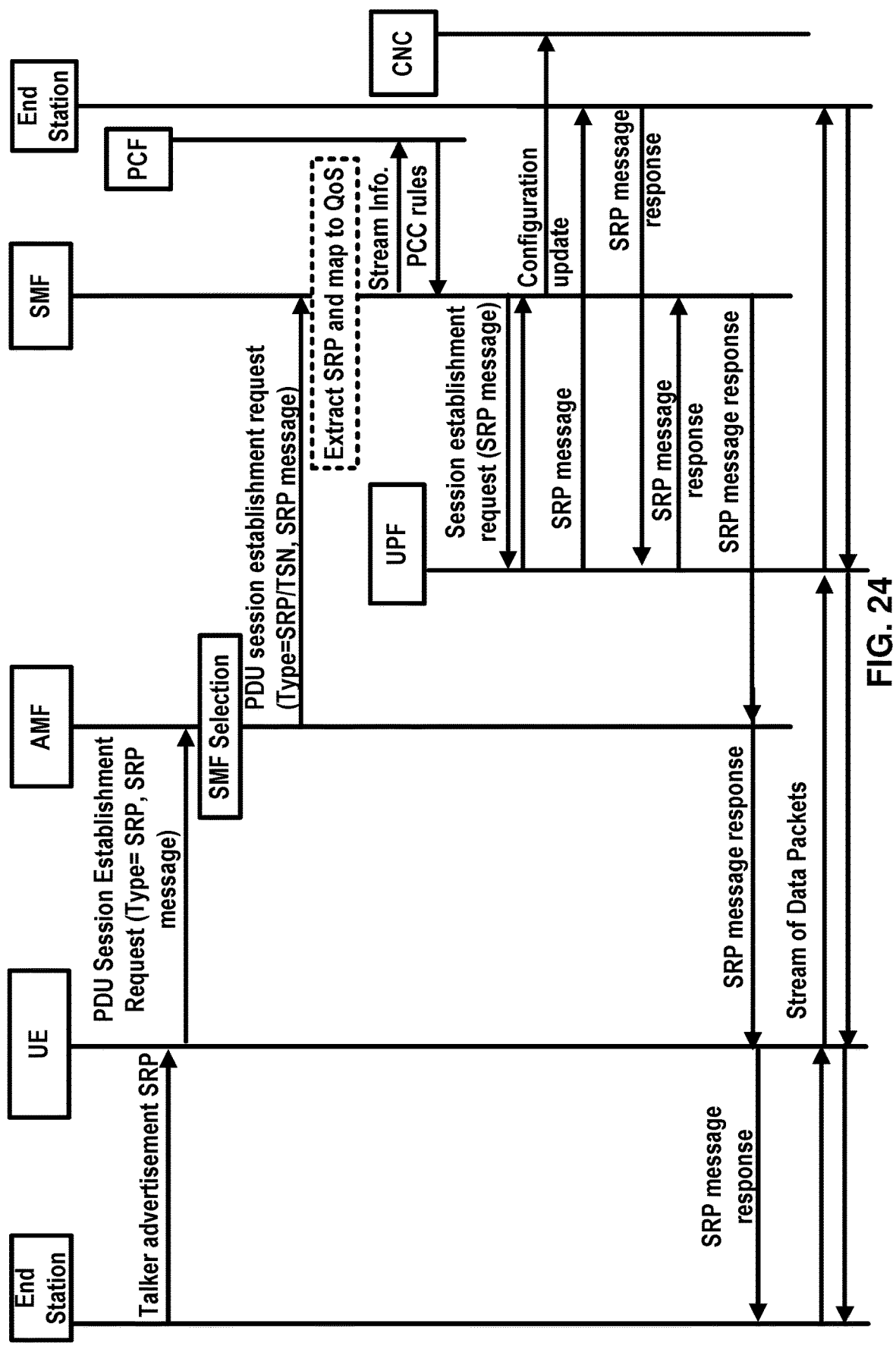
FIG. 24 is an example call flow as per an aspect of an embodiment of the present disclosure.
Figure 25:
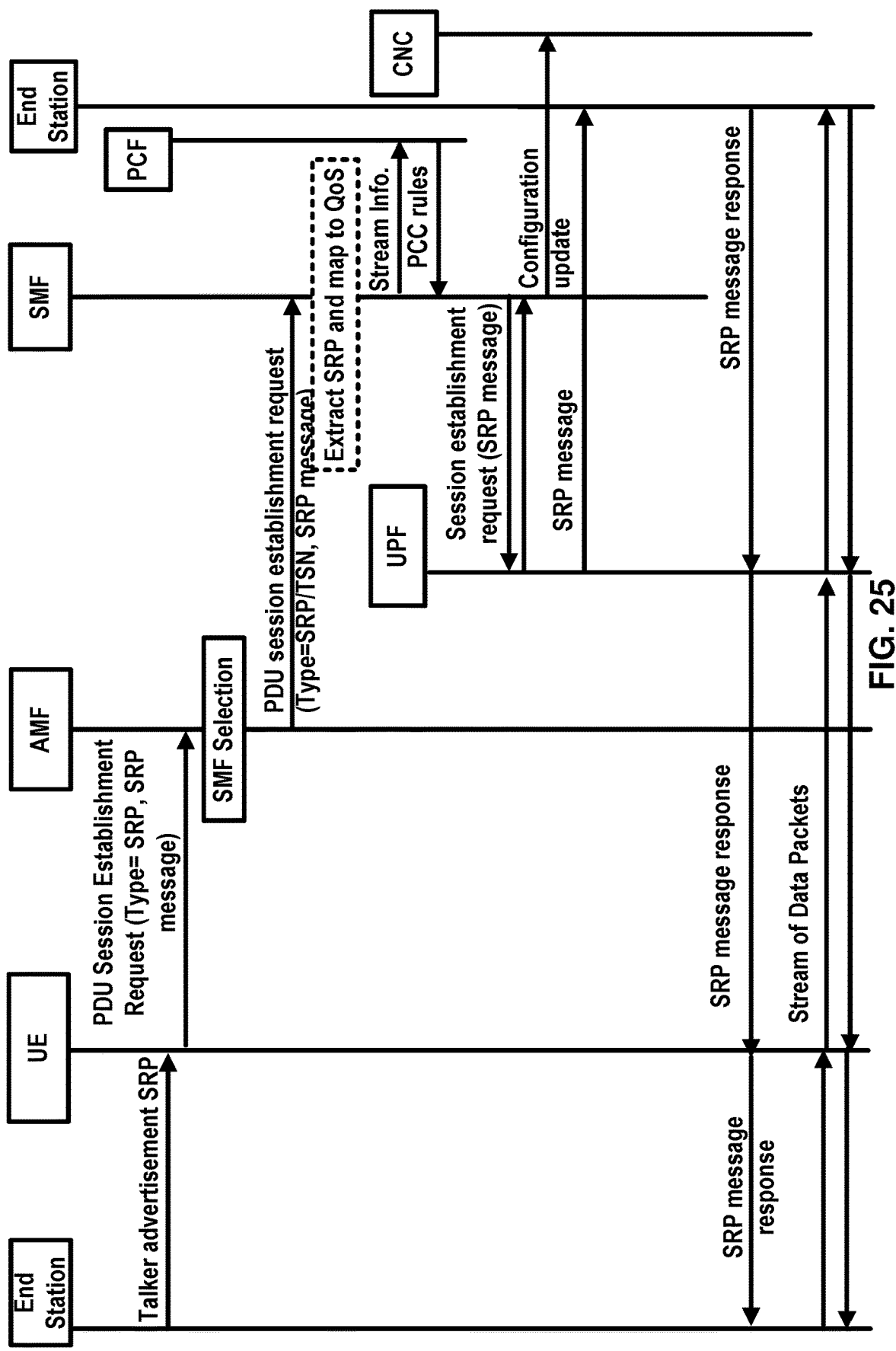
FIG. 25 is an example call flow as per an aspect of an embodiment of the present disclosure.
Figure 26:
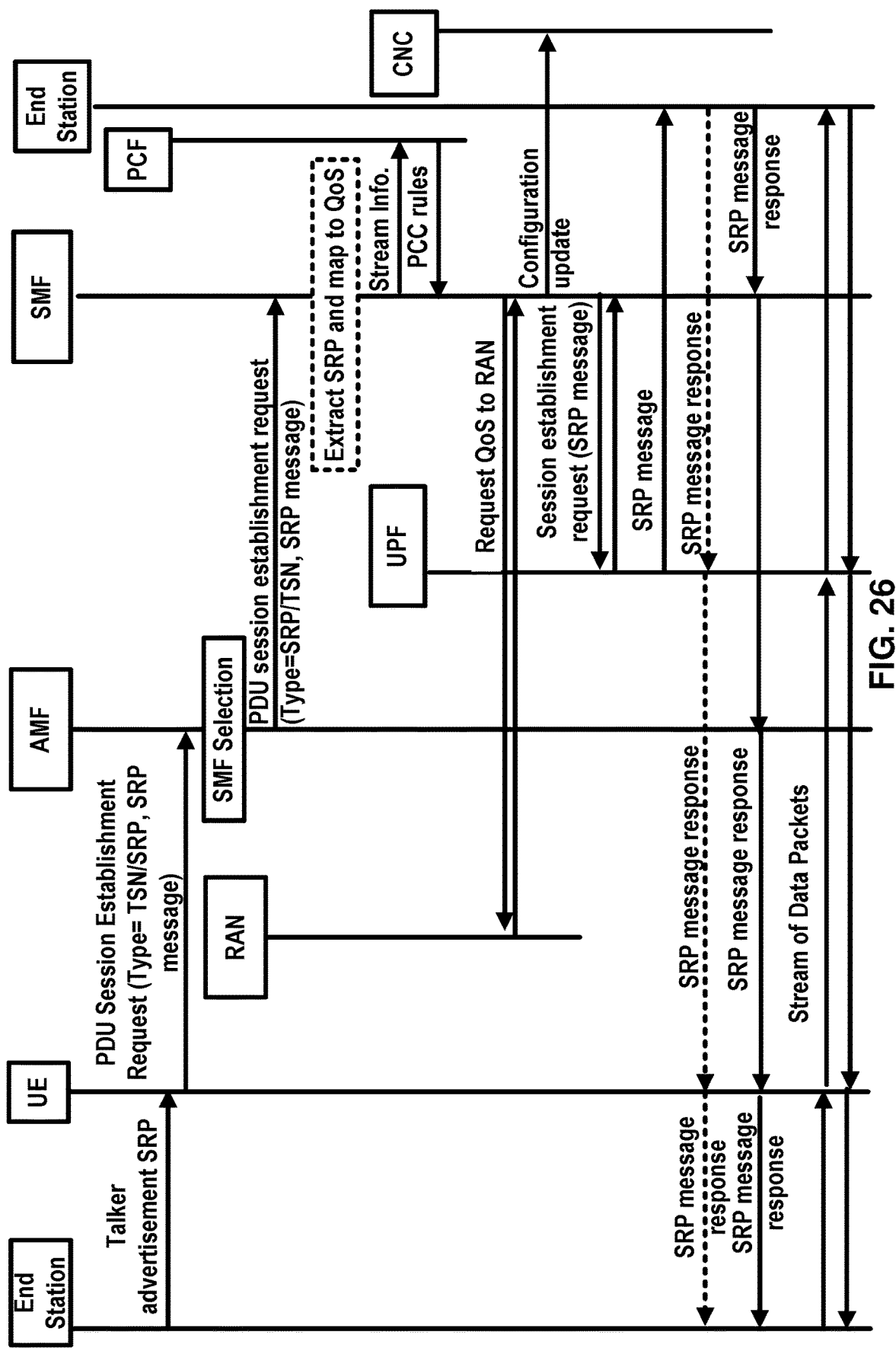
FIG. 26 is an example call flow as per an aspect of an embodiment of the present disclosure.

In an example, the UE (e.g., the wireless device, and/or the like) may receive the SRP response message from the SMF via the NAS message as depicted in FIG. 22 and FIG. 24. The UE may receive the SRP response message via the AMF and the base station. In an example, as depicted in FIG. 23 and FIG. 25, the UE may receive the SRP response message via the PDU session, the UPF, user plane, and/or the like. In an example, in response to receiving the SRP response, the UE may determine that the SRP response message is for the talker (first station of the TSN). The UE may extract the received message that may comprise the SRP response message, end station identifier, TSN bridge id, port id, and/or the like, and send the SRP response message to the first end station via the port. The UE may send the SRP response message to the talker via the TSN translator, ethernet adapter, N60 interface, and/or the like. The talker (first end station) may transmit the stream of data packets to the one or more listeners e.g., via the PDU session.

Figure 27:
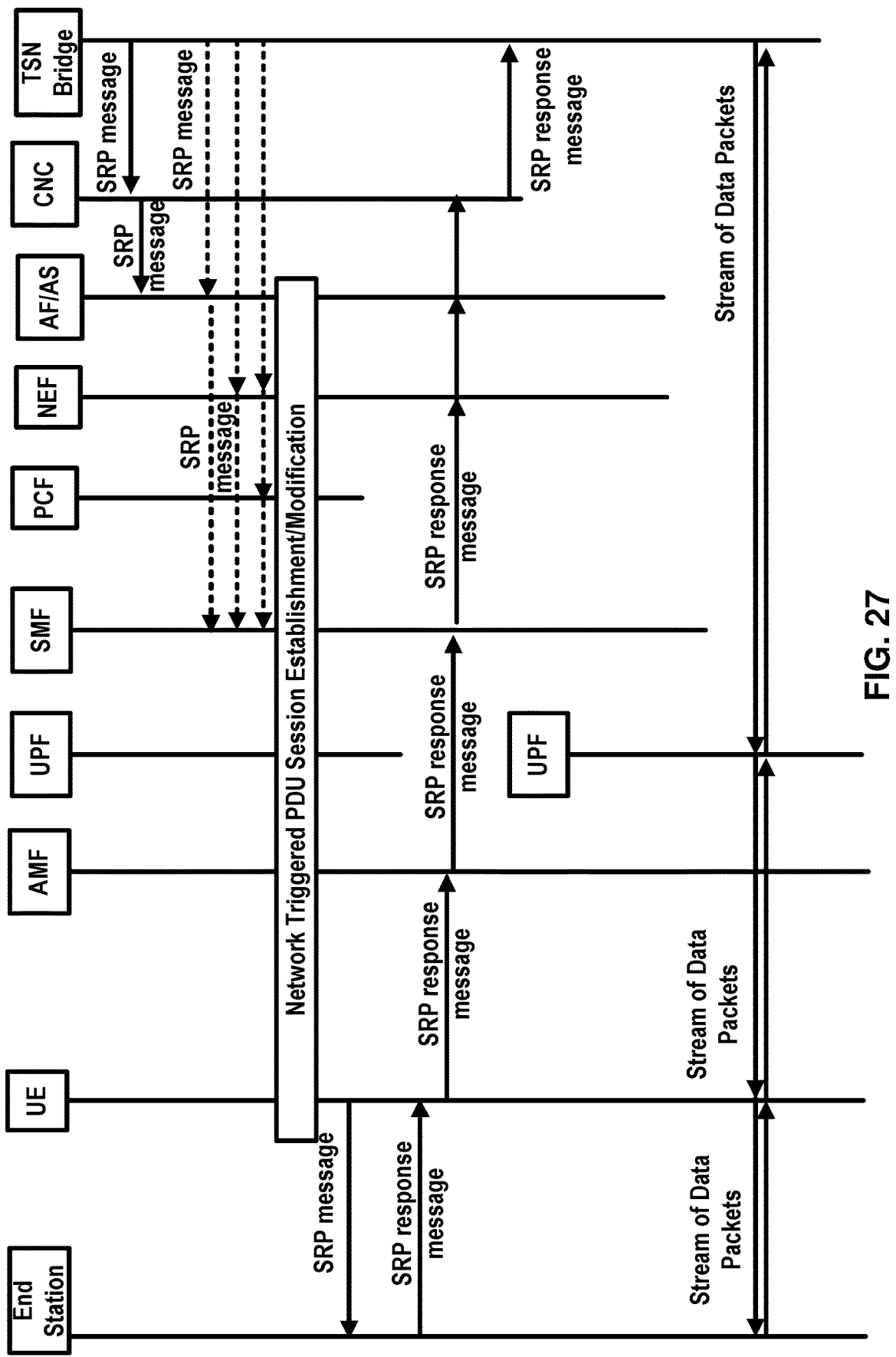
FIG. 27 is an example call flow as per an aspect of an embodiment of the present disclosure.

In an example embodiment as depicted in FIG. 27, a first TSN bridge may send a SRP message to a TSN end station via a second TSN bridge. The TSN bridge (e.g., the first TSN bridge) may send the SRP message to a CNC, CUC and/or the like. The CNC may determine a TSN bridge based on the elements of the SRP message, an identifier of the TSN end station, and/or the like. The CNC may send the SRP message to the second TSN bridge (e.g., comprising a 3GPP system, 5G system, and/or the like). In an example, a PCF, an SMF, an NEF, and/or the like of the 5GS may send a trigger to a UE connected/associated with the (TSN) end station. The association may be determined based on a bridge id, port id, UE id, UPF id, ports of UPF/UE associated with the TSN system or the TSN end station, and/or the like. In an example, the CNC may receive the SRP message, and may forward the SRP message to the AF. The AF may send the SRP to the NEF. The NEF may send the SRP message to a PCF or a SMF. In an example, the AF/AS may receive the SRP message from the first TSN bridge. The AF/AS may send the SRP message to the PCF or the SMF. The AF/AS may send the SRP message to the PCF or the SMF via the NEF. In an example, the SMF, PCF, NEF, and/or the like may trigger a PDU session establishment/modification with an indication that the PDU session establishment/modification may be for a TSN system, SRP propagation, and/or the like. In an example, the PCF, SMF, NEF, and/or the like may map the SRP message to one or more QoS flow parameters. In an example, the PCF may trigger a policy delivery procedure to the UE (e.g., URSP) triggering a PDU session establishment. The URSP may comprise a S-NSSAI, a DNN, an association of a PDU session ID with the TSN system, one or more QoS flow requirements, and/or the like. The UE may establish a PDU session based on the URSP by performing the PDU session establishment request, or the PDU session modification request. The UE may send a NAS message to the SMF (e.g., via the AMF). The NAS message may comprise the SRP message, a PDU session type indicating that the request is for SRP/TSN (e.g., type=SRP/TSN), S-NSSAI(s), DNN, PDU Session ID, request type, old PDU session ID, N1 SM container (PDU Session Establishment Request), and/or the like. In an example, the NAS message may comprise an identifier of a TSN system, identifier of one or more bridges (TSN bridges, and/or the like), a port identifier of the UE for the TSN bridge, and/or the like. In an example, the DNN may identify a TSN system, a set/group of TSN bridges, and/or the like.

In an example, the PCF may perform a PCF initiated SM Policy Association Modification procedure to notify the SMF about the modification of policies. This may e.g., have been triggered by a policy decision or upon AF requests, e.g. Application Function influence on traffic routing, and/or the like. The UDM may update the subscription data of SMF by Nudm_SDM_Notification (e.g., comprises SUPI, Session Management Subscription Data, and/or the like). The SMF may update the Session Management Subscription Data and may acknowledge the UDM by returning an ack with (e.g., a SUPI, and/or the like). In an example, the SMF may request modification. The SMF may modify a PDU session. This procedure may be triggered based on locally configured policy or triggered from the (R)AN. It may be triggered if the UP connection is activated and the SMF has marked that the status of one or more QoS Flows are deleted in the 5GC but not synchronized with the UE.

In an example, the SMF may invoke a Namf_Communication_N1N2MessageTransfer. The Namf_Communication_N1N2MessageTransfer may comprise the SRP message, an indication that the request is for a TSN/SRP, a PDU session type indicating TSN/SRP type PDU session, N2 SM information (PDU Session ID, QFI(s), QoS Profile(s), Session-AMBR), N1 SM container (PDU Session Modification Command (PDU Session ID, QoS rule(s), QoS Flow level QoS parameters if needed for the QoS Flow(s) associated with the QoS rule(s), QoS rule operation and QoS Flow level QoS parameters operation, Session-AMBR)), and/or the like.

In an example, if the UE is in CM-IDLE state and an ATC is activated, the AMF may update and store the UE context based on the Namf_Communication_N1N2MessageTransfer. When the UE is reachable e.g. when the UE enters CM-CONNECTED state, the AMF may forward the N1 message to synchronize the UE context with the UE. The AMF may send N2 PDU Session Request (e.g., comprising N2 SM information received from SMF, NAS message (SRP message, PDU session type=TSN/SRP, PDU Session ID, N1 SM container (PDU Session Modification Command), and/or the like), and/or the like) Message to the (R)AN. The (R)AN may issue AN specific signaling exchange with the UE that is related with the information received from SMF. For example, in case of a NG-RAN, an RRC Connection Reconfiguration may take place with the UE modifying the necessary (R)AN resources related to the PDU Session. The (R)AN may acknowledge N2 PDU Session Request by sending a N2 PDU Session Ack (N2 SM information (List of accepted/rejected QFI(s), AN Tunnel Info, PDU Session ID, Secondary RAT usage data), User location Information) Message to the AMF. In case of Dual Connectivity, if one or more QFIs were added to the PDU Session, the Master RAN node may assign one or more of these QFIs to a NG-RAN node which was not involved in the PDU Session earlier. In this case the AN Tunnel Info includes a new N3 tunnel endpoint for QFIs assigned to the new NG-RAN node. Correspondingly, if one or more QFIs were removed from the PDU Session, a (R)AN node may no longer be involved in the PDU Session anymore, and the corresponding tunnel endpoint may be removed from the AN Tunnel Info. The NG-RAN may reject QFI(s) if it cannot fulfill the User Plane Security Enforcement information for a corresponding QoS Profile, e.g. due to the UE Integrity Protection Maximum Data Rate being exceeded.

The AMF may forward/send the N2 SM information and the User location Information received from the AN to the SMF via Nsmf_PDUSession_UpdateSMContext service operation. The SMF may reply with a Nsmf_PDUSession_UpdateSMContext Response. N2 SM information may include Secondary RAT Usage Data. If the (R)AN rejects QFI(s) the SMF is responsible of updating the QoS rules and QoS Flow level QoS parameters if needed for the QoS Flow(s) associated with the QoS rule(s) in the UE accordingly. The SMF may update N4 session of the UPF(s) that are involved by the PDU Session Modification by sending N4 Session Modification Request message to the UPF based on the QoS flow derived from the SRP message. If new QoS Flow(s) are to be created, the SMF may update the UPF with UL Packet Detection Rules of the new QoS Flow derived/mapped from the SRP message.

The UE may acknowledge the PDU session modification command by sending a NAS message. The NAS message may comprise the SRP message, PDU session type, port id, bridge id, PDU Session ID, N1 SM container (PDU Session Modification Command Ack, and/or the like) message, and/or the like. In an example, the N1 SM container may comprise the SRP message. The (R)AN may forward the NAS message to the AMF. The AMF may send/forward the N1 SM container (SRP message, PDU Session Modification Command Ack) and User Location Information, and/or the like received from the AN to the SMF via Nsmf_PDUSession_UpdateSMContext service operation. The SMF may reply with a Nsmf_PDUSession_UpdateSMContext Response.

In an example, the SMF may update N4 session of the UPF(s) that are involved by the PDU Session Modification by sending N4 Session Modification Request (N4 Session ID) message to the UPF. For a PDU Session of Ethernet PDU Session Type, the SMF may notify the UPF to add or remove Ethernet Packet Filter Set(s) and forwarding rule(s).

In an example, if the SMF interact with the PCF, the SMF may notify the PCF whether the PCC decision could be enforced or not by performing an SMF initiated SM Policy Association Modification procedure.

In an example, as depicted in FIG. 28, a TSN end station may send a SRP message and the SRP message may be propagated via one or more TSN bridges. In an example, the one or TSN bridges may receive the SRP or talker advertisement message, via control plane or user plane. A CNC or a CUC may coordinate the SRP message distribution based on the SRP message, SRP requirements, TSN requirement, and/or the like. The CUC and/or the CNC may manage a topology for the TSN bridges to meet one or more requirements such as redundancy, reliability, latency, and/or the like.

In an example embodiment, a wireless device may receive from a first station, a stream reservation protocol (SRP) message requesting reservation of network resources for a stream of data packets for a time sensitive network (TSN). The SRP message may comprise an identifier of the stream of data packets, at least one transmission parameter for the stream of data packets, and/or the like. In an example, the wireless device may determine based on the SRP message, to establish a packet data unit (PDU) session for the TSN. The wireless device may send to a session management function (SMF), a second message requesting establishment of the PDU session for the stream of the data packets. The second message may be via an AMF. The second message may comprise the SRP message, a parameter indicating that the PDU session is for the TSN, and/or the like. The wireless device may receive, an SRP response message indicating that a second station is ready to receive the stream of data packets. The SRP response message may be received via UP, CP, SMF, AMF, UPF, and/or the like. The wireless device may send/forward to the first station, the SRP response message.

In an example, the wireless device may receive from the first station, the stream of packets. The wireless device may transmit/forward, via the PDU session, the stream of packets. The wireless device may receive from the first station, the SRP message via a TSN translator.

In an example embodiment, the at least one transmission parameter for the stream of data packets may comprise an identifier of the stream of data packets (stream ID), data frame parameters, user to network requirement parameters, a priority and rank indication parameter, a latency value, traffic specification parameter, and/or the like. In an example, the data frame parameters may comprise a source MAC address for the stream of data packets, a destination MAC address for the stream of data packets, an identifier of a VLAN, and/or the like. In an example, the user to network requirement parameters may comprise a parameter indicating latency requirements for the stream of data packets, a parameter indicating a redundancy requirement for the stream of data packets, and/or the like. In an example, the latency value may comprise an accumulated latency value, and/or the like. In an example, the traffic specification parameter may comprise a parameter indicating a size of data frame, a parameter indicating number of data frames, and/or the like.

In an example embodiment, the second message may be a non-access stratum (NAS) message. In an example, the SRP response message may be a NAS message. The SRP response message may be received via the session management function. In an example, the SRP response message may be received via the PDU session. The SRP response message may be received via a user plane function.

In an example embodiment, the SMF may extract the at least one transmission parameter for the stream of data packets.

In an example, the SMF may send to a PCF, a QoS flow request for the stream of data packets. The SMF may receive, from the PCF, at least one PCC rules for the QoS flow of the stream of data packets.

In an example, the second message may further comprise an identifier of a TSN bridge. The TSN bridge may be a 3GPP system comprising one or more ingress port(s) and one or more egress port(s). The one or more egress port(s) may comprise the wireless device, a user plane function, and/or the like. The one or more ingress port(s) may comprise the wireless device, a user plane function (UPF), and/or the like. In an example, the second message may comprise an identifier of a port (of a UE in switch mode) associated with the first end station of the TSN system.

In an example, the SMF may send to a user plane function (UPF), the SRP message.

In an example, a network exposure function (NEF) may receive from the SMF, the SRP message. The NEF may send to a network node, the SRP message. The network node may comprise a TSN translator device, a policy control function, an application function, and/or the like. The network node may send to a second TSN bridge, the SRP message. In an example, the second TSN bridge may receive from the network node, the SRP message via an NEF/PCF/AF.

In an example embodiment, a wireless device may receive from a session management function, an AMF, a PCF, and/or the like, a stream reservation protocol (SRP) message requesting reservation of network resources for a stream of data packets for a time sensitive network (TSN). The SRP message may comprise an identifier of the stream of data packets (stream id), at least one transmission parameter for the stream of data packets, and/or the like.

In an example, the wireless device may determine based on the SRP message, to establish a packet data unit (PDU) session for the TSN. In an example, the wireless device may send to the session management function (SMF), a second message requesting establishment of the PDU session for the stream of the data packets. The second message may comprise the SRP message, a parameter indicating that the PDU session is for the TSN, and/or the like.

In an example, the wireless device may receive an acknowledgment message indicating that the PDU session for the TSN system is successful. The wireless device may send to a first station, the SRP message. The wireless device may receive from the first end station a SRP response message. The wireless device may send to a second station the SRP response.

In an example embodiment, a session management function (SMF) may receive from a wireless device, a message requesting establishment of a PDU session for a stream of data packets for a time sensitive network (TSN). In an example, the message may comprise a stream reservation protocol (SRP) message. The SRP message may comprise an identifier of the stream of data packets, at least one transmission parameter for the stream of data packets, a parameter indicating that the PDU session is for the TSN, and/or the like. In an example, the at least one transmission parameter for the stream of data packets may comprise an identifier of the stream of data packets. In an example embodiment, the at least one transmission parameter for the stream of data packets may further comprise an identifier of the stream of data packets (stream ID), data frame parameters, user to network requirement parameters, a priority and rank indication parameter, a latency value, traffic specification parameter, and/or the like. In an example, the data frame parameters may comprise a source MAC address for the stream of data packets, a destination MAC address for the stream of data packets, an identifier of a VLAN, and/or the like. In an example, the user to network requirement parameters may comprise a parameter indicating latency requirements for the stream of data packets, a parameter indicating a redundancy requirement for the stream of data packets, and/or the like. In an example, the latency value may comprise an accumulated latency value, and/or the like. In an example, the traffic specification parameter may comprise a parameter indicating a size of data frame, a parameter indicating number of data frames, and/or the like.

The SMF may determine based on the message that the PDU session establishment may be for the TSN system. The SMF may determine a quality of service requirement parameter based on the at least one transmission parameter for the stream of data packets. The SMF may send to a network function, the SRP message targeted to a second station. The SMF may send to a UPF, a second message requesting establishment of the PDU session for the TSN system. The second message may comprise the identifier of the stream of data packets, the quality of service requirement parameter, and/or the like. The network function may be at least one of NEF, UPF, and/or the like.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 34:
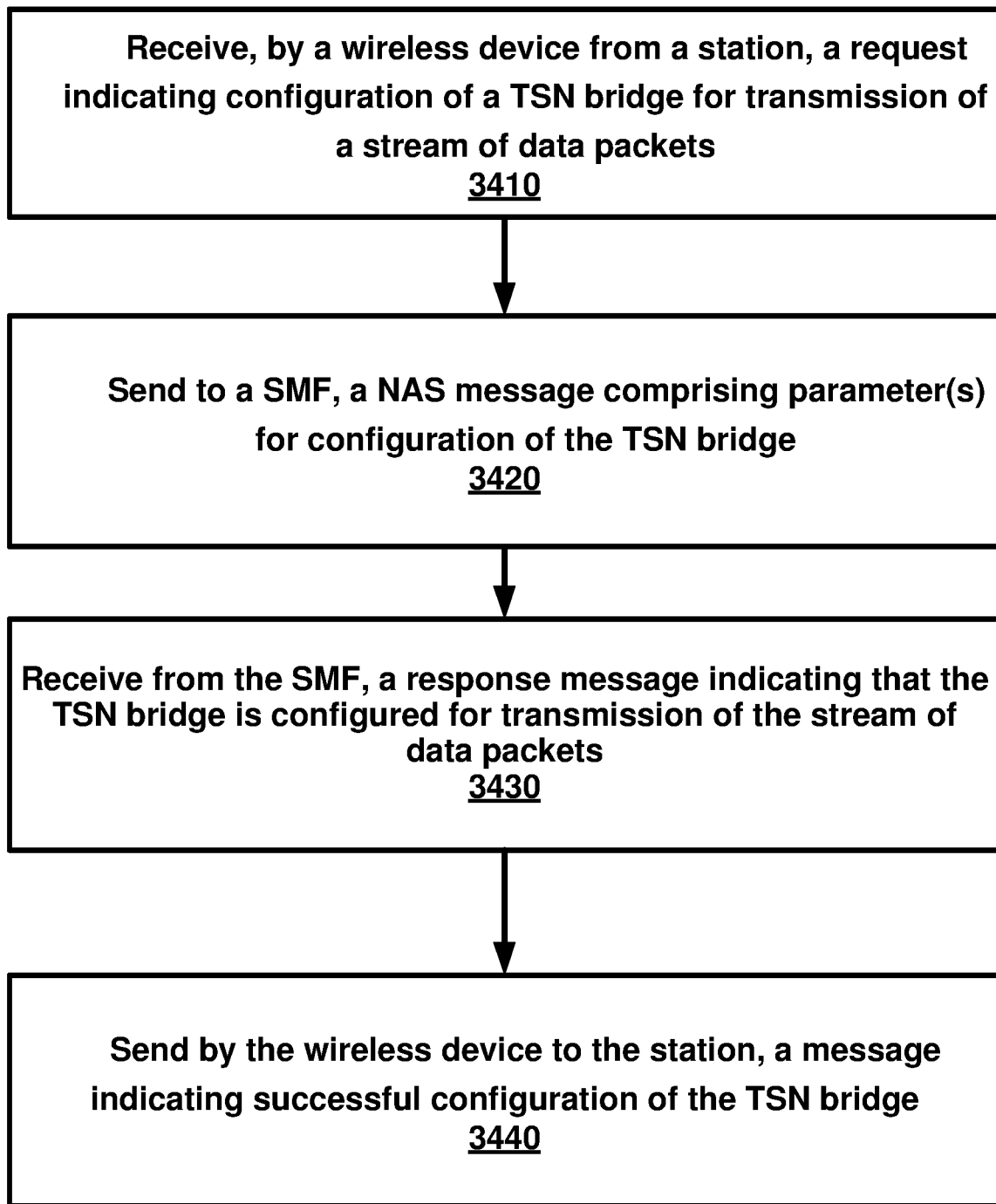
FIG. 34 is an example call flow as per an aspect of an embodiment of the present disclosure.

FIG. 34 is a flow diagram as per an aspect of an example embodiment of the present disclosure. At 3410, a wireless device may receive from a first station, a request indicating configuration of a time sensitive network (TSN) bridge for transmission of a stream of data packets. At 3420, the wireless device may send to a session management function (SMF), a non-access stratum message comprising at least one parameter for configuration of the TSN bridge. At 3430, the wireless device may receive from the SMF, a response message indicating that the TSN bridge is configured for transmission of the stream of data packets. At 3440, the wireless device may send to the first station, a message indicating successful configuration of the TSN bridge.

Figure 35:
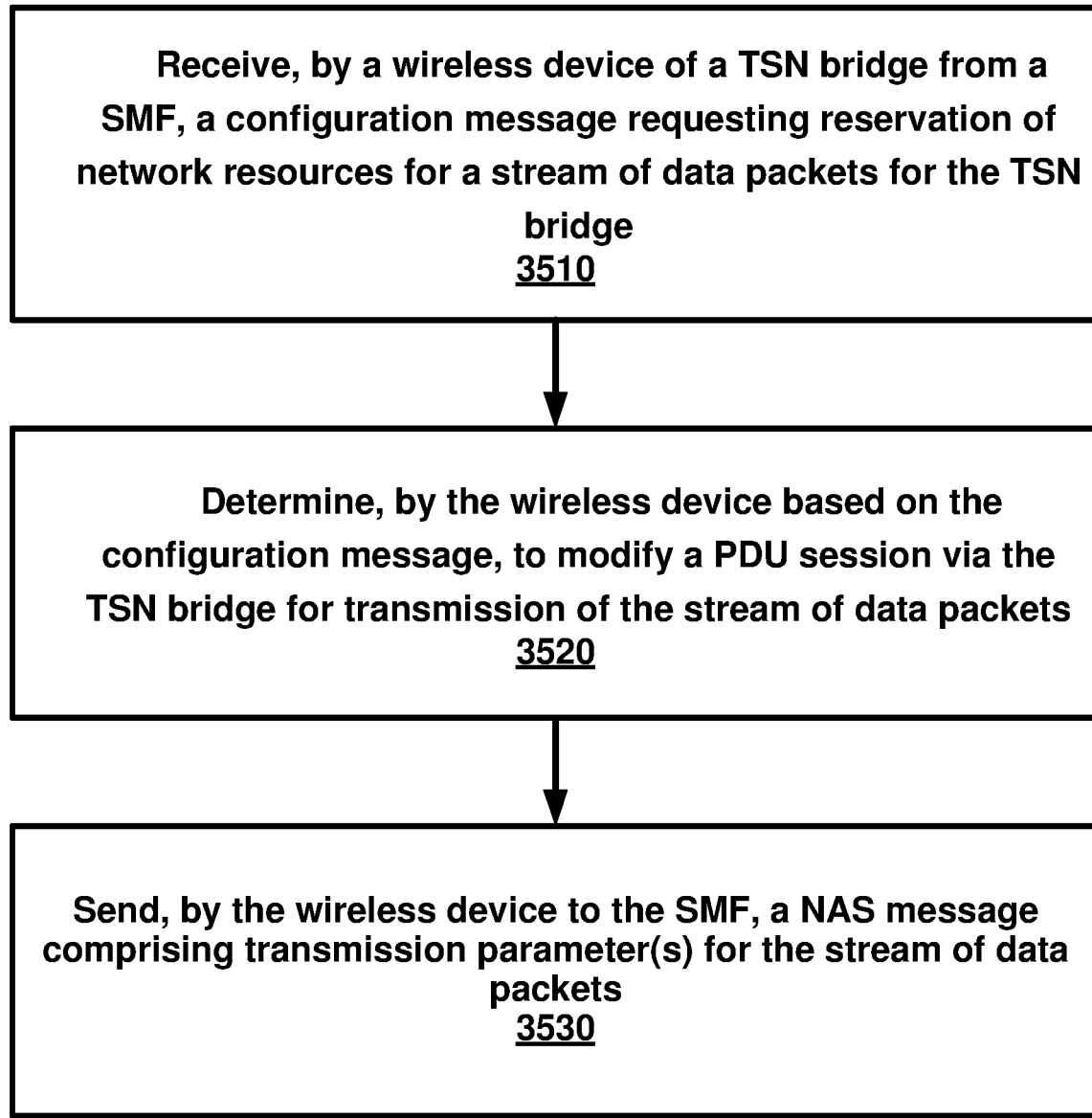
FIG. 35 is an example call flow as per an aspect of an embodiment of the present disclosure.

FIG. 35 is a flow diagram as per an aspect of an example embodiment of the present disclosure. At 3510, a wireless device of a time sensitive network (TSN) bridge may receive from a session management function, a configuration message requesting reservation of network resources for a stream of data packets for the TSN bridge. At 3520, the wireless device may determine based on the configuration message, to modify a packet data unit (PDU) session via the TSN bridge for transmission of the stream of data packets. At 3430, the wireless device may send to the session management function (SMF), a NAS message comprising at least one transmission parameter for the stream of data packets.

Figure 36:
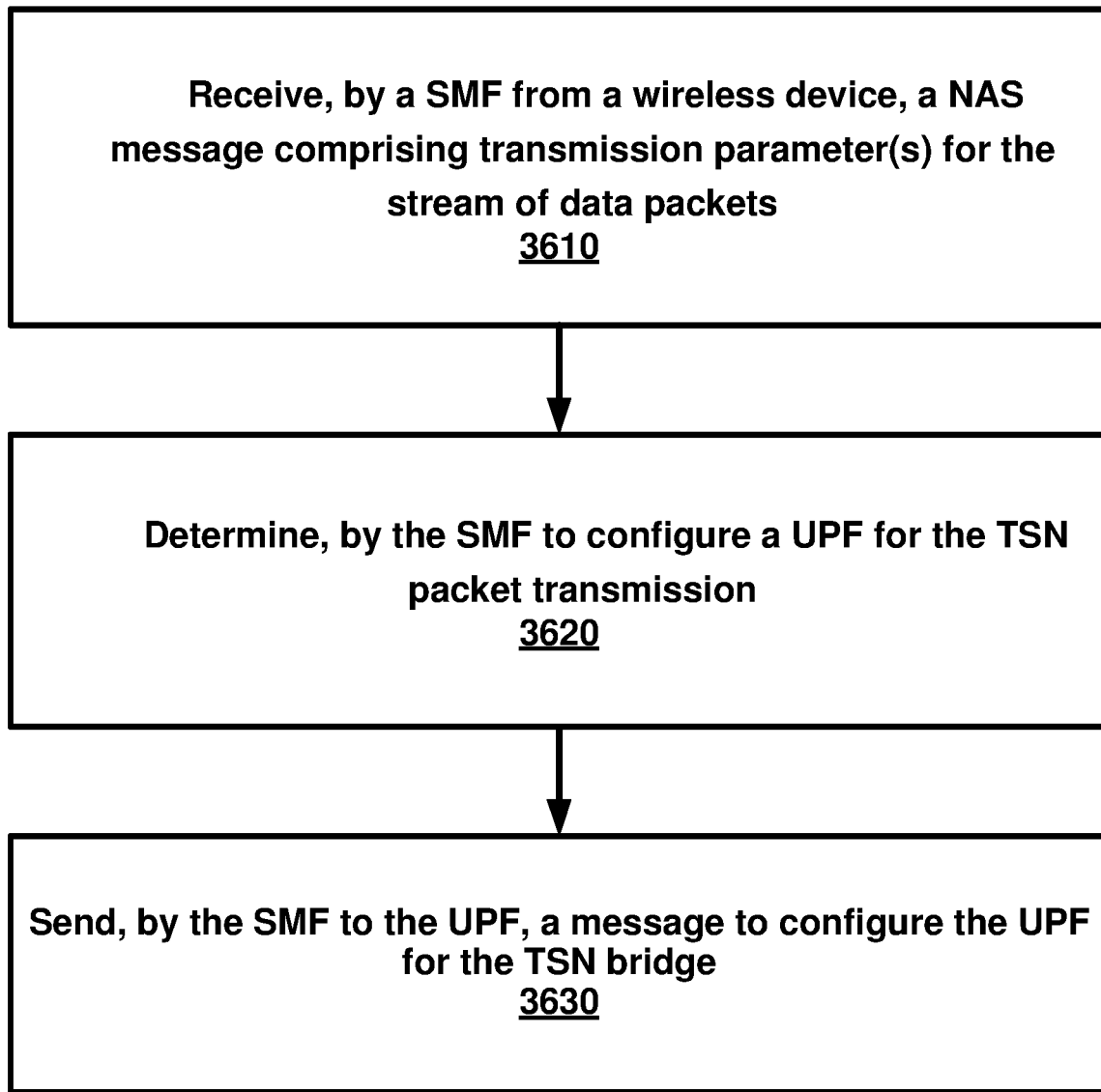
FIG. 36 is an example call flow as per an aspect of an embodiment of the present disclosure.

FIG. 36 is a flow diagram as per an aspect of an example embodiment of the present disclosure. At 3610, a session management function (SMF) may receive from a wireless device, a NAS message comprising at least one transmission parameter for the stream of data packets. At 3620, the SMF may determine to configure a UPF for the TSN packet transmission. At 3630, the SMF may send to the UPF, a message to configure the UPF for the TSN bridge.

Figure 37:
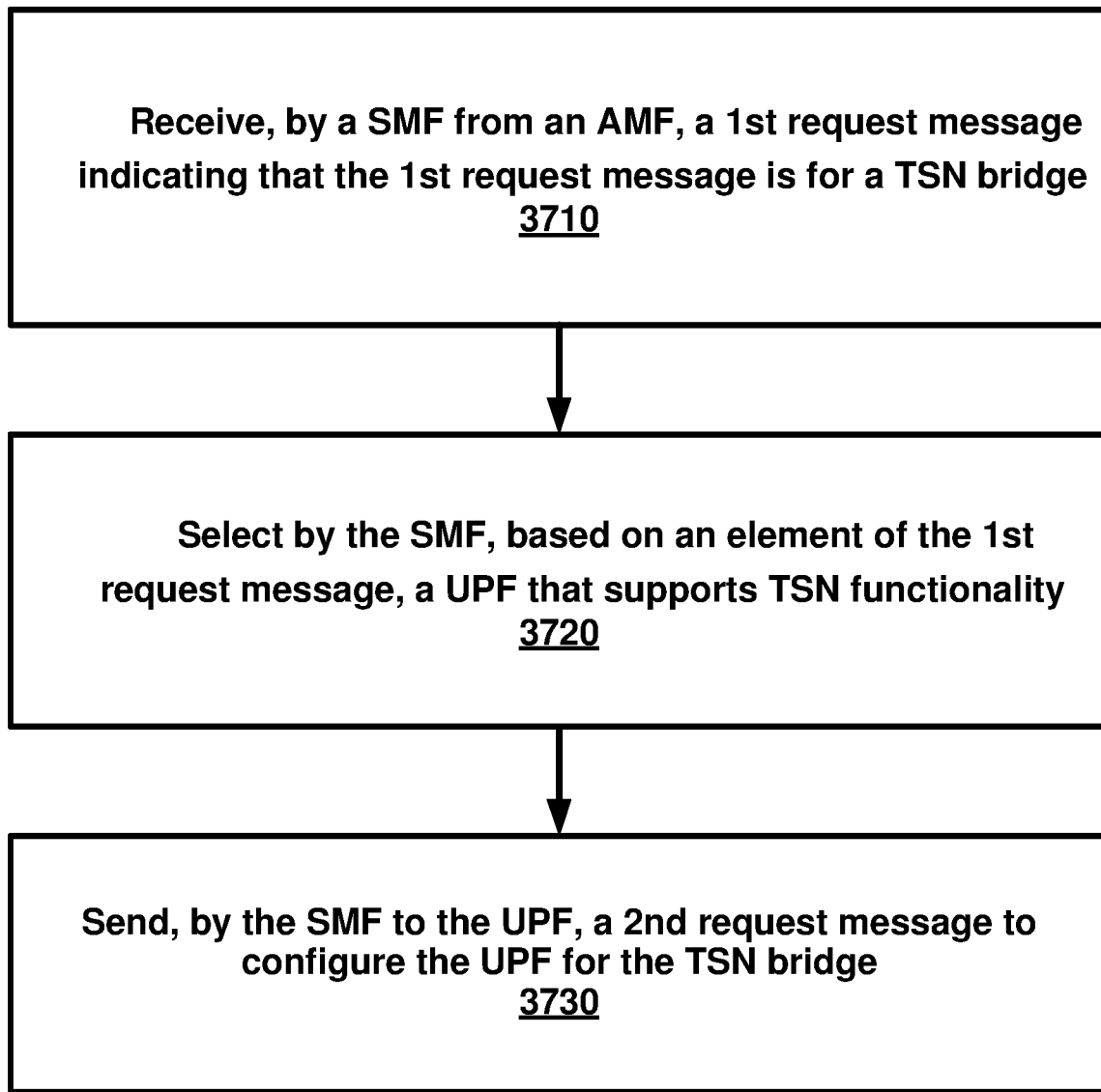
FIG. 37 is an example call flow as per an aspect of an embodiment of the present disclosure.

FIG. 37 is a flow diagram as per an aspect of an example embodiment of the present disclosure. At 3710, a session management function may receive from an access and mobility management function, a first request message indicating that the first request message is for a time sensitive network (TSN) bridge. At 3720, the SMF may select based on an element of the request message, a user plane function (UPF) that supports TSN functionality. At 3730, the SMF may send to the UPF, a second request message to configure the UPF for the TSN bridge.

In an example, a wireless device may receive from a first station, a request indicating configuration of a time sensitive network (TSN) bridge for transmission of a stream of data packets. The wireless device may send to a session management function (SMF), a non-access stratum message comprising at least one parameter for configuration of the TSN bridge. The wireless device may receive from the SMF, a response message indicating that the TSN bridge is configured for transmission of the stream of data packets. The wireless device may send to the first station, a message indicating successful configuration of the TSN bridge. In an example, the request may comprise a stream reservation protocol (SRP) message requesting configuration of a time sensitive network (TSN) bridge for transmission of a stream of data packets between the first station and a second station. The SRP message may comprise an identifier of the stream of data packets, at least one parameter for configuration of the TSN bridge, and/or the like. The at least one transmission parameter for the stream of data packets comprises an identifier of the stream of data packets, data frame parameters, user to network requirement parameters, a priority and rank indication parameter, a latency value, traffic specification parameter, and/or the like. The response message may be a SRP response message indicating that the second station is ready for the transmission of the stream.

In an example embodiment, a wireless device may receive from a first station, a stream reservation protocol (SRP) message requesting configuration of a time sensitive network (TSN) bridge for transmission of a stream of data packets between the first station and a second station. The SRP message may comprise an identifier of the stream of data packets, at least one parameter for configuration of the TSN bridge, and/or the like. In an example, the wireless device may send to a session management function (SMF), a non-access stratum message comprising the SRP message to configure the TSN bridge. The wireless device may receive an SRP response message indicating that the second station is ready for the transmission of the stream. The wireless device may send to the first station, the SRP response message. In an example, the SRP response may be received from a control plane network element of the TSN bridge. The SRP response may be received from a second station of the TSN system. The wireless device may determine that a PDU session of TSN type is required for transmission of the stream of data packets. The non-access stratum message may further comprise a parameter indicating that the PDU session is for the TSN bridge or a TSN end station. The wireless device may determine to transmit the SRP via a control plane message. The identifier of the stream of data packets may comprise an identifier of the first station, an identifier of the second station, and/or the like.

In an example embodiment, a wireless device may receive from a first station, a stream reservation protocol (SRP) message requesting reservation of network resources for a stream of data packets between the first station and a second station via a time sensitive network (TSN) bridge. The SRP message may comprise an identifier of the stream of data packets, at least one transmission parameter for the stream of data packets, and/or the like. The wireless device may determine based on the SRP message, to establish a packet data unit (PDU) session for the TSN. The wireless device may send to a session management function (SMF), a second message requesting establishment of the PDU session for the stream of the data packets. The second message may comprise the SRP message, a parameter indicating that the PDU session is for the TSN, and/or the like. The wireless device may receive an SRP response message indicating that a second station is ready to receive the stream of data packets. The wireless device may send to the first station, the SRP response message. In an example, The wireless device may receive from the first station, the stream of packets. The wireless device may transmit via the PDU session, the stream of packets. In an example, the wireless device may receive from the first station, the SRP message via a TSN translator. The at least one transmission parameter for the stream of data packets may comprise an identifier of the stream of data packets, data frame parameters, user to network requirement parameters, a priority and rank indication parameter, a latency value, traffic specification parameter, and/or the like. The data frame parameters may comprise a source MAC address for the stream of data packets, a destination MAC address for the stream of data packets, an identifier of a VLAN, and/or the like. The user to network requirement parameters may comprise a parameter indicating latency requirements for the stream of data packets, a parameter indicating a redundancy requirement for the stream of data packets, and/or the like. The latency value may comprise an accumulated latency value. The traffic specification parameter may comprise a parameter indicating a size of data frame, a parameter indicating number of data frames, and/or the like. The second message may be a non-access stratum (NAS) message. The SRP response message may be a NAS message. The SRP response message may be received via the session management function. The SRP response message may be received via the PDU session. The SRP response message may be received via a user plane function. The wireless device may extract the at least one transmission parameter for the stream of data packets. The wireless device may map the at least one transmission parameter to a quality of service (QoS) parameter. The second message may further comprise an identifier of a TSN bridge. The TSN bridge may be a 3GPP system comprising an ingress port and an egress port. The egress port may comprise the wireless device, or a user plane function. The ingress port may comprise the wireless device, or a user plane function. The second message may comprise an identifier of a port associated with the first end station of the TSN system. The SMF may send to a user plane function (UPF), the SRP message.

In an example embodiment, a wireless device of a time sensitive network (TSN) bridge may receive from a session management function, a configuration message requesting reservation of network resources for a stream of data packets for the TSN bridge. The wireless device may determine based on the configuration message, to modify a packet data unit (PDU) session via the TSN bridge for transmission of the stream of data packets. The wireless device may send to the session management function (SMF), a NAS message comprising at least one transmission parameter for the stream of data packets. In an example, the configuration message may comprise an identifier of the stream of data packets, at least one transmission parameter for the stream of data packets, and/or the like. The at least one transmission parameter for the stream of data packets may comprise an identifier of the stream of data packets, data frame parameters, user to network requirement parameters, a priority and rank indication parameter, a latency value, traffic specification parameter, and/or the like. The NAS message may comprise a SRP message, a parameter indicating that the PDU session is for the TSN, and/or the like. The SRP message may comprise an identifier of the stream of data packets, data frame parameters, user to network requirement parameters, a priority and rank indication parameter, a latency value, traffic specification parameter, and/or the like. The wireless device may receive an acknowledgment message indicating that the PDU session for the TSN system is successful. The wireless device may send to a first station, a SRP message. The wireless device may receive from a first station a SRP response message. The wireless device may send to a second station a SRP response message.

In an example embodiment, a wireless device may receive from a session management function, a stream reservation protocol (SRP) message requesting reservation of network resources for a stream of data packets for a time sensitive network (TSN). The SRP message may comprise an identifier of the stream of data packets, at least one transmission parameter for the stream of data packets, and/or the like. The wireless device may determine based on the SRP message, to establish a packet data unit (PDU) session for the TSN. The wireless device may send to the session management function (SMF), a second message requesting establishment of the PDU session for the stream of the data packets. The second message may comprise the SRP message, a parameter indicating that the PDU session is for the TSN, and/or the like. The wireless device may receive an acknowledgment message indicating that the PDU session for the TSN system is successful. The wireless device may send to a first station, the SRP message. The wireless device may receive from the first end station a SRP response message. The wireless device may send to a second station the SRP response.

In an example embodiment, a session management function (SMF) may receive from a wireless device, a NAS message comprising at least one transmission parameter for the stream of data packets. The SMF may determine to configure a UPF for the TSN packet transmission. The SMF may send to the UPF, a message to configure the UPF for the TSN bridge. The NAS message may comprise an identifier of a time sensitive networking (TSN) bridge. The SMF may receive from the UPF an acknowledgment message indicating successful configuration of the bridge. The message may comprise an element of the at least one transmission parameter for the stream of data packets.

In an example embodiment, a session management function (SMF) may receive from a wireless device, a NAS message comprising an identifier of a time sensitive networking (TSN) bridge. The SMF may determine to configure a UPF for the TSN packet transmission. The SMF may send to the UPF, a message to configure the UPF for the TSN bridge. The SMF may receive from the UPF an acknowledgment message indicating successful configuration of the bridge. The NAS message may be a request for establishment of a PDU session for a time sensitive network (TSN) packet transmission via the TSN bridge. The NAS message may comprise an identifier of a port of the wireless device. The port may be associated with the TSN bridge. The message may be an N4 session establishment request. The message may comprise an identifier of the TSN bridge, an identifier of a port associated with the packet transmission, and/or the like. The acknowledgment message may comprise an identifier of the TSN bridge. The message may comprise a stream reservation protocol (SRP). The SRP may comprise an identifier of the stream of data packets, data frame parameters, user to network requirement parameters, a priority and rank indication parameter, a latency value, traffic specification parameter, and/or the like. The message may comprise an identifier of the stream of data packets. The SMF may send to a PCF, a QoS flow request for the stream of data packets. The SMF may receive from the PCF, at least one PCC rules for the QoS flow of the stream of data packets.

In an example embodiment, a session management function (SMF) may receive from a wireless device, a message requesting establishment of a PDU session for a time sensitive network (TSN) packet transmission via a TSN bridge. The SMF may determine to configure a UPF for the TSN packet transmission. The SMF may send to the UPF, a session establishment request comprising an identifier of the TSN bridge, an identifier of a port associated with the packet transmission, and/or the like. The SMF may receive from the UPF an acknowledgment indicating successful configuration of the port for the packet transmission.

In an example embodiment, a session management function (SMF) may receive from a wireless device, a message requesting establishment of a PDU session for a stream of data packets for a time sensitive network (TSN). The message may comprise a stream reservation protocol (SRP) message comprising an identifier of the stream of data packets, at least one transmission parameter for the stream of data packets, a parameter indicating that the PDU session is for the TSN, and/or the like. The SMF may determine based on the message that the PDU session establishment is for the TSN system. The SMF may determine a quality of service requirement parameter based on the at least one transmission parameter for the stream of data packets. The SMF may send to a network function, the SRP message targeted to a second station. The SMF may send to a UPF, a second message requesting establishment of the PDU session for the TSN system. The second message may comprise the identifier of the stream of data packets, the quality of service requirement parameter, and/or the like. In an example, the network function may be at least one of a network exposure function (NEF), or a user plane function (UPF). The SMF may send to a PCF, a QoS flow request for the stream of data packets. The SMF may receive from the PCF, at least one PCC rule for the QoS flow of the stream of data packets. The QoS flow request may comprise the at least one transmission parameter for the stream of data packets.

In an example embodiment, a session management function may receive from a wireless device a time sensitive networking (TSN) system, a first message indicating a request for a PDU session establishment for a stream of data packets, the first message comprising an identifier of the stream of data packets, at least one parameter characterizing requirements for transmission of the stream of data packets, and/or the like. The SMF may determine based on the first message that the request for the PDU session establishment is for the TSN system. The SMF may determine a quality of service requirement parameter based on the at least one parameter characterizing requirements for transmission of the stream of data packets. The SMF may send to a UPF, a second message requesting establishment of the PDU session for the TSN system, the second message comprising the identifier of the stream of data packets, and the quality of service requirement parameter. In an example the SMF may send to a PCF a request for a QoS flow. The SMF may receive from the PCF, at least one PCC rule(s) for the QoS flow. The NEF may receive from the SMF, the SRP message. The NEF may send to a network node, the SRP message. The network node may comprise a TSN translator device, a policy control function, or an application function. The network node may send to a second TSN bridge, the SRP message. The network node may receive from the second TSN bridge, the SRP message.

In an example embodiment, a session management function may receive from an access and mobility management function, a first request message indicating that the first request message is for a time sensitive network (TSN) bridge. The SMF may select based on an element of the request message, a user plane function (UPF) that supports TSN functionality. The SMF may send to the UPF, a second request message to configure the UPF for the TSN bridge. In an example, the first request message may be for a PDU session establishment request. The first request message may be an N11 request message. The second request message may be an N4 session establishment request message. The SMF may send to a network repository function (NRF) a discovery request to select the UPF. The SMF may receive from the NRF, an identifier of the UPF that supports TSN functionality. The discovery request message may comprise a TSN capability indicator.

In an example embodiment, a session management function (SMF) may receive from an access and mobility management function, a PDU session establishment request indicating that the PDU session is for a time sensitive network (TSN) bridge. The SMF may send to a network repository function (NRF) a discovery request message to select a user plane function, the discovery request message may comprise a TSN capability indicator. The SMF may receive from the NRF, an identifier of the UPF that supports TSN functionality. The SMF may send to the UPF a session establishment request message.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {can, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

The invention claimed is:

1. A method comprising:
   receiving, by a wireless device from a time sensitive network, TSN, translator device, one or more TSN parameters;
   sending, by the wireless device to an access and mobility management function, AMF, a non access stratum, NAS, message indicating a request to establish a packet data unit (PDU) session comprising the one or more TSN parameters; and
   receiving, by the wireless device from the AMF, a message indicating acceptance of the PDU session.

2. The method of claim 1, wherein the one or more TSN parameters comprise a priority parameter.

3. The method of claim 1, wherein the one or more TSN parameters comprise a TSN stream identification parameter.

4. The method of claim 1, wherein the NAS message comprises a port identity associated with the wireless device.

5. The method of claim 1, wherein the NAS message indicates that a PDU session type of the request is for the TSN.

6. The method of claim 1, wherein the NAS message comprises an identifier of a TSN bridge.

7. The method of claim 1, wherein the request is to establish the PDU session for a TSN bridge.

8. The method of claim 1, wherein the request is to establish the PDU session for a TSN end station.

9. The method of claim 1, wherein the request comprises a stream reservation protocol (SRP) message.

10. The method of claim 1, wherein the one or more TSN parameters are for a stream of data packets.

11. A method comprising:
    receiving, by an access and mobility management function, AMF, from a wireless device, a non access stratum, NAS, message indicating a request to establish a packet data unit (PDU) session comprising one or more time sensitive network (TSN) parameters; and
    sending, by the AMF to the wireless device, a message indicating acceptance of the PDU session.

12. The method of claim 11, wherein the one or more TSN parameters comprise a priority parameter.

13. The method of claim 11, wherein the one or more TSN parameters comprise a TSN stream identification parameter.

14. The method of claim 11, wherein the NAS message comprises a port identity associated with the wireless device.

15. The method of claim 11, wherein the NAS message indicates that a PDU session type of the request is for the TSN.

16. The method of claim 11, wherein the NAS message comprises an identifier of a TSN bridge.

17. The method of claim 11, wherein the request is to establish the PDU session for a TSN bridge.

18. The method of claim 11, wherein the request is to establish the PDU session for a TSN end station.

19. The method of claim 11, wherein the request comprises a stream reservation protocol (SRP) message.

20. A system, comprising:
    a wireless device comprising: one or more first processors and first memory storing instructions that, when executed by the one or more first processors, cause the wireless device to:
      receive, from a time sensitive network, TSN, translator device, one or more TSN parameters;
      send, to an access and mobility management function, AMF, a non access stratum, NAS, message indicating a request to establish a packet data unit (PDU) session comprising the one or more TSN parameters; and
      receive, from the AMF, a message indicating acceptance of the PDU session; and
    the AMF, wherein the AMF comprises: one or more second processors and second memory storing instructions that, when executed by the one or more second processors, cause the AMF to:
      receive, from the wireless device, the NAS message indicating the request to establish the PDU session comprising the one or more TSN parameters; and
      send, to the wireless device, the message indicating acceptance of the PDU session.

* * * * *